US012577087B2

(12) United States Patent
Hinders et al.

(10) Patent No.: US 12,577,087 B2
(45) Date of Patent: Mar. 17, 2026

(54) OPERATOR CONTROL SYSTEM FOR A MATERIALS HANDLING VEHICLE

(71) Applicant: Crown Equipment Corporation, New Bremen, OH (US)

(72) Inventors: John Hinders, Sidney, OH (US); Adam M. Ruppert, Wapakoneta, OH (US); Craig Rekow, Troy, OH (US); Matthew Jacob Otto, New Bremen, OH (US); Cole Thomas Steinbrunner, New Bremen, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 18/588,445

(22) Filed: Feb. 27, 2024

(65) Prior Publication Data

US 2024/0199394 A1 Jun. 20, 2024

Related U.S. Application Data

(62) Division of application No. 17/303,603, filed on Jun. 3, 2021, now Pat. No. 11,987,483.

(60) Provisional application No. 63/142,531, filed on Jan. 28, 2021, provisional application No. 63/142,547, filed on Jan. 28, 2021, provisional application No. 63/035,328, filed on Jun. 5, 2020.

(51) Int. Cl.
*B66F 9/07* (2006.01)
*B66F 9/075* (2006.01)

(52) U.S. Cl.
CPC ........ *B66F 9/0759* (2013.01); *B66F 9/07545* (2013.01); *B66F 9/07568* (2013.01)

(58) Field of Classification Search
CPC ................ B66F 9/0759; B66F 9/07545; B66F 9/07568; B66F 9/20
See application file for complete search history.

(56) References Cited

U.S. PATENT DOCUMENTS

| | | | |
|---|---|---|---|
| 1,576,793 | A | 3/1926 | Luther |
| 1,841,176 | A | 1/1932 | Fromer |
| 2,256,890 | A | 9/1941 | Brown et al. |
| 2,529,200 | A | 11/1950 | Swanson |

(Continued)

FOREIGN PATENT DOCUMENTS

| | | | |
|---|---|---|---|
| CN | 1262520 | A | 8/2000 |
| CN | 1887683 | A | 1/2007 |

(Continued)

OTHER PUBLICATIONS

Elahmadi, Zakaria; Non-Final Office Action dated Oct. 23, 2024; U.S. Appl. No. 18/590,154; United States Patent and Trademark Office; Alexandria, Virginia.

(Continued)

*Primary Examiner* — Zakaria Elahmadi
(74) *Attorney, Agent, or Firm* — Stevens & Showalter LLP

(57) ABSTRACT

An operator control system is provided for a materials handling vehicle, the materials handling vehicle including an operator station having a support structure. The operator control system includes an operator control assembly having a housing mounted to or integral with the support structure, and at least one control element for controlling a function of the vehicle. One or both of the housing and/or the control element is positionable in a plurality of positions.

13 Claims, 45 Drawing Sheets

(56) References Cited

U.S. PATENT DOCUMENTS 2,645,297 A 7/1953 Wennburg et al.
3,202,242 A 8/1965 Dolphin
3,235,034 A 2/1966 Quayle
3,414,086 A 12/1968 Ulinski
3,643,899 A 2/1972 Firestone
3,756,330 A 9/1973 Russell
3,844,382 A 10/1974 Mecklenburg
3,858,688 A 1/1975 Galloway
3,932,028 A 1/1976 Klingler
3,946,885 A 3/1976 Menkel et al.
4,015,686 A 4/1977 Bushnell, Jr.
4,176,732 A 12/1979 Nordskog
4,191,276 A 3/1980 Farmer et al.
4,261,438 A 4/1981 Olson
4,291,946 A 9/1981 Van Der Lely
4,309,142 A 1/1982 Shumaker
4,392,669 A 7/1983 Martin, Jr.
4,432,438 A 2/1984 Robinson
4,484,663 A 11/1984 Wyse
4,587,510 A 5/1986 Kim
4,732,462 A 3/1988 Bel
4,919,233 A 4/1990 Larsen et al.
5,036,942 A 8/1991 Loewen
5,201,629 A 4/1993 Simpson et al.
5,203,425 A 4/1993 Wehmeyer
5,273,132 A 12/1993 Sasaki et al.
5,275,255 A 1/1994 Huntley et al.
5,520,258 A 5/1996 Kemshall
5,657,834 A 8/1997 Plaugher et al.
5,666,227 A 9/1997 Ben-Ghiath
5,755,306 A 5/1998 Kraemer et al.
5,768,947 A 6/1998 Fee et al.
5,803,204 A 9/1998 White et al.
5,850,892 A 12/1998 Citron et al.
5,875,869 A 3/1999 Busuttil et al.
5,890,559 A 4/1999 Busuttil et al.
5,890,562 A 4/1999 Bartels et al.
5,984,050 A 11/1999 Ronald
5,992,572 A 11/1999 Gilliand et al.
6,000,502 A 12/1999 Leasor et al.
6,070,690 A 6/2000 Eavenson et al.
6,095,263 A 8/2000 Saunders et al.
6,095,286 A 8/2000 Citron et al.
6,104,538 A 8/2000 Ben-Ghiath
6,109,130 A * 8/2000 Will .......................... B66F 9/20 340/665
6,125,971 A 10/2000 Niebuhr et al.
6,174,124 B1 1/2001 Haverfield et al.
6,182,797 B1 2/2001 Tebbe et al.
6,189,636 B1 2/2001 Kikukawa
6,241,047 B1 6/2001 Gilliland et al.
6,378,652 B1 4/2002 Albert
6,405,880 B1 6/2002 Webb
6,471,004 B2 10/2002 Stringer et al.
6,648,581 B2 11/2003 Gibson
6,793,247 B2 9/2004 Swetish
6,871,721 B2 3/2005 Smiley et al.
6,948,740 B2 9/2005 Chernoff et al.
6,971,194 B2 12/2005 McClelland et al.
7,040,427 B2 5/2006 Toomey
7,059,680 B2 * 6/2006 Billger ................. B60N 2/0235 297/344.21
7,278,678 B2 10/2007 Martin
7,306,280 B1 12/2007 Kraimer
7,314,116 B2 1/2008 David et al.
7,360,628 B2 4/2008 Charvet
7,472,945 B2 1/2009 Miura
7,520,567 B2 * 4/2009 Billger ................. B60N 2/0235 180/331
7,629,996 B2 12/2009 Rademacher et al.
7,635,045 B2 12/2009 Shearer et al.
7,658,259 B2 2/2010 Smiley et al.
7,681,686 B1 * 3/2010 Klas ....................... B60K 26/00 180/329
7,712,571 B2 * 5/2010 Proud .................... B60K 26/02 74/491
7,757,579 B2 7/2010 Bloch
7,784,581 B1 * 8/2010 Klas ....................... G05G 9/047 297/344.21
D625,074 S 10/2010 Knie
7,950,492 B2 * 5/2011 Jorgensen ............. B60S 1/0896 297/344.21
7,963,350 B1 6/2011 Thielman et al.
8,037,952 B2 10/2011 Bock
8,069,927 B2 * 12/2011 Bachstein ............. E02F 9/2004 74/491
8,212,770 B2 * 7/2012 Obourn .................. G05G 9/047 345/161
8,235,161 B2 8/2012 Passeri et al.
8,261,629 B2 9/2012 Bamabo et al.
8,276,476 B2 10/2012 Diccion
8,714,049 B2 5/2014 Ast et al.
8,726,757 B2 5/2014 Barroso
8,789,654 B2 7/2014 Campbell et al.
8,944,744 B2 2/2015 Kleeberger et al.
8,985,263 B2 * 3/2015 Peterson .............. B60N 2/4242 180/317
9,235,553 B2 1/2016 Fitch et al.
9,342,091 B2 5/2016 Wuisan et al.
9,382,105 B2 7/2016 Hoock
9,434,585 B2 9/2016 Gillbride et al.
9,828,018 B2 11/2017 Mihara et al.
9,840,826 B2 12/2017 Huber et al.
9,932,062 B2 4/2018 Sap
10,077,543 B2 9/2018 Heinzmann et al.
10,093,365 B2 10/2018 Iwata
10,198,086 B2 2/2019 Parazynski et al.
10,301,156 B2 5/2019 Kraimer et al.
10,544,022 B2 * 1/2020 Porter .................... G05G 9/047
10,606,303 B2 3/2020 Weigand
10,800,441 B2 10/2020 Board et al.
10,815,643 B2 * 10/2020 Wuisan .................... G05G 1/06
10,850,761 B2 12/2020 Heusinger
11,046,564 B2 6/2021 Kraimer et al.
11,669,123 B2 * 6/2023 Erkocak ............. G05G 9/04792 74/491
11,762,412 B2 * 9/2023 Spink ..................... G05G 9/047 74/491
2002/0100644 A1 8/2002 Stringer
2004/0221674 A1 11/2004 Kornelson
2005/0067361 A1 3/2005 Waymire
2006/0037790 A1 2/2006 Haack et al.
2006/0061122 A1 * 3/2006 Billger ................... B60N 2/797 296/65.07
2006/0061178 A1 * 3/2006 Billger ................ B66F 9/07545 297/344.21
2006/0070816 A1 4/2006 Schroder
2006/0076427 A1 4/2006 Schneider et al.
2006/0272874 A1 12/2006 Kraimer et al.
2007/0074923 A1 * 4/2007 Billger .................. B66F 9/0759 187/222
2007/0131262 A1 6/2007 Ishii et al.
2007/0182121 A1 8/2007 Kraimer et al.
2009/0139360 A1 * 6/2009 Diccion ................ E02F 9/2004 74/471 XY
2009/0314116 A1 * 12/2009 Bandera .................... F16D 3/10 74/471 XY
2010/0072801 A1 * 3/2010 Adelsperger ........... B60N 2/797 297/344.21
2010/0077885 A1 * 4/2010 Karvonen ........... G06F 3/03549 74/491
2010/0089703 A1 4/2010 Gallagher et al.
2010/0147099 A1 * 6/2010 Maurer .................. G05G 25/02 74/491
2010/0181147 A1 7/2010 Simpson
2010/0181148 A1 7/2010 Simpson
2011/0120807 A1 5/2011 Persson et al.
2011/0180349 A1 7/2011 Beji
2011/0243699 A1 10/2011 Kleeberger et al.
2011/0271782 A1 11/2011 Perk et al.
2013/0153336 A1 6/2013 Wu et al.
2013/0183127 A1 7/2013 Dammeyer et al.

(56) References Cited

U.S. PATENT DOCUMENTS

| | | | | |
|---|---|---|---|---|
| 2013/0206508 | A1 | 8/2013 | Rushlow | |
| 2015/0253801 | A1* | 9/2015 | Wuisan | G05G 1/58 74/491 |
| 2016/0059662 | A1* | 3/2016 | Slawson | A01C 23/047 280/6.157 |
| 2017/0129753 | A1 | 5/2017 | Kraimer et al. | |
| 2017/0225627 | A1 | 8/2017 | Molnar et al. | |
| 2018/0002893 | A1 | 1/2018 | Heinzmann et al. | |
| 2018/0141796 | A1 | 5/2018 | Kraimer et al. | |
| 2018/0217626 | A1 | 8/2018 | Bartel et al. | |
| 2019/0071113 | A1 | 3/2019 | Boaed et al. | |
| 2019/0225253 | A1* | 7/2019 | Heusinger | B62D 1/18 |
| 2019/0263646 | A1 | 8/2019 | Kraimer et al. | |
| 2019/0276066 | A1* | 9/2019 | Heusinger | B62D 1/04 |
| 2019/0359244 | A1 | 11/2019 | Yoshioka et al. | |
| 2020/0001710 | A1 | 1/2020 | Taira et al. | |
| 2020/0011028 | A1* | 1/2020 | Wuisan | E02F 9/2004 |
| 2020/0284272 | A1 | 9/2020 | Abraham | |
| 2020/0291770 | A1 | 9/2020 | Jostes | |
| 2021/0094809 | A1* | 4/2021 | Burton | H03K 17/90 |
| 2021/0380381 | A1 | 12/2021 | Hinders et al. | |
| 2021/0380382 | A1 | 12/2021 | Otto et al. | |
| 2022/0341127 | A1* | 10/2022 | Mortensen | B62D 55/00 |

FOREIGN PATENT DOCUMENTS

| | | | |
|---|---|---|---|
| CN | 101431915 | A | 5/2009 |
| CN | 106252139 | A | 12/2016 |
| CN | 111003662 | A | 4/2020 |
| DE | 19936192 | A1 | 8/2000 |
| DE | 29824820 | U1 | 11/2002 |
| DE | 10202508 | A1 | 7/2003 |
| DE | 20301165 | U1 | 7/2004 |
| DE | 102005049006 | A1 | 4/2007 |
| DE | 102009051785 | A1 | 5/2011 |
| DE | 102006018537 | A1 | 11/2013 |
| DE | 102012020312 | A1 | 4/2014 |
| DE | 102013105299 | A1 | 11/2014 |
| DE | 202019105473 | U1 | 12/2019 |
| EP | 0555025 | B1 | 5/1997 |
| EP | 0931759 | A1 | 7/1999 |
| EP | 0995663 | A2 | 4/2000 |
| EP | 1281598 | A2 | 2/2003 |
| EP | 1314634 | A2 | 5/2003 |
| EP | 1505033 | A1 | 2/2005 |
| EP | 1012104 | B1 | 11/2005 |
| EP | 1686089 | A1 | 8/2006 |
| EP | 1731477 | A2 | 12/2006 |
| EP | 1828045 | B1 | 12/2008 |
| EP | 2138445 | A1 | 12/2009 |
| EP | 2123597 | B1 | 3/2011 |
| EP | 2347989 | A1 | 7/2011 |
| EP | 1818752 | B1 | 8/2011 |
| EP | 2412661 | A1 | 2/2012 |
| EP | 2439167 | A1 | 4/2012 |
| EP | 2518009 | A1 | 10/2012 |
| EP | 1999058 | B1 | 3/2013 |
| EP | 2567878 | B1 | 3/2013 |
| EP | 2641862 | A1 | 9/2013 |
| EP | 2412552 | B1 | 9/2014 |
| EP | 2805911 | A1 | 11/2014 |
| EP | 2342116 | B1 | 9/2015 |
| EP | 2406169 | B1 | 12/2015 |
| EP | 3083368 | B1 | 5/2018 |
| EP | 3246225 | B1 | 1/2019 |
| EP | 3486209 | A1 | 5/2019 |
| EP | 3502043 | A1 | 6/2019 |
| EP | 3505485 | A1 | 7/2019 |
| GB | 2381853 | A | 5/2003 |
| JP | H01173015 | U | 5/1988 |
| JP | S63116561 | U | 7/1988 |
| JP | H1181383 | A | 3/1999 |
| JP | H11246192 | A | 9/1999 |
| JP | 2003146595 | A | 5/2003 |
| JP | 2005082368 | A | 3/2005 |
| JP | 5545686 | B1 | 5/2014 |
| KR | 20130064580 | A | 6/2013 |
| KR | 20140129507 | A | 11/2014 |
| WO | 199911558 | A1 | 3/1999 |
| WO | 2009010818 | A2 | 1/2009 |
| WO | 2010142516 | A2 | 12/2010 |
| WO | 2013115705 | A1 | 8/2013 |
| WO | 2013136036 | A1 | 9/2013 |
| WO | 2014202512 | A1 | 12/2014 |
| WO | 2017083029 | A1 | 5/2017 |

OTHER PUBLICATIONS

Berry Jr, Willie Wendell; Notice of Allowance and Fees Due dated Apr. 22, 2024; U.S. Appl. No. 17/303,607; United States Patent and Trademark Office; Alexandria, Virginia.

Serodio, Renato; Communication Pursuant to Article 94(3) EPC dated Nov. 6, 2024; European Application No. 19160901.5; European Patent Office; Rijswijk, Netherlands.

EKS 310s-412s Operating Instructions; Jungheinrich AG; pp. 193-194; published Mar. 2019; Hamburg, Germany.

BT Optio H-series Product guide; Toyota Material Handling International; published Dec. 2011; pp. 21-22, 50-51; Mjolby, Sweden.

Medium and high level order picking; Unicarriers; published Jan. 2018; downloaded from https://www.unicarrierseurope.com/sites/unicarrierseurope.com/files/product_brochure/19763_hlop_brochure_en_02_low.pdf.

Order Picker Truck V15 Series 5215 product brochure; Linde Material Handling; published Feb. 1, 2019; retrieved from https://www.kion-na.com/product_view/prodcuts_1_82.html.

Image from Unicarrier lift truck; PEGAMO Group website; retrieved from https://www.pegamo.es/es/carretillas-elevadoras/productos/carretillas-elevadoras/unicarriers/recogepedidos/epm-eph/ on Aug. 19, 2021.

Step 3 Orderpickers BT Optio H Series; Product Planning and Support; Toyota Material Handling International; pp. 1,2,26-28; Jul. 7, 2014.

Advertisement for J2 Joey; "Radical new lift truck design to be introduced at ProMat 201515253"; advertisement available at least on or before Dec. 2, 2014.

Big Lift LLC; "The J1 Joey—Task Support Vehicle"; brochure avaliable at least on or before Nov. 7, 2014.

JLG Toucan Duo (1 of 3); photographs available at least on or before Dec. 18, 2014.

JLG Toucan Duo (2 of 3); photographs available at least on or before Dec. 18, 2014.

JLG Toucan Duo (3 of 3); photographs available at least on or before Dec. 18, 2014.

Jungheinrich EKS110 and Toyota OSE; photograph available at least on or before Nov. 7, 2014.

Linde AG; "Medium-Level Order Picker 1000 kg"; brochure available at least on or before Oct. 20, 2014.

Photograph; Jungheinrich Linde Still Toyota-BT; photograph available at least on or before Nov. 25, 2014.

Photographs of Big Joe (J1 Joey); photographs available at least on or before Dec. 11, 2014.

Photograph; LP—BT 3; photograph available at least on or before Oct. 20, 2015.

Photograph; Schimmel 040; photograph available at least on or before Oct. 20, 2015.

Brochure of J1 Joey—Task Support Vehicle; brochure available at least on or before Dec. 2, 2014.

Riegelman, Michael A; Restriction Requirement; U.S. Appl. No. 14/935,528; Sep. 14, 2017; United States Patent and Trademark Office; Alexandria, VA.

Riegelman, Michael A.; Office Action; U.S. Appl. No. 14/935,528; Nov. 30, 2017; United States Patent and Trademark Office; Alexandria, VA.

Riegelman, Michael A.; Final Office Action; U.S. Appl. No. 14/935,528; Apr. 6, 2018; United States Patent and Trademark Office; Alexandria, VA.

(56) References Cited

OTHER PUBLICATIONS

Riegelman, Michael A.; Restriction Requirement; U.S. Appl. No. 14/935,528; Aug. 16, 2018; United States Patent and Trademark Office; Alexandria, VA.
Riegelman, Michael A.; Office Action; U.S. Appl. No. 14/935,528; Oct. 22, 2018; United States Patent and Trademark Office; Alexandria, VA.
Reigelman, Michael A.; Examiner's Answer; U.S. Appl. No. 14/935,528; May 6, 2019; United States Patent and Trademark Office; Alexandria, VA.
Riegelman, Michael A.; Decision on Appeal; U.S. Appl. No. 14/935,528; Nov. 3, 2020; United States Patent and Trademark Office; Alexandria, VA.
Riegelman, Michael A.; Notice of Allowance dated Jan. 15, 2021; U.S. Appl. No. 14/935,528; United States Patent and Trademark Office; Alexandria, VA.
Riegelman Michael A.; Notice of Allowance dated Feb. 24, 2021; U.S. Appl. No. 14/935,528; United States Patent and Trademark Office; Alexandria, VA.
Riegelman, Michael A.; Notice of Allowanced dated May 28, 2021; U.S. Appl. No. 14/935,528; United States Patent and Trademark Office; Alexandria, VA.
Riegelman, Michael A.; Office Action; U.S. Appl. No. 15/874,981; Apr. 6, 2018; United States Patent and Trademark Office; Alexandria, VA.
Riegelman, Michael A.; Final Office Action; U.S. Appl. No. 15/874,981; Oct. 12, 2018; United States Patent and Trademark Office; Alexandria, VA.
Riegelman, Michael A.; Advisory Action; U.S. Appl. No. 15/874,981; Nov. 20, 2018; United States Patent and Trademark Office; Alexandria, VA.
Riegelman, Michael A.; Advisory Action; U.S. Appl. No. 15/874,981; Jan. 4, 2019; United States Patent and Trademark Office; Alexandria, VA.
Riegelman, Michael A.; Notice of Allowance; U.S. Appl. No. 15/874,981; Jan. 31, 2019; United States Patent and Trademark Office; Alexandria, VA.
Riegelman, Michael A.; Restriction Requirement; U.S. Appl. No. 16/406,122; Jul. 30, 2019; United States Patent and Trademark Office; Alexandria, VA.
Riegelman, Michael A.; Office Action; U.S. Appl. No. 16/406,122; Oct. 10, 2019; United States Patent and Trademark Office; Alexandria, VA.
Riegelman, Michael A.; Office Action; U.S. Appl. No. 16/406,122; Jan. 30, 2020; United States Patent and Trademark Office; Alexandria, VA.
Riegelman, Michael A.; Advisory Action; U.S. Appl. No. 16/406,122; Mar. 20, 2020; United States Patent and Trademark Office; Alexandria, VA.
Riegelman, Michael A.; Office Action; U.S. Appl. No. 16/406,122; May 1, 2020; United States Patent and Trademark Office; Alexandria, VA.
Riegelman, Michael A.; Office Action; U.S. Appl. No. 16/406,122; Aug. 24, 2020; United States Patent and Trademark Office; Alexandria, VA.
Riegelman, Michael A.; Advisory Action; U.S. Appl. No. 16/406,122; Oct. 29, 2020; United States Patent and Trademark Office; Alexandria, VA.
Riegelman, Michael A.; Notice of Allowance and Fees Due; U.S. Appl. No. 16/406,122; Mar. 25, 2021; United States Patent and Trademark Office; Alexandria, VA.
Riegelman, Michael A.; Notice of Allowance and Fees Due; U.S. Appl. No. 16/406,122; Jul. 12, 2021; United States Patent and Trademark Office; Alexandria, VA.
Riegelman, Michael A.; Notice of Allowance and Fees Due; U.S. Appl. No. 16/406,122; Oct. 14, 2021; United States Patent and Trademark Office; Alexandria, VA.
Riegelman, Michael A.; Office Action dated Oct. 17, 2022; U.S. Appl. No. 17/449,964; United States Patent and Trademark Office; Alexandria, Virginia.
Riegelman, Michael A.; Final Office Action dated Feb. 6, 2023; U.S. Appl. No. 17/449,964; United States Patent and Trademark Office; Alexandria, Virginia.
Riegelman, Michael A.; Notice of Allowance dated Sep. 21, 2023; U.S. Appl. No. 17/449,964; United States Patent and Trademark Office; Alexandria, Virginia.
Serodio, Renato; Invitation to Pay Additional Fees; International Application No. PCT/US2016/055410; Feb. 13, 2017; European Patent Office; Riswijk, Netherlands.
Serodio, Renato; International Search Report and Written Opinion; International Application No. PCT/US2016/055410; Mar. 29, 2017; European Patent Office; Riswijk, Netherlands.
Chaudhary, Ronish; Examination Report; Australian Application No. 2016353843; Apr. 6, 2021; Australian Patent Office.
Chaudhary, Ronish; Examiners Report No. 1 dated May 25, 2023; Australian Application No. 2022201232; IP Australia.
Office Action dated Jul. 26, 2022; Canadian Application No. 3002533; CIPO; Gatineau, Quebec.
Henrot, Benoist; Office Action Dated Apr. 11, 2023; Canadian Application No. 3002533; CIPO; Quebec, Canada.
Search Report, Chinese Patent Application No. 201680062690; Jan. 25, 2019; China National Intellectual Property Administration; Beijing, China.
Office Action; Chinese Patent Application No. 201680062690; Feb. 2, 2019; China National Intellectual Property Administration; Beijing, China.
Office Action; Chinese Patent Application No. 201680062690; Aug. 22, 2019; China National Intellectual Property Administration; Beijing, China.
Search Report; Chinese Patent Application No. 201680062690; Jan. 3, 2020; China National Intellectual Property Administration; Beijing, China.
Office Action; Chinese Patent Application No. 201680062690; Jan. 20, 2020; China National Intellectual Property Administration; Beijing, China.
Serodio, Renato; Extended European Search Report; European Application No. 19160901; Jul. 8, 2019; European Patent Office; Munich, Germany.
Serodio, Renato; Examiners Report dated Mar. 22, 2023; European Application No. 19160901.5; European Patent Office; Rijswijk, Netherlands.
Office Action dated Mar. 31, 2022; Mexican Application No. MX/a/2018/005287; Mexican Institute of Industrial Property; Mexico City, Mexico.
Chang, Hoon; Notice of Preliminary Rejection dated May 19, 2023; Korea Application No. 10-2018-7016102; Korean Intellectual Property Office; Daejeon, Korea.
Appelen, Annik; Invitation to Pay Additional Fees; International Application No. PCT/US2021/035578; Oct. 5, 2021; European Patent Office; Riswijk, Netherlands.
International Search Report and Written Opinion of the International Searching Authority dated Mar. 1, 2022; International Application No. PCT/US2021/035578; European Patent Office; Rijswijk, Netherlands.
International Preliminary Report on Patentability dated Dec. 6, 2022; International Application No. PCT/US2021/035578; The International Bureau of WIPO; Geneva, Switzerland.
Elahmadi, Zakaria; Non-Final Office Action dated Jan. 19, 2024; U.S. Appl. No. 17/303,603; United States Patent and Trademark Office; Alexandria, Virginia.
Elahmadi, Zakaria; Final Rejection dated Feb. 15, 2024; U.S. Appl. No. 17/303,603; United States Patent and Trademark Office; Alexandria, Virginia.
Berry Jr., Willie Wendell; Non-Final Office Action dated Sep. 28, 2023; U.S. Appl. No. 17/303,607; United States Patent and Trademark Office; Alexandria, Virginia.
Berry Jr., Willie Wendell; Final Office Action dated Jan. 3, 2024; U.S. Appl. No. 17/303,607; United States Patent and Trademark Office; Alexandria, Virginia.
Verheul, Omiros; International Search Report and Written Opinion; International Application No. PCT/US2021/035589; Oct. 4, 2021; European Patent Office; Rijswijk, Netherlands.

(56) References Cited

OTHER PUBLICATIONS

International Preliminary Report on Patentability dated Dec. 6, 2022; International Application No. PCT/US2021/035589; The International Bureau of WIPO; Geneva, Switzerland.
Matthew Jacob Otto and Adam M. Ruppert; Related U.S. Appl. No. 17/303,607 entitled "Vertical Viewing Windows in a Materials Handling Vehicle"; filed Jun. 3, 2021.
Hinders, John; Related U.S. Appl. No. 18/611,898 entitled "Operator Control System for a Materials Handling Vehicle"; filed on Mar. 21, 2024; United States Patent and Trademark Office; Alexandria, Virginia.
Hinders, John; Related U.S. Appl. No. 18/590,154 entitled "Operator Control System for a Materials Handling Vehicle"; filed Feb. 28, 2024; United States Patent and Trademark Office; Alexandria, Virginia.
Kelley, Craig B.; U.S. Statutory Invention Registration No. H2024H entitled "Adjustable Control Assembly"; published Jun. 4, 2002; United States Patent and Trademark Office; Alexandria, Virginia.
Elahmadi, Zakaria; Notice of Allowance and Fees Due dated Mar. 25, 2024 U.S. Appl. No. 17/303,603; United States Patent and Trademark Office; Alexandria, Virginia.
Han, Seong-Ho; Notice of Preliminary Rejection dated May 1, 2024; Korean Application No. 10-2024-7012653; Korean Intellectual Property Office; Daejeon, Korea.
Verheul, Omiros; Communication pursuant to Article 94(3) EPC dated Jul. 16, 2024; European Patent Application No. 21735543.7; European Patent Office; Rijswijk, Netherlands.
Otto, Matthew Jacob; Related U.S. Appl. No. 18/758,029 entitled "Vertical Viewing Windows in a Materials Handling Vehicle" filed Jun. 28, 2024; United States Patent and Trademark Office; Alexandria, Virginia.
Verheul, Omiros; Extended European Search Report dated Nov. 21, 2024; European Patent Application No. 24189892.3; European Patent Office, Munich, Germany.
Sheppard, Bruce; Communication Pursuant to Article 94(3) EPC dated Jan. 3, 2025; European Application No. 21735541.1; European Patent Office; Rijswijk, Netherlands.
Elahmadi, Zakaria; Final Rejection dated Jan. 24, 2025; U.S. Appl. No. 18/590,154; United States Patent and Trademark Office; Alexandria, Virginia.
Han, Seong-Ho; Decision of Patent Grant dated Nov. 14, 2024; Korean Application No. 10-2024-7012653; Korean Intellectual Property Office; Daejeon, Korea.
Sheppard, Bruce; Extended European Search Report dated Feb. 10, 2025; European Application No. 24210265.5; European Patent Office; Munich, Germany.
Sheppard, Bruce; Extended European Search Report dated Feb. 10, 2025; European Application No. 24210264.8; European Patent Office; Munich, Germany.
Sheppard, Bruce; Extended European Search Report dated Feb. 10, 2025; European Application No. 24210263.0; European Patent Office; Munich, Germany.
Elahmadi, Zakaria; Non-Final Office Action dated Apr. 9, 2025; U.S. Appl. No. 18/590,154; United States Patent and Trademark Office; Alexandria, Virginia.
Elahmadi, Zakaria; Non-Final Office Action dated Apr. 24, 2025; U.S. Appl. No. 18/611,898 United States Patent and Trademark Office; Alexandria, Virginia.
Verheul, Omiro; Extended European Search Report dated Apr. 28, 2025; European Application No. 24222627.2; European Patent Office; Munich, Germany.
Avila, Jose Enrique Cazares; First Office Action dated Jul. 18, 2025; Mexican Application No. MX/a/2022/015356; Mexican Institute of Industrial Property; Mexico City, Mexico.
Avila, Jose Enrique Cazares; First Office Action dated Jul. 21, 2025; Mexican Application No. MX/a/2022/015358; Mexican Institute of Industrial Property; Mexico City, Mexico.
Elahmadi, Zakaria; Final Office Action dated Sep. 24, 2025; U.S. Appl. No. 18/590,154; United States Patent and Trademark Office; Alexandria, Virginia.
Sheppard, Bruce; Communication pursuant to Article 94(3) EPC dated Jun. 27, 2025; European Application No. 24210263.0; European Patent Office; Rijswijk, Netherlands.
Chen, Hui; First Chinese Office Action dated Jul. 26, 2025; Chinese Application No. 202180040500.6; China National Intellectual Property Administration; Beijing, China.
Chen, Hui; First Chinese Office Action dated Jul. 29, 2025; Chinese Application No. 202180040372.5; China National Intellectual Property Administration; Beijing, China.
Elahmadi, Zakaria; Final Office Action dated Oct. 23, 2025; U.S. Appl. No. 18/611,898; United States Patent and Trademark Office; Alexandria, Virginia.
Hui, Chen; Notification of Grant of Invention Patent dated Jan. 15, 2026; Chinese Application No. 202180040372.5; China National Intellectual Property Administration; Beijing, China.
Yu, Ying; article entitled "Motor Vehicles in Plants (Factories)" from "Safety Management and Operation Personnel Training Materials for Special-Purpose" pp. 134-135; publication date Aug. 31, 2020; ISBN: 978-7-5687-0459-6; Xiangtan University Press.

* cited by examiner

OPERATOR CONTROL SYSTEM FOR A MATERIALS HANDLING VEHICLE

CROSS REFERENCE TO RELATED APPLICATIONS

This application is a divisional of U.S. application Ser. No. 17/303,603, filed Jun. 3, 2021, entitled "OPERATOR CONTROL SYSTEM FOR A MATERIALS HANDLING VEHICLE", which claims the benefit of U.S. Provisional Patent Application Ser. No. 63/035,328, filed Jun. 5, 2020, entitled "OPERATOR CONTROL SYSTEM FOR A MATERIALS HANDLING VEHICLE"; 63/142,547, filed Jan. 28, 2021, entitled "VERTICAL VIEWING WINDOWS IN A MATERIALS HANDLING VEHICLE"; and 63/142,531, filed Jan. 28, 2021, entitled "OPERATOR CONTROL SYSTEM FOR A MATERIALS HANDLING VEHICLE"; the entire disclosures of which are hereby incorporated by reference.

FIELD

An operator control system is provided for a materials handling vehicle, wherein one or more components of the operator control system is adjustable.

BACKGROUND

Known materials handling vehicles include a power unit, a mast assembly and an operator compartment. The mast assembly may include a plurality of mast weldments, wherein a first mast weldment may be fixed to the power unit and one or more other mast weldments may be supported for telescoping movement. An operator compartment in the materials handling vehicle may be supported for vertical movement on the mast assembly for positioning an operator to retrieve items from shelves at elevated locations.

SUMMARY

In accordance with a first aspect of the disclosure, an operator control system for a materials handling vehicle is provided, in which the materials handling vehicle comprises an operator station having a floorboard and a support structure and the operator control system comprises: an operator control assembly, a fixture structure coupled to the support structure to selectively support the operator control assembly in a plurality of angular orientations relative to the support structure, and a vertical adjustment assembly coupled to the operator control assembly to selectively support the operator control assembly at a plurality of vertical positions relative to the floorboard.

The fixture structure may comprise a mounting plate with one or more first openings and one more second openings and a plurality of fasteners that couple a housing of the operator control assembly to the support structure. The operator control assembly may be mounted at a first angular orientation relative to the support structure when the fasteners are received in the one or more first openings of the mounting plate and a second angular orientation relative to the support structure when the fasteners are received in the one or more second openings, in which the second angular orientation may be different from the first angular orientation. The operator control assembly may be rotated about an axis generally parallel to a longitudinal axis of the materials handling vehicle when moved from the first angular orientation to a second angular orientation.

The support structure may comprise a fixed housing portion and a movable housing portion, in which the movable housing portion may be coupled to and movable with the operator control assembly and may be positioned to telescope over the fixed housing portion.

The operator control assembly may be continuously movable in a vertical direction between a first vertical position and a second vertical position.

The vertical adjustment assembly may comprise: a mounting plate attached to a support wall of the materials handling vehicle, a rail member attached to the mounting plate, a carriage assembly movably coupled to the rail member and coupled to the fixture structure, and a locking gas spring coupled to the fixture structure and the mounting plate to control the vertical position of the operator control assembly.

In accordance with a second aspect of the present disclosure, an operator control system for a materials handling vehicle is provided, in which the materials handling vehicle comprises an operator station having a floorboard, a first support structure, and a second support structure spaced apart from the first support structure in a lateral direction and the operator control system comprises: a first operator control assembly, a first fixture structure coupled to the first support structure to selectively support the first operator control assembly in a plurality of angular orientations relative to the first support structure, and a first vertical adjustment assembly coupled to the first operator control assembly to selectively support the first operator control assembly at a plurality of vertical positions relative to the floorboard; and a second operator control assembly, a second fixture structure coupled to the second support structure to selectively support the second operator control assembly in a plurality of angular orientations relative to the second support structure, and a second vertical adjustment assembly coupled to the second operator control assembly to selectively support the second operator control assembly at a plurality of vertical positions relative to the floorboard.

The first fixture structure may comprise a first mounting plate with one or more first openings and one more second openings and a first plurality of fasteners that couple a first housing of the first operator control assembly to the first support structure. The first operator control assembly may be mounted at a first angular orientation relative to the first support structure when the first plurality of fasteners are received in the one or more first openings and a second angular orientation relative to the first support structure when the first plurality of fasteners are received in the one or more second openings, in which the second angular orientation may be different from the first angular orientation. The second fixture structure may comprise a second mounting plate with one or more third openings and one or more fourth openings and a second plurality of fasteners that couple a second housing of the second operator control assembly to the second support structure. The second operator control assembly may be mounted at a third angular orientation relative to the second support structure when the second plurality of fasteners are received in the one or more third openings and a fourth angular orientation relative to the second support structure when the second plurality of fasteners are received in the one or more fourth openings, in which the fourth angular orientation may be different from the third angular orientation.

The first operator control assembly may be rotated about a first axis generally parallel to a longitudinal axis of the materials handling vehicle when moved from the first angular orientation to the second angular orientation, and the second operator control assembly may be rotated in an opposite direction about a second axis generally parallel to the longitudinal axis of the materials handling vehicle when moved from the third angular orientation to the fourth angular orientation.

The first support structure may comprise a first fixed housing portion and a first movable housing portion, in which the first movable housing portion may be coupled to and movable with the first operator control assembly and may be positioned to telescope over the first fixed housing portion. The second support structure may comprise a second fixed housing portion and a second movable housing portion, in which the second movable housing portion may be coupled to and movable with the second operator control assembly and may be positioned to telescope over the second fixed housing portion.

The first operator control assembly may be continuously movable in a vertical direction between a first vertical position and a second vertical position, and the second operator control assembly may be continuously movable in a vertical direction between a third vertical position and a fourth vertical position.

At least one of the angular orientation or the vertical position of the first operator control assembly may be adjustable independent of at least one of the angular orientation or the vertical position of the second operator control assembly.

The first vertical adjustment assembly may comprise: a first mounting plate attached to a support wall of the materials handling vehicle, a first rail member attached to the first mounting plate, a first carriage assembly movably coupled to the first rail member and coupled to the first fixture structure, and a first locking gas spring coupled to the first fixture structure and the first mounting plate to control the vertical position of the first operator control assembly. The second vertical adjustment assembly may comprise: a second mounting plate attached to the support wall of the materials handling vehicle, a second rail member attached to the second mounting plate, a second carriage assembly movably coupled to the second rail member and coupled to the second fixture structure, and a second locking gas spring coupled to the second fixture structure and the second mounting plate to control the vertical position of the second operator control assembly.

In accordance with a third aspect of the present disclosure, an operator control system for a materials handling vehicle is provided, in which the materials handling vehicle comprises an operator station having a generally horizontal floor surface and a support structure and the operator control system comprises: an operator control assembly and a vertical adjustment assembly coupled to the operator control assembly to selectively support the operator control assembly at a plurality of vertical positions relative to the generally horizontal floor surface. The operator control assembly may comprise a housing mounted to the support structure, and a steering assembly for steering the materials handling vehicle. The steering assembly may comprise a steering control structure and a base structure from which the steering control structure extends, in which the steering assembly may be movable with respect to the housing such that the steering assembly can be positioned in at least one of first or second positions. While in the first position, the steering control structure may extend from the base structure generally in a first orientation, and while in the second position, the steering control structure may extend from the base structure generally in a second orientation different from the first orientation.

The base structure may comprise a base plate and a mount coupled to the base plate, in which the mount may be pivotably mounted within a socket of the housing to enable the steering assembly to be moved between the first and second positions.

When the steering assembly is positioned in the first position, the steering control structure may be oriented at an acute angle relative to a vertical plane, in which the vertical plane may be perpendicular to the generally horizontal floor surface of the vehicle. When the steering assembly is positioned in the second position, the steering control structure may be oriented at an acute angle relative to a horizontal plane, in which the horizontal plane may be parallel to the generally horizontal floor surface of the vehicle.

The operator control system may further comprise a lock assembly for locking the steering assembly in the at least one of the first or second positions, in which the lock assembly comprises a lock release structure for unlocking the lock assembly such that the steering assembly can be moved between the at least one of the first or second positions.

The steering assembly may move independently of the support structure and the housing, such that the support structure and the housing remain in a same position when the steering assembly is in the first position and the second position. The housing may further comprise a control element area and the steering assembly may move independently of the control element area.

The support structure may comprise a fixed housing portion and a movable housing portion, in which the movable housing portion may be coupled to and movable with the operator control assembly and may be positioned to telescope over the fixed housing portion.

The operator control assembly may be continuously movable in a vertical direction between a first vertical position and a second vertical position.

The vertical adjustment assembly may comprise: a mounting plate attached to a support wall of the vehicle, a rail member attached to the mounting plate, a carriage assembly movably coupled to the rail member and coupled to the fixture structure, and a locking gas spring coupled to the fixture structure and the mounting plate to control the vertical position of the operator control assembly.

In accordance with a fourth aspect of the present disclosure, an operator control system for a materials handling vehicle is provided, in which the materials handling vehicle comprises an operator station having a generally horizontal floor surface, a first support structure, and a second support structure spaced apart from the first support structure in a lateral direction, and the operator control system comprises: a first operator control assembly and a second operator control assembly comprising a second housing mounted to the second support structure. The first operator control assembly may comprise a first housing mounted to the first support structure, and a steering assembly for steering the materials handling vehicle. The steering assembly may comprise a steering control structure and a base structure from which the steering control structure extends, in which the steering assembly may be movable with respect to the first housing such that the steering assembly can be positioned in at least one of first or second positions. While in the first position, the steering control structure may extend from the base structure generally in a first orientation, and while in the second position, the steering control structure may extend from the base structure generally in a second orientation different from the first orientation. The operator control system may further comprise a first vertical adjustment assembly coupled to the first operator control assembly to selectively support the first operator control assembly at a plurality of vertical positions relative to the generally horizontal floor surface, and a second vertical adjustment assembly coupled to the second operator control assembly to selectively support the second operator control assembly at a plurality of vertical positions relative to the generally horizontal floor surface.

The base structure may comprise a base plate and a mount coupled to the base plate, in which the mount may be pivotably mounted within a socket of the housing to enable the steering assembly to be moved between the first and second positions.

When the steering assembly is positioned in the first position, the steering control structure may be oriented at an acute angle relative to a vertical plane, in which the vertical plane may be perpendicular to the generally horizontal floor surface of the vehicle. When the steering assembly is positioned in the second position, the steering control structure may be oriented at an acute angle relative to a horizontal plane, in which the horizontal plane may be parallel to the generally horizontal floor surface of the vehicle.

The steering assembly may move independently of the first support structure and the first housing, such that the first support structure and the first housing remain in a same position when the steering assembly is in the first position and the second position. The first housing further may comprise a control element area, and the steering assembly may move independently of the control element area.

The first support structure may comprise a first fixed housing portion and a first movable housing portion, in which the first movable housing portion may be coupled to and movable with the first operator control assembly and may be positioned to telescope over the first fixed housing portion. The second support structure may comprise a second fixed housing portion and a second movable housing portion, in which the second movable housing portion may be coupled to and movable with the second operator control assembly and may be positioned to telescope over the second fixed housing portion.

The first operator control assembly may be continuously movable in a vertical direction between a first vertical position and a second vertical position, and the second operator control assembly may be continuously movable in a vertical direction between a third vertical position and a fourth vertical position.

The vertical position of the first operator control assembly may be adjustable independent of the vertical position of the second operator control assembly.

The vertical position of the second operator control assembly may be adjustable independent of at least one of the vertical position of the first operator control assembly or positioning of the steering assembly.

The first vertical adjustment assembly may comprise: a first mounting plate attached to a support wall of the materials handling vehicle, a first rail member attached to the first mounting plate, a first carriage assembly movably coupled to the first rail member and coupled to the first fixture structure, and a first locking gas spring coupled to the first fixture structure and the first mounting plate to control the vertical position of the first operator control assembly. The second vertical adjustment assembly may comprise: a second mounting plate attached to the support wall of the materials handling vehicle, a second rail member attached to the second mounting plate, a second carriage assembly movably coupled to the second rail member and coupled to the second fixture structure, and a second locking gas spring coupled to the second fixture structure and the second mounting plate to control the vertical position of the second operator control assembly.

In accordance with a fifth aspect of the present disclosure, an operator control system for a materials handling vehicle is provided, in which the materials handling vehicle comprises an operator station having a support structure and the operator control system comprises: an operator control assembly and a vertical adjustment assembly coupled to the operator control assembly to selectively support the operator control assembly at a plurality of vertical positions relative to the floorboard. The operator control assembly may comprise a housing mounted to the support structure and including a recess, a first elongate grip member mounted to the housing at at least one grip mount location and extending over the recess, and a first control element mounted to the housing within the recess, in which the first control element may be configured to control a function of the materials handling vehicle. The first elongate grip member may be replaceable with a second elongate grip member mounted to the housing at the at least one grip mount location and extending over the recess and having at least one of different dimensions or a different configuration than the first grip member.

The at least one grip mount location may comprise first and second grip mount locations, in which the first grip mount location may be on a first side of the recess and the second grip mount location may be on a second side of the recess opposite to the first side of the recess.

The support structure may comprise a fixed housing portion and a movable housing portion, in which the movable housing portion may be coupled to and movable with the operator control assembly and may be positioned to telescope over the fixed housing portion.

The operator control assembly may be continuously movable in a vertical direction between a first vertical position and a second vertical position.

The vertical adjustment assembly may comprise: a mounting plate attached to a support wall of the vehicle, a rail member attached to the mounting plate, a carriage assembly movably coupled to the rail member and coupled to the fixture structure, and a locking gas spring coupled to the fixture structure and the mounting plate to control the vertical position of the operator control assembly.

In accordance with a sixth aspect of the present disclosure, an operator control system for a materials handling vehicle is provided, in which the materials handling vehicle comprises an operator station having a support structure and the operator control system comprises: an operator control assembly and a vertical adjustment assembly coupled to the operator control assembly to selectively support the operator control assembly at a plurality of vertical positions relative to the floorboard. The operator control assembly may comprise a housing mounted to the support structure and including a recess, a first elongate grip member mounted to the housing and extending over the recess, and a first control element mounted to the housing within the recess, in which the first control element may be configured to control a function of the materials handling vehicle and may be positionable in a plurality of positions including two end positions. The first elongate grip member may be replaceable with a second elongate grip member extending over the recess and having at least one of different dimensions or a different configuration than the first grip member, and/or the first control element may be replaceable with a second control element that may be positionable in a plurality of positions including two end positions and having at least one of different dimensions or a different configuration than the first control element. A gap between adjacent portions of one of the first or the second control element and one of the first or the second grip member may fall within a range of from a minimum clearance distance to a maximum reach distance with the first or the second control element positioned in any one of its plurality of positions.

The first elongate grip member may be secured to the housing at first and second grip mount locations, in which the first grip mount location may be on a first side of the recess and the second grip mount location may be on a second side of the recess opposite to the first side of the recess.

In accordance with a seventh aspect of the present disclosure, an operator control system for a materials handling vehicle is provided, in which the materials handling vehicle comprises an operator station having a floorboard and a support structure and the operator control system comprises an operator control assembly comprising: a housing mounted to the support structure, a vertical adjustment assembly coupled to the operator control assembly to selectively support the operator control assembly at a plurality of vertical positions relative to the floorboard, and at least one of: a steering assembly for steering the materials handling vehicle or a fixture structure coupled to the support structure to selectively support the operator control assembly in a plurality of angular orientations relative to the support structure. The steering assembly may comprise a steering control structure and a base structure from which the steering control structure extends, in which the steering assembly may be movable with respect to the housing such that the steering assembly can be positioned in at least one of first or second positions. The steering control structure may extend from the base structure generally in a first orientation while in the first position and generally in a second orientation while in the second position, in which the second orientation may be different from the first orientation.

In accordance with an eighth aspect of the present disclosure, an operator control system for a materials handling vehicle is provided, in which the materials handling vehicle comprises an operator station having a floorboard and a support structure and the operator control system comprises an operator control assembly comprising: a housing mounted to the support structure and including a recess, a vertical adjustment assembly coupled to the operator control assembly to selectively support the operator control assembly at a plurality of vertical positions relative to the floorboard, and at least one of: a first control element mounted to the housing within the recess and a first elongate grip member mounted to the housing at at least one grip mount location and extending over the recess or a fixture structure coupled to the support structure to selectively support the operator control assembly in a plurality of angular orientations relative to the support structure. The first elongate grip member may be replaceable with a second elongate grip member having at least one of different dimensions or a different configuration than the first grip member, and the first control element may be replaceable with a second control element that is positionable in a plurality of positions including two end positions and having at least one of different dimensions or a different configuration than the first control element.

In accordance with a ninth aspect of the present disclosure, an operator control system for a materials handling vehicle is provided, in which the materials handling vehicle comprises an operator station having a floorboard, a first support structure, and a second support structure spaced apart from the first support structure in a lateral direction, and the operator control system comprises a first operator control assembly and a second operator control assembly. The first operator control assembly may comprise: a first housing mounted to the first support structure, a first vertical adjustment assembly coupled to the first operator control assembly to selectively support the first operator control assembly at a plurality of vertical positions relative to the floorboard, and at least one of: a steering assembly for steering the materials handling vehicle or a first fixture structure coupled to the first support structure to selectively support the first operator control assembly in a plurality of angular orientations relative to the first support structure. The steering assembly may comprise a steering control structure and a base structure from which the steering control structure extends, in which the steering assembly may be movable with respect to the housing such that the steering assembly can be positioned in at least one of first or second positions. The steering control structure may extend from the base structure generally in a first orientation while in the first position and generally in a second orientation while in the second position, in which the second orientation may be different from the first orientation. The second operator control assembly may comprise: a second housing mounted to the second support structure and including a recess, a second vertical adjustment assembly coupled to the second operator control assembly to selectively support the second operator control assembly at a plurality of vertical positions relative to the floorboard, and at least one of: a first control element mounted to the housing within the recess and a first elongate grip member mounted to the housing at at least one grip mount location and extending over the recess or a second fixture structure coupled to the second support structure to selectively support the second operator control assembly in a plurality of angular orientations relative to the second support structure. The first elongate grip member may be replaceable with a second elongate grip member having at least one of different dimensions or a different configuration than the first grip member, and the first control element may be replaceable with a second control element that is positionable in a plurality of positions including two end positions and having at least one of different dimensions or a different configuration than the first control element.

In accordance with a tenth aspect of the present disclosure, an operator control system is provided for a materials handling vehicle, the materials handling vehicle including an operator station having a support structure. The operator control system comprises an operator control assembly comprising: a housing mounted to or integral with the support structure, the housing including a recess; a first elongate grip member mounted to the housing and extending over the housing recess; and a first control element mounted to the housing within the recess, the first control element configured to control a function of the materials handling vehicle and positionable in a plurality of positions including two end positions. At least one of: the first elongate grip member is replaceable with a second elongate grip member extending over the housing recess and having at least one of different dimensions or a different configuration than the first grip member; or the first control element is replaceable with a second control element, the second control element being positionable in a plurality of positions including two end positions and having at least one of different dimensions or a different configuration than the first control element. A gap between adjacent portions of one of the first or the second control element and one of the first or the second grip member falls within a range of from a minimum clearance distance to a maximum reach distance with the first or the second control element positioned in any one of its plurality of positions.

The housing recess may have a curvilinear shape.

The first control element may be a switch or lever.

The first elongate grip member may be secured to the housing at first and second grip mount locations, with the first grip mount location being on a first side of the housing recess and the second grip mount location being on a second side of the housing recess opposite to the first side of the housing recess.

The first elongate grip member may include a third control element configured to control a function of the materials handling vehicle.

In accordance with an eleventh aspect of the present disclosure, an operator control system is provided for a materials handling vehicle, the materials handling vehicle including an operator station having a support structure. The operator control system comprises an operator control assembly comprising: a housing mounted to or integral with the support structure, the housing including a recess; a first elongate grip member mounted to the housing at at least one grip mount location and extending over the housing recess; and a first control element mounted to the housing within the recess, the first control element configured to control a function of the materials handling vehicle. The first elongate grip member is replaceable with a second elongate grip member mounted to the housing at the at least one grip mount location and extending over the housing recess and having at least one of different dimensions or a different configuration than the first grip member.

The housing recess may have a curvilinear shape.

In accordance with a twelfth aspect of the present disclosure, an operator control system is provided for a materials handling vehicle, the materials handling vehicle including an operator station having a first support structure. The operator control system comprises a first operator control assembly comprising: a first housing mounted to or integral with the first support structure, the first housing comprising a socket; and a steering assembly for steering the materials handling vehicle. The steering assembly comprises a steering control structure and a base structure from which the steering control structure extends. The base structure comprises a base plate and a mount coupled to the base plate, the mount being pivotably mounted within the socket of the first housing such that the steering assembly is movable between at least a first position and a second position. When in the first position, the steering control structure extends from the base structure generally in a first orientation, and when in the second position, the steering control structure extends from the base structure generally in a second orientation different from the first orientation.

The first housing may further comprise a control element area, and the steering assembly may move independently of the control element area. An orientation of the control element area with respect to the first support structure may remain unchanged regardless of whether the steering control assembly is in the first position or the second position.

The mount may have a semi-spherical shape and the socket may have a corresponding semi-spherical shape.

The base plate may include a plurality of indentations around a periphery of the base plate.

When the steering assembly is positioned in the first position, the steering control structure may be oriented at an acute angle relative to a vertical plane, wherein the vertical plane is perpendicular to a generally horizontal floor surface of the vehicle. When the steering assembly is positioned in the second position, the steering control structure may be oriented at an acute angle relative to a horizontal plane, wherein the horizontal plane is parallel to the generally horizontal floor surface of the vehicle.

The operator control system may further comprise a lock assembly for locking the steering assembly in the at least one of the first or second positions. The lock assembly may comprise a lock release structure for unlocking the lock assembly such that the steering assembly can be moved between the at least one of the first or second positions.

In accordance with a thirteenth aspect of the present disclosure, an operator control system is provided for a materials handling vehicle. The materials handling vehicle includes an operator station having a first support structure and a second support structure, wherein the first and second support structures are spaced apart from one another in a lateral direction of the materials handling vehicle, the lateral direction being perpendicular to a longitudinal axis of the materials handling vehicle. The operator control system comprises: a first operator control assembly supported on the first support structure via a first fixture structure that selectively supports the first operator control assembly in one of at least first and second angular orientations relative to the first support structure; and a second operator control assembly supported on the second support structure via a second fixture structure that selectively supports the second operator control assembly in one of at least first and second angular orientations relative to the second support structure. Positioning of the first and second operator control assemblies in the respective first or second angular orientation is dependent upon a spacing of the first support structure relative to the second support structure in the lateral direction.

The first and second fixture structures may each comprise a mounting plate coupled to the respective first or second support structure and a plurality of fasteners that extend through openings provided in the mounting plate. The fasteners may couple respective first and second housings of the first and second operator control assemblies to the corresponding support structures.

Each mounting plate may comprise one or more first openings and one more second openings. The first operator control assembly may be positioned at the first angular orientation relative to the first support structure when the fasteners are received in the one or more first openings of the mounting plate of the first fixture structure. The first operator control assembly may be rotated about a first axis generally parallel to a longitudinal axis of the materials handling vehicle when moved from the first angular orientation to the second angular orientation such that the first operator control assembly is mounted in the second angular orientation when the fasteners are received in the one or more second openings. The second operator control assembly may be positioned at the first angular orientation relative to the second support structure when the fasteners are received in the one or more first openings of the mounting plate of the second fixture structure. The second operator control assembly may be rotated about a second axis generally parallel to a longitudinal axis of the materials handling vehicle when moved from the first angular orientation to the second angular orientation such that the second operator control assembly is mounted in the second angular orientation when the fasteners are received in the one or more second openings.

The first housing may have a curved lower surface that is received by a curved upper surface of the first support structure and the second housing may have a curved lower surface that is received by a curved upper surface of the second support structure.

For a narrower width vehicle, the first and second operator control assemblies may be positioned in the first angular orientation, and for a wider width vehicle, the first and second operator control assemblies may be positioned in the second angular orientation.

In accordance with a fourteenth aspect of the present disclosure, an operator control system is provided for a materials handling vehicle, the materials handling vehicle comprising an operator station having a generally horizontal floor surface and a support structure. The operator control system comprises an operator control assembly supported by the support structure, and a vertical adjustment assembly coupled to the operator control assembly to selectively support the operator control assembly at a plurality of vertical positions on the support structure relative to the generally horizontal floor surface. The operator control system further comprises at least one of:

- a housing mounted to the support structure; and a steering assembly for steering the materials handling vehicle, the steering assembly comprising a steering control structure and a base structure from which the steering control structure extends, wherein the steering assembly is movable with respect to the housing such that the steering assembly can be positioned in at least one of first or second positions. While in the first position, the steering control structure extends from the base structure generally in a first orientation. While in the second position, the steering control structure extends from the base structure generally in a second orientation different from the first orientation;
- a fixture structure coupled to the support structure to selectively support the operator control assembly in a plurality of angular orientations relative to the support structure; or
- a housing mounted to the support structure, the housing comprising a recess; a first elongate grip member mounted to the housing at at least one grip mount location and extending over the recess; and a first control element mounted to the housing within the recess, the first control element configured to control a function of the materials handling vehicle. The first elongate grip member is replaceable with a second elongate grip member mounted to the housing at the at least one grip mount location and extending over the recess and having at least one of different dimensions or a different configuration than the first grip member.

Various aspects and embodiments of the present disclosure address various technical problems associated with a need for adjustable operator controls to provide ergonomic positioning for operators of varying height and to accommodate operator preference. The present disclosure provides a first technical solution which involves a steering assembly that is movable between at least two positions and is lockable in each position. The movable steering assembly rotates between positions to allow for quick and easy adjustment to accommodate varying operator heights and provide flexibility of use, e.g., adjustment based on operator preference, driving conditions, and/or a task to be performed. The steering assembly also moves independently of other control structures in the materials handling vehicle to avoid obstruction of the operator compartment and to prevent inadvertent contact between the steering assembly and the operator or other objects. Another technical solution involves an operator control assembly with one or more interchangeable components that may be replaced with a corresponding component having a different dimension and/or configuration to ensure ergonomic positioning and better accessibility to control elements. These components may be common across multiple different types or models of materials handing vehicles. The operator control assembly also includes an elongate grip member that provides a stable grip for the operator during operation of the materials handling vehicle. A further technical solution involves positioning of an operator control assembly at two or more angular orientations with respect to a support structure in order to provide ergonomic hand positioning based on, for example, a width of the materials handling vehicle. Yet another technical solution involves adjusting a vertical position of an operator control assembly to provide ergonomic positioning of the operator control assembly for different operators and to accommodate operator preference. Each of these adjustment features may be used alone or in combination with one or more other adjustment features. Further technical problems and corresponding solutions are set out herein.

BRIEF DESCRIPTION OF THE DRAWINGS

FIG. 19A is a partial cross-sectional view of the materials handling vehicle of FIG. 15, showing the mast assembly, non-horizontal viewing window, and the space between;

FIG. 19B is a cross-sectional view of FIG. 19A at line 19B-19B showing the mast assembly, non-horizontal viewing window, and the space between;

DETAILED DESCRIPTION

The following text sets forth a broad description of numerous different embodiments of the present disclosure. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. It should be understood that multiple combinations of the embodiments described and shown are contemplated and that a particular focus on one embodiment does not preclude its inclusion in a combination of other described embodiments. Numerous alternative embodiments could also be implemented, using either current technology or technology developed after the filing date of this patent, which would still fall within the scope of the claims. All publications and patents cited herein are incorporated herein by reference.

Figure 1:
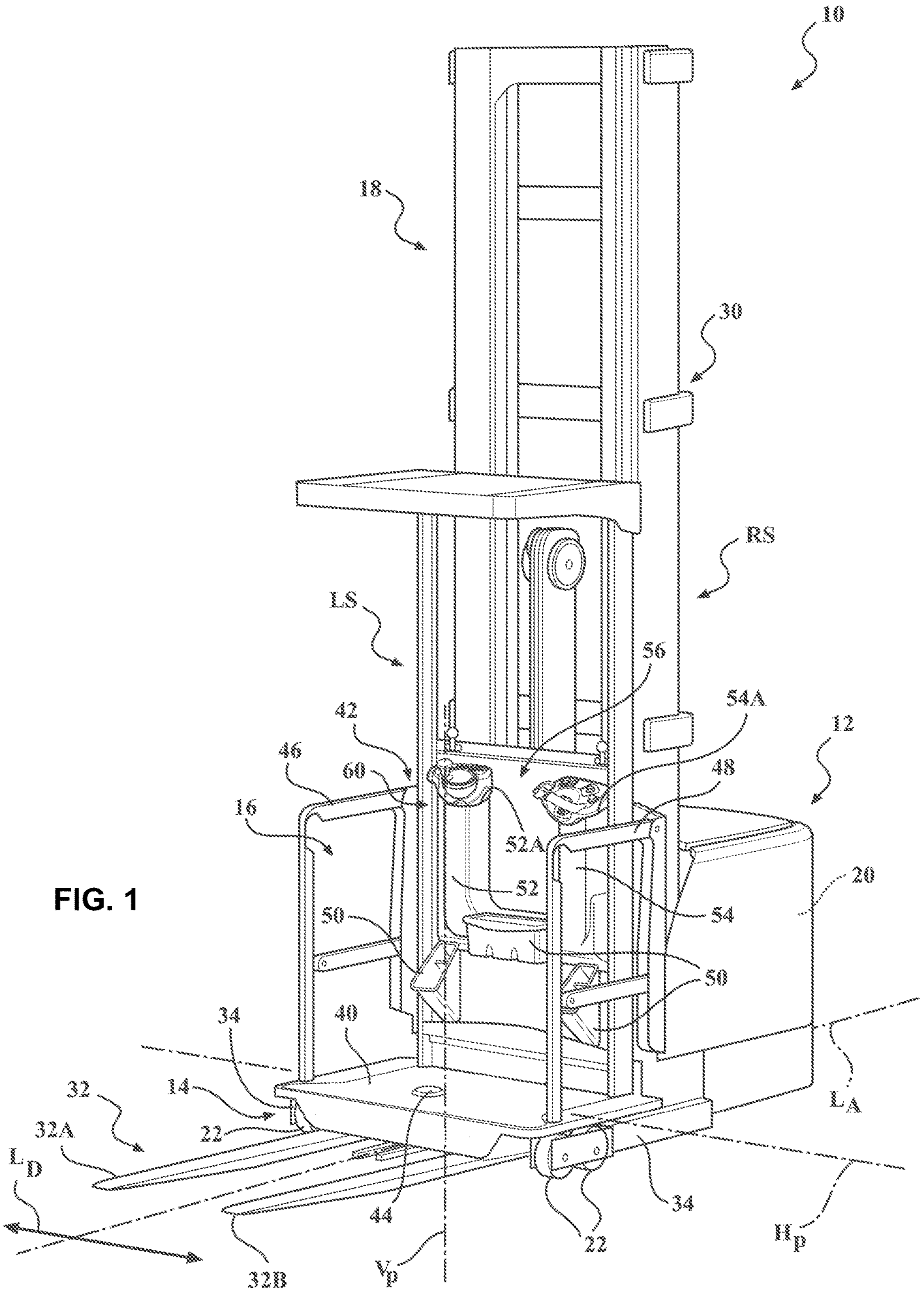
FIG. 1 is a perspective view of a materials handling vehicle including an operator control system according to embodiments.

Referring now to the drawings, FIG. 1 illustrates a materials handling vehicle 10 constructed in accordance with embodiments. In the illustrated embodiment, the vehicle 10 comprises a stockpicker, but could be another type of materials handing vehicle. The vehicle 10 includes a power unit 12, a platform assembly 14 including an operator compartment 16, and a load handling assembly 18. The power unit 12 includes a power source, such as a battery unit 20. The vehicle 10 includes a plurality of wheels 22 on which the vehicle 10 travels (one or more additional wheels are located underneath the power unit 12 but are not shown in FIG. 1). The load handling assembly 18 comprises a mast assembly 30 coupled to the power unit 12 on which the platform assembly 14 moves vertically, and further comprises fork structure 32 comprising a pair of forks 32A, 32B. The mast assembly 30 comprises one or more mast sections. Mast sections may also be referred to herein as weldments. The exemplary mast assembly 30 illustrated in FIG. 1 is a three-stage mast assembly, in which a carriage, to which the platform assembly 14 is attached, is raised via a primary ram/cylinder assembly coupled to the third mast section until it contacts the top of a third stage mast section, wherein hydraulic pressure in secondary ram/cylinder assemblies of the mast assembly 30 causes a second stage mast section and the third stage mast section to begin to raise. The first stage mast section is fixed to the power unit 12 and to a pair of outriggers 34 holding the wheels 22. As the second stage mast section is raised, the third stage mast section raises twice the distance.

The operator compartment 16 includes a floor surface 40 upon which an operator stands while operating the vehicle 10 from an operator station 42 located in the operator compartment 16. An operator presence sensor 44 in the form of a pressure switch that senses an operator's foot is provided in the floor surface 40. According to embodiments, one or more functions of the vehicle, such as traveling movement, raising/lowering the load handling assembly 18, etc. may be disabled unless the operator presence sensor indicates the presence of the operator in the operator compartment 16. First and second side restraints 46, 48 are provided at opposed left and right sides LS, RS of the operator compartment 16, the left and right sides LS, RS being spaced apart from one another in a lateral direction $L_D$ that is perpendicular to a longitudinal axis $L_A$ of the vehicle 10.

The operator station 42 may include one or more bins 50 in which the operator can store items. The bins 50 may be positioned anywhere in the operator station 42 and may be movable as desired. The operator station 42 further comprises a first support structure 52 and a second support structure 54 spaced apart from each other in the lateral direction $L_D$, see FIGS. 1 and 2. The first and second support structures 52, 54 are separated by a recessed portion 56 of the vehicle 10 that defines an open area extending downward from upper surfaces 52A, 54A of the first and second support structures 52, 54 toward the floor surface 40. In the illustrated embodiment, the open area extends to just above one of the bins 50.

Figure 2:
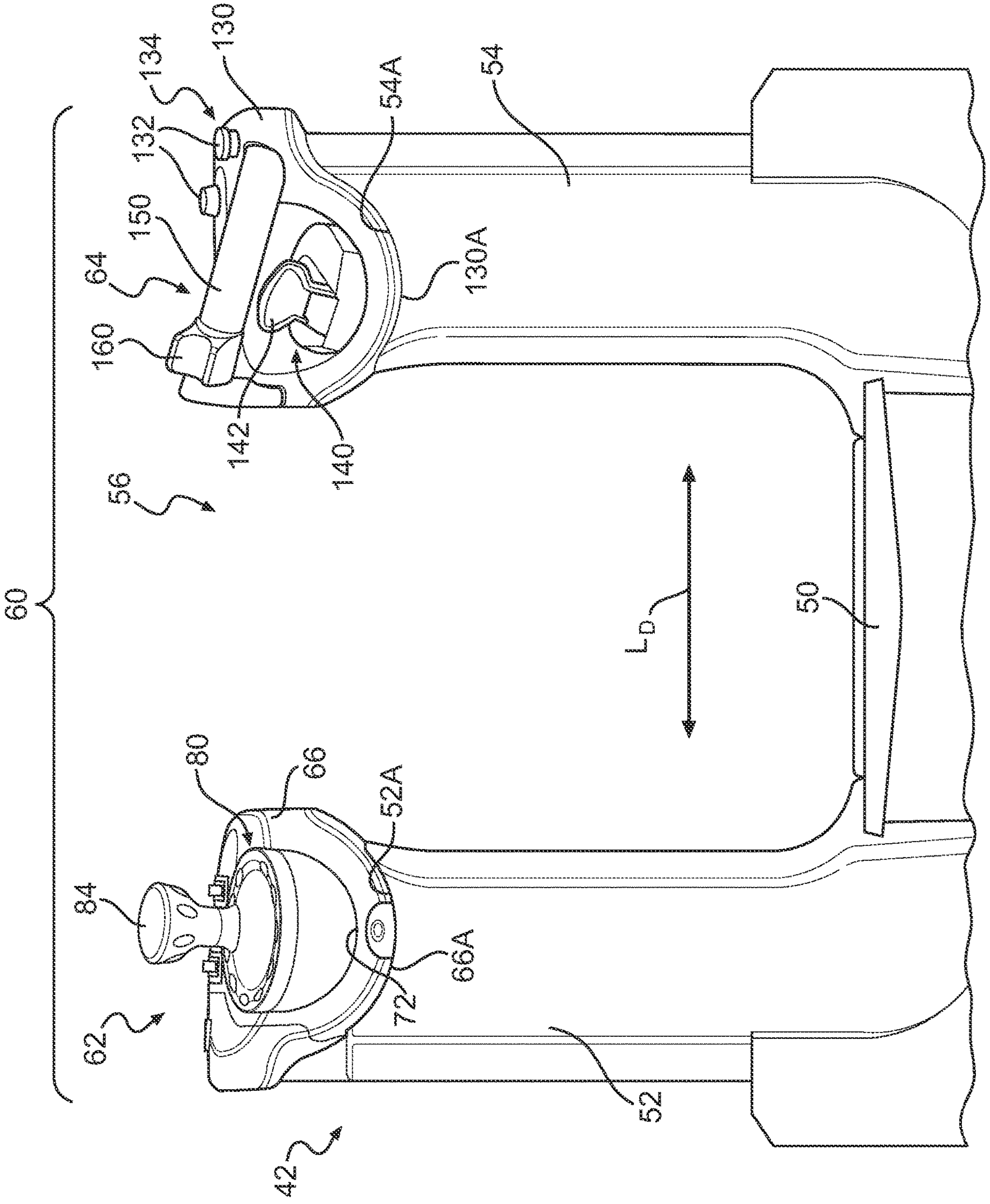
FIG. 2 is a front elevation view of the operator control system shown in FIG. 1.

An operator control system 60 is provided in the operator station 42. The operator uses the operator control system 60 to drive the vehicle 10 and to control one or more other vehicle functions as will be described in greater detail herein. With reference to FIG. 2, the operator control system 60 comprises a first operator control assembly 62 associated with the first support structure 52 and a second operator control assembly 64 associated with the second support structure 54. In the illustrated embodiment, the first operator control assembly 62 is provided to control steering of the vehicle 10 and optionally to control additional vehicle functions, and the second operator control assembly 64 is provided to control load handling assembly lift and lower functions and optionally other vehicle functions, as will be described in greater detail herein.

Figure 2A:
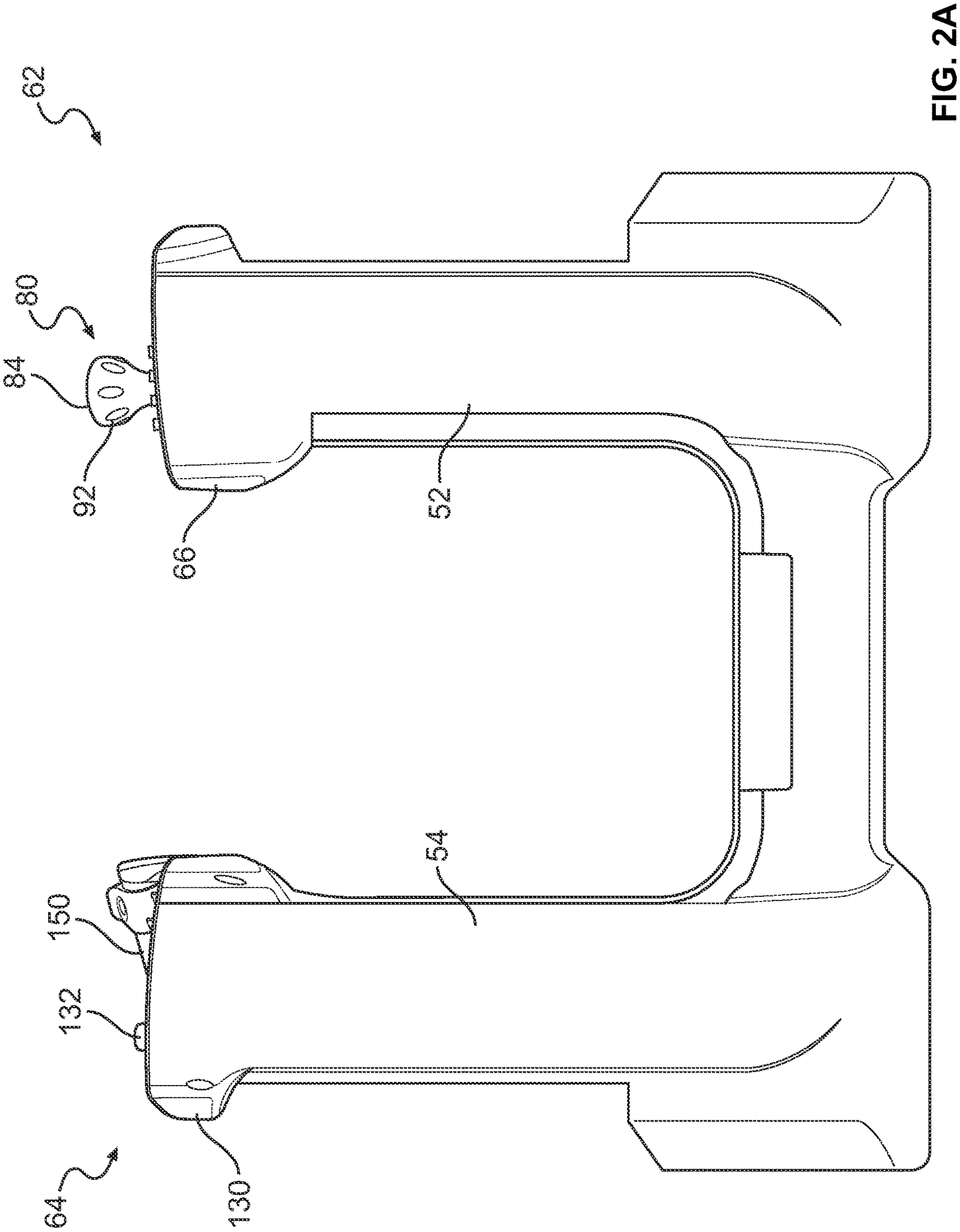
FIG. 2A is a back elevation view of an operator control system according to embodiments.

With reference to FIGS. 2-5, the first operator control assembly 62 comprises a first housing 66 separate from the first support structure 52 but mounted to the first support structure 52 via fasteners, adhesive, etc., although the first housing 66 could be integral with the first support structure 52 as shown in the alternate embodiment illustrated in FIG. 2A. One or more control elements 68, such as buttons, switches, levers, etc., may be provided on a control element area 70 of the first housing 66 for generating control signals to a vehicle electronic processor or controller to control respective functions of the vehicle 10, including, for example, accessories such as lights, fans, etc., function overrides, function confirmations, etc., i.e., the vehicle processor or controller may control functions of the vehicle 10 based on the control signals from the control elements 68. The control element area 70 may be generally planar as shown in FIGS. 2-5 or non-planar, and may include any number of control elements or no control elements.

The first housing 66 also includes a socket 72 or cavity that extends downwardly from the control element area 70 in a direction toward the floor surface 40 of the operator compartment 16 and inwardly into the first housing 66. The socket 72 may have a semi-spherical shape.

The first operator control assembly 62 further comprises a steering assembly 80 for steering the vehicle 10. The steering assembly 80 comprises a base structure 82 and a steering control structure 84 that extends outwardly from the base structure 82. The base structure 82 comprises a base plate 86 and a mount 88 coupled to the base plate 86, wherein the steering control structure 84 extends outwardly from the base plate 86. The base plate 86 may have a generally circular shape and is rotatably coupled to the mount 88 such that the base plate 86 can rotate relative to the mount 88. Turning of the vehicle 10 is accomplished by the operator using the steering control structure 84 to rotate the base plate 86 relative to the mount 88, i.e., the vehicle processor or controller may control a steer motor of the vehicle 10 based on control signals from the steering assembly 80 to set the turning angle of the vehicle 10. The base plate 86 may optionally include a plurality of indentations 90 around a periphery thereof. The operator may engage one or more of the indentations 90 with one or more fingers to rotate the base plate 86 relative to the mount 88 to turn the vehicle 10.

Figure 3:
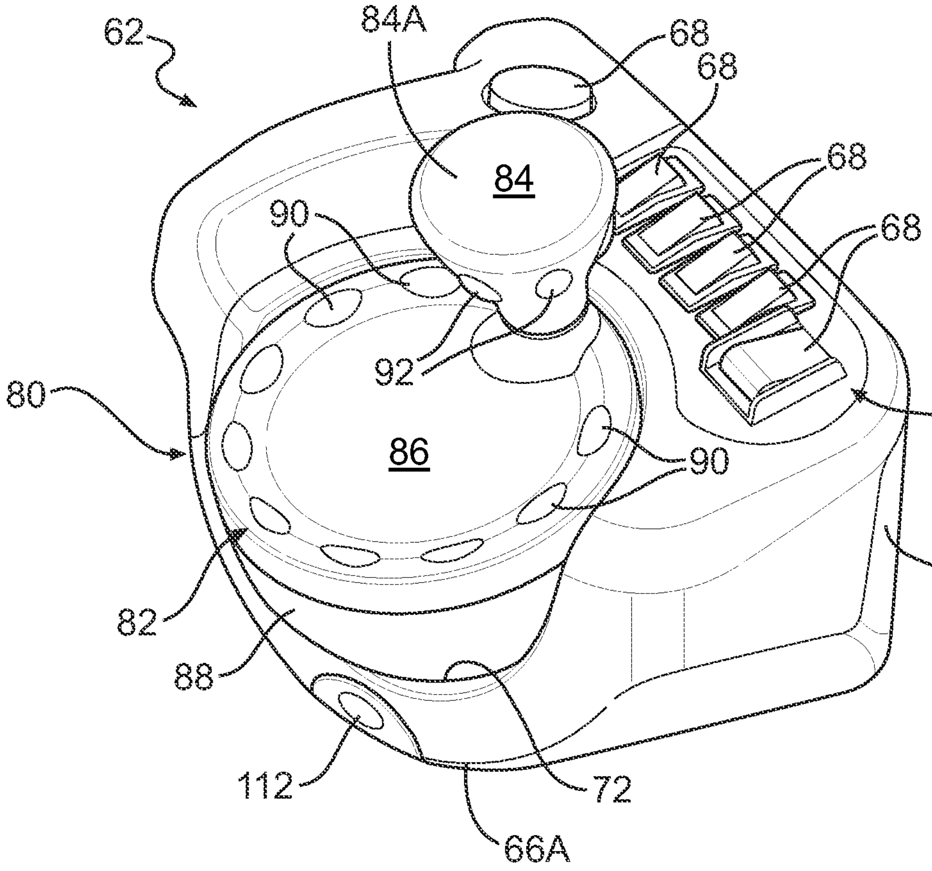
FIG. 3 is a perspective view of an operator control assembly of the operator control system shown in FIG. 2.
Figure 3A:
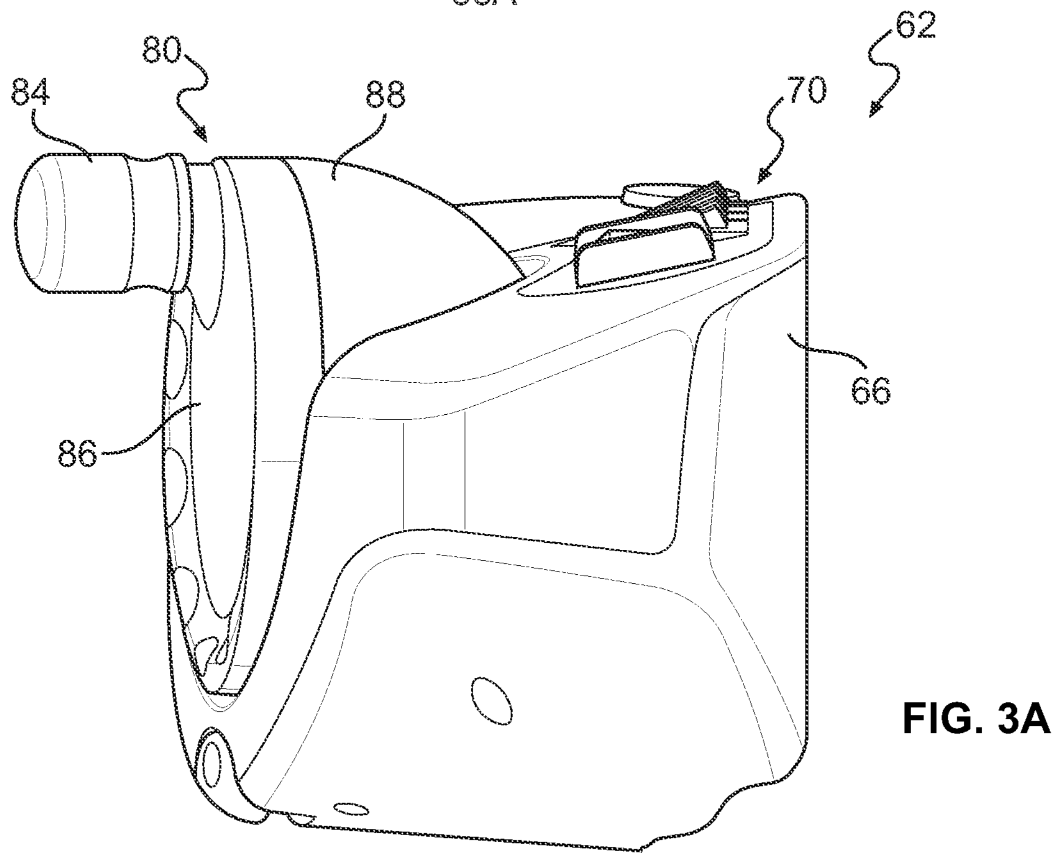
FIG. 3A is a perspective view of an operator control assembly according to embodiments.
Figure 4:
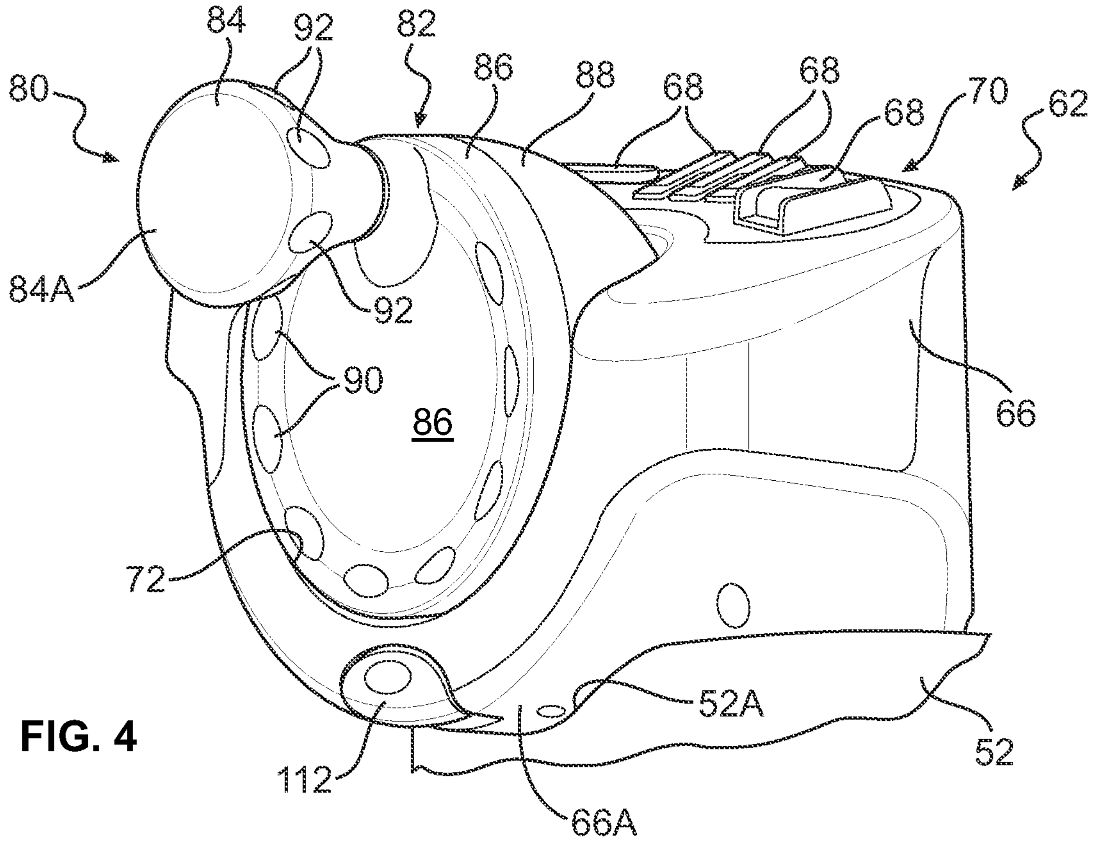
FIGS. 4 and 5 are perspective views of an operator control assembly of the operator control system shown in FIG. 2.
Figure 5:
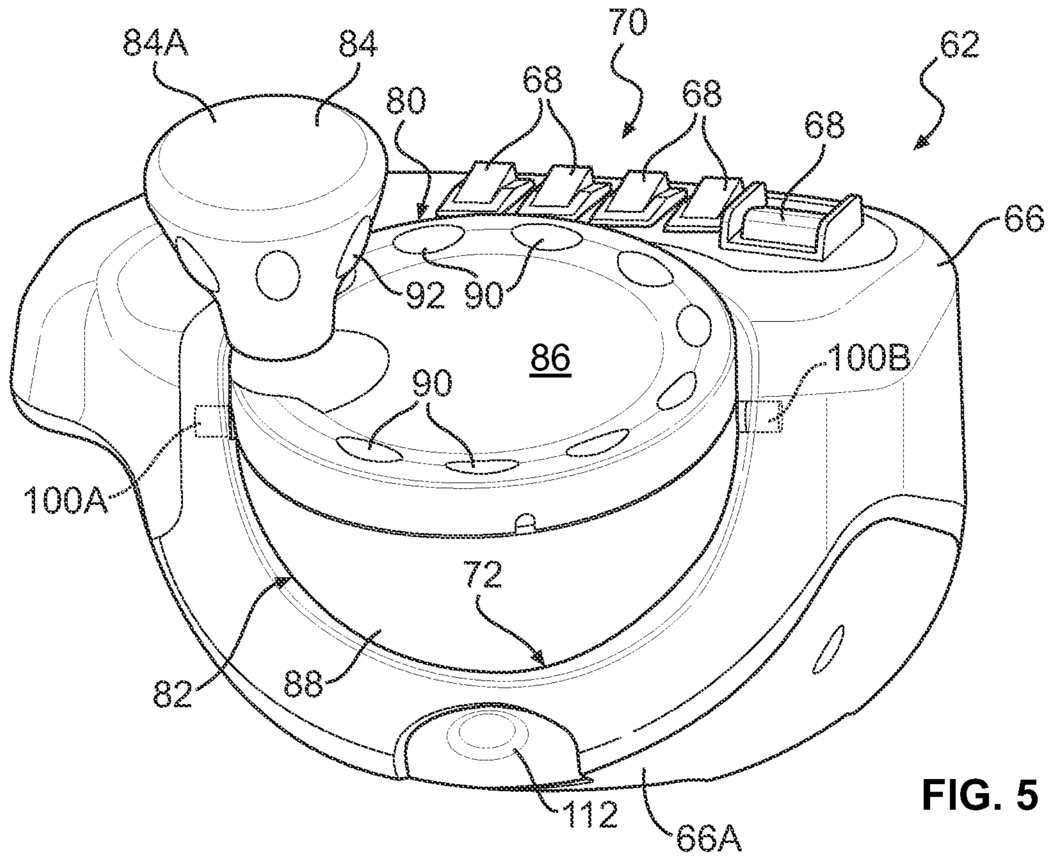

The steering control structure 84 may comprise a knob as shown in FIGS. 1-6 (FIG. 3A illustrates the steering control structure 84 in the form of a smaller knob in accordance with an embodiment), although the steering control structure 84 may have any suitable shape and configuration. In the illustrated exemplary embodiment, the steering control structure 84 includes a plurality of gripping elements 92 coupled to an outer surface of a main body 84A of the knob. The gripping elements 92 may be adhesively secured to the outer surface of the main body 84A of the knob or mounted within corresponding recesses within the main body 84A of the knob. The gripping elements 92 may be formed from a polymeric material different from that of the main body 84A, such as a thermoplastic elastomer (TPE), which enhances gripping between the operator and the knob during operation to steer the vehicle 10 using the steering assembly 80. The steering control structure 84 may be rotatably mounted to the base plate 86 such that the steering control structure 84 can rotate relative to the base plate 86. According to this aspect, the operator does not need to let go of the steering control structure 84 while turning the vehicle 10 using the steering control structure 84, since the steering control structure 84 rotates relative to the base plate 86 and the base plate 86 rotates relative to the mount 88.

As seen most clearly in FIGS. 3-6, the mount 88 is received in the socket 72 of the first housing 66 and may have a semi-spherical shape corresponding to the semi-spherical shape of the socket 72. The mount 88 may be secured to the first housing 66 via a pair of laterally spaced apart pivot supports or pins 100A, 100B, see FIG. 6. The pivot supports 100A, 100B permit the steering assembly 80 to pivotably rotate relative to the first housing 66, such that the steering assembly 80 is movable with respect to the first housing 66 and can be positioned in a plurality of different positions. According to one exemplary embodiment, the steering assembly 80 is movable between first and second positions, and can be locked in these two positions via a lock assembly 104, which will be described below.

While in the first position, shown in FIGS. 2, 3, and 5-7, the steering control structure 84 extends from the base structure 82 generally in a first orientation. In the first orientation, the steering control structure 84 is oriented at a first angle α relative to a first vertical plane $V_P$, see FIG. 7, wherein the first angle α may be an acute angle. With reference to FIG. 1, the vertical plane $V_P$ is perpendicular to the floor surface of the vehicle 10, which lies on a generally horizontal plane $H_P$. While in the second position, shown in FIGS. 4 and 8, the steering control structure 84 extends from the base structure 82 generally in a second orientation. In the second orientation, the steering control structure 84 is oriented at a second angle β relative to the generally horizontal plane $H_P$, see FIG. 8, wherein the second angle β may be an acute angle. According to one non-limiting exemplary working embodiment, the first angle α may be about 0 degrees to about 40 degrees (this example angle range includes zero (0) degrees), and the second angle β may be about −10 degrees to about 30 degrees (this example angle range includes zero (0) degrees as shown in FIG. 8, where the second angle β is parallel to the generally horizontal plane $H_P$). According to another non-limiting exemplary working embodiment, the first angle α may be about 10 degrees to about 30 degrees, and the second angle β may be about −5 degrees to about 15 degrees (this example angle range includes zero (0) degrees as shown in FIG. 8, where the second angle β is parallel to the generally horizontal plane $H_P$). In the first position, the steering control structure 84 and the base plate 86 rotate relative to the mount 88 in a plane that is closer to the generally horizontal plane $H_P$ than to the vertical plane $V_P$, and in the second position, the steering control structure 84 and the base plate 86 rotate relative to the mount 88 in a plane that is closer to the vertical plane $V_P$ than to the generally horizontal plane $H_P$.

Figure 6:
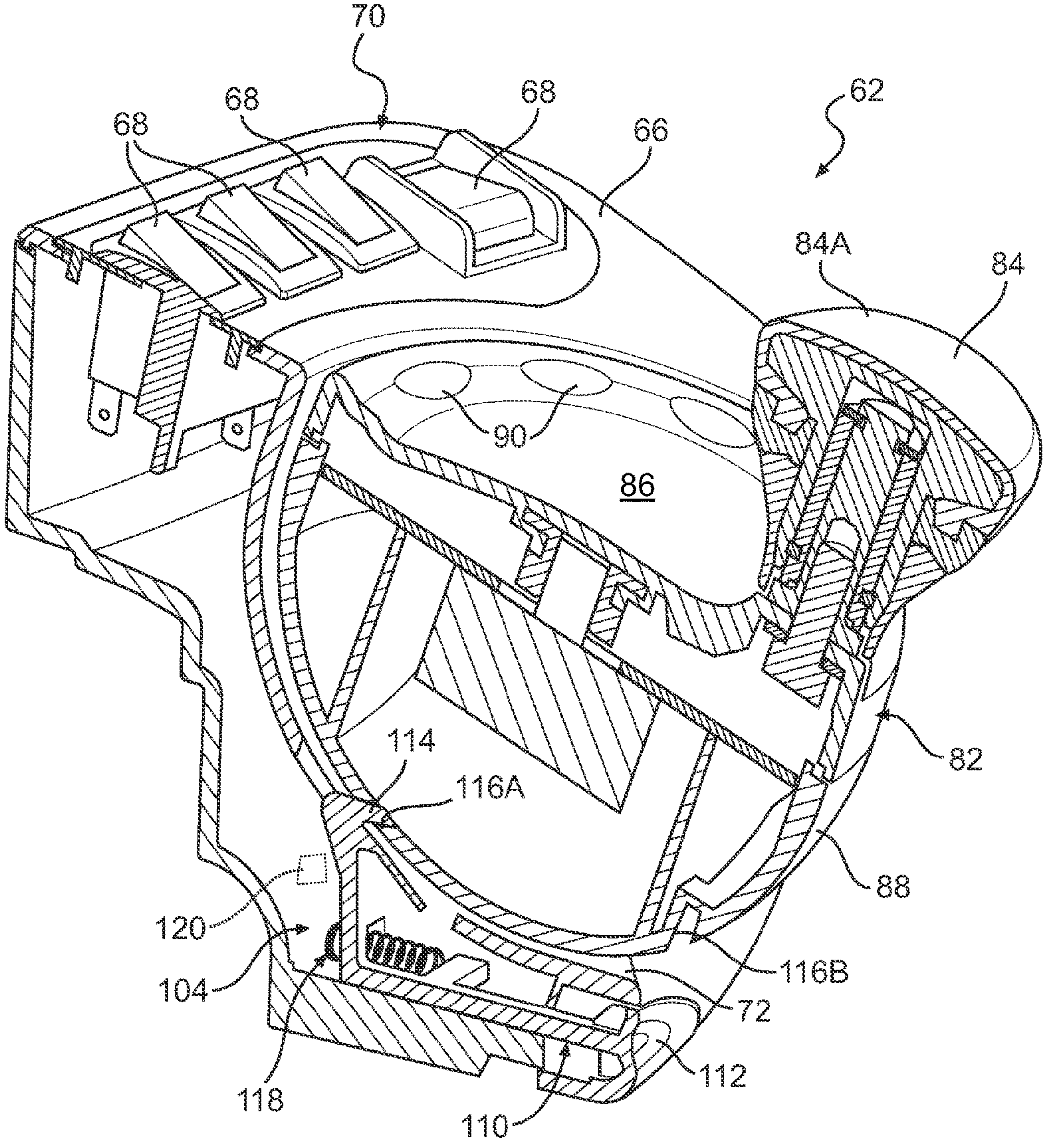
FIGS. 6-8 are cross sectional views of the operator control assembly shown in FIGS. 3-6.
Figure 7:
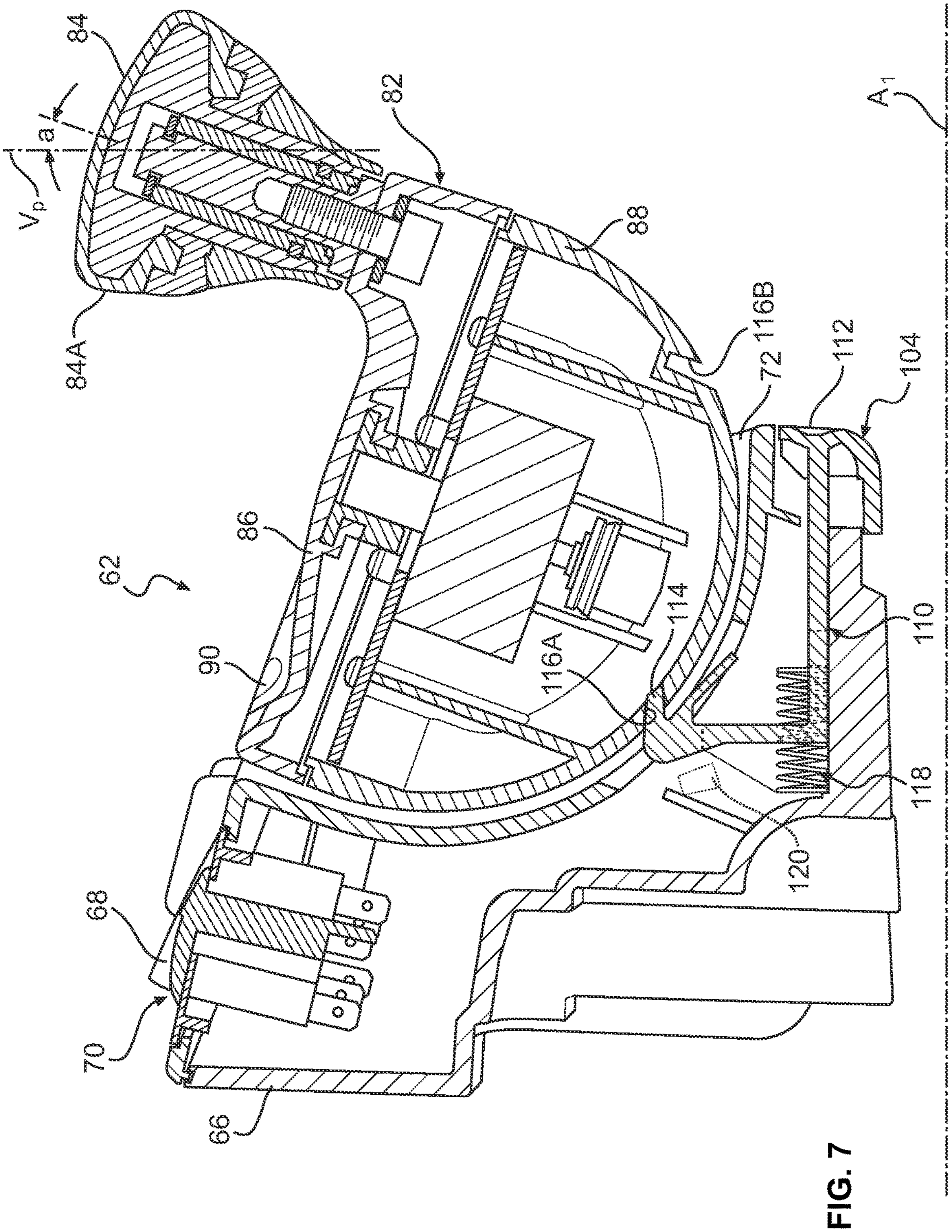
Figure 8:
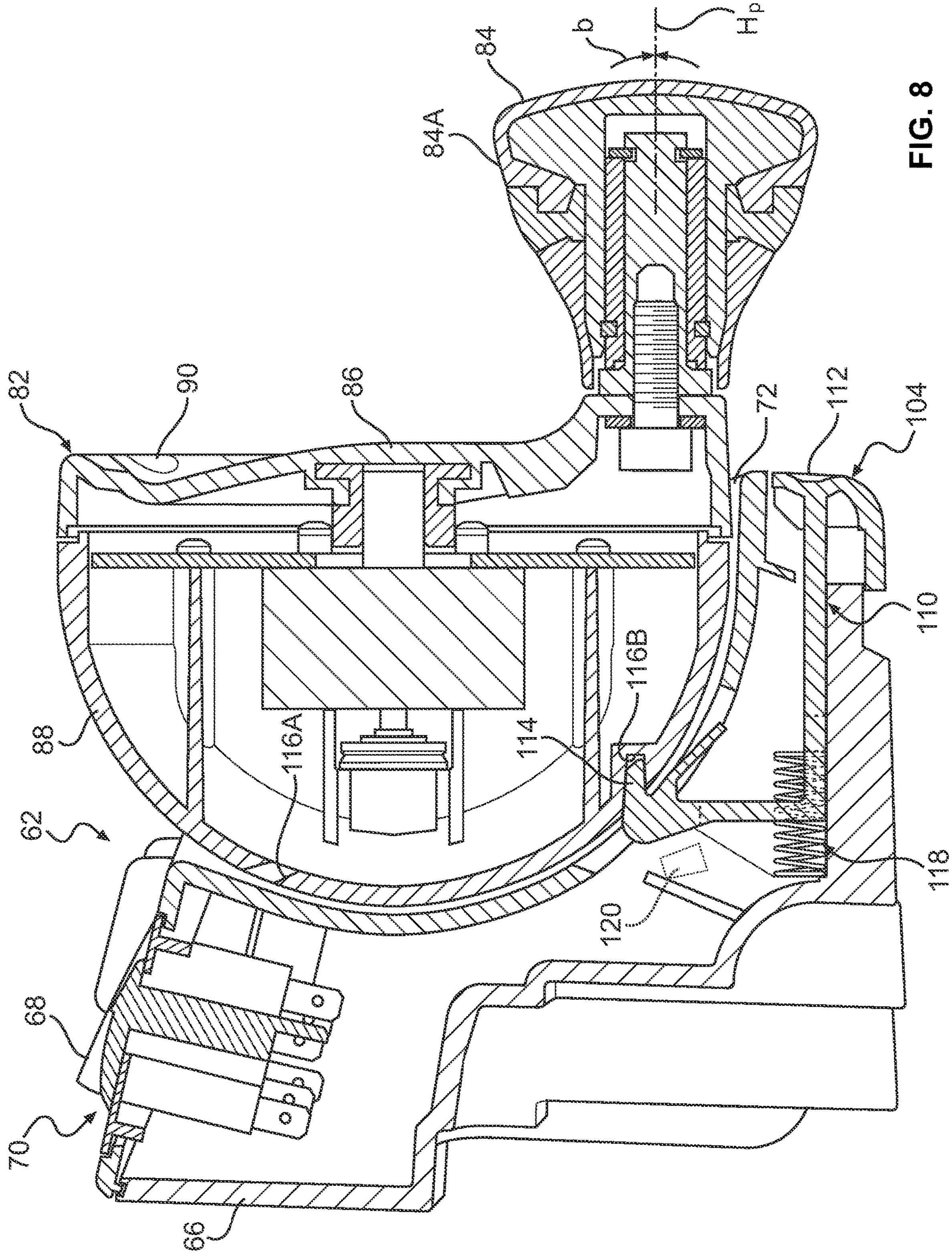

With reference to FIGS. 6-8, the lock assembly 104 comprises a lock release structure 110 having an actuating portion 112 that is actuated by an operator to unlock the lock assembly 104 such that the steering assembly 80 can be moved between its plurality of positions. In the illustrated embodiment, when the operator presses the actuating portion 112, a locking protuberance 114 of the lock release structure 110 is withdrawn from a respective locking slot 116A or 116B formed in the mount 88 into a released position, wherein each locking slot 116A, 116B corresponds to a corresponding position of the steering assembly 80. In the illustrated embodiment having the first and second steering assembly positions discussed above, the mount 88 includes two locking slots 116A and 116B, one locking slot 116A corresponding to the first position of the steering assembly 80 and the other locking slot 116B corresponding to the second position of the steering assembly 80. If more steering assembly positions are desired, the mount 88 can include additional locking slots to lock the steering assembly 80 into the different positions. When the locking protuberance 114 is withdrawn from a locking slot 116A or 116B, i.e., when the lock assembly 104 is moved into the released position, pivoting movement of the steering assembly 80 relative to the mount 88 is permitted, and when the locking protuberance 114 is inserted into a locking slot 116A or 116B, i.e., when the lock assembly 104 is in a locked position, pivoting movement of the steering assembly 80 relative to the mount 88 is prevented. FIG. 7 depicts the lock assembly 104 in a locked position with the steering assembly 80 in the first position, and FIG. 8 depicts the lock assembly 104 in a locked position with the steering assembly 80 in the second position.

The lock assembly 104 may further comprise a spring 118 that biases the lock release structure 110 toward the locked position, such that the locking protuberance 114 is inserted into a locking slot 116A or 116B if the locking protuberance 114 is properly aligned with a locking slot 116A or 116B.

The lock assembly 104 may additionally comprise a sensor 120, such as a snap action microswitch sensor, for sensing if the steering assembly 80 is in one of the first or second locked positions or is in the released position. The sensor 120 may function, for example, by sensing whether the lock assembly 104 is in the released position or the locked position, or by sensing a surface on the lock release structure 110. For example, when the locking protuberance 114 of the lock release structure 110 has been moved out of one of the locking slots 116A and 116B, such that the locking protuberance 114 may be in engagement with an outer surface 88A of the mount 88, the sensor 120 will sense the lock release structure 110 in its released position and provide a corresponding signal to the vehicle electronic processor or controller. One or more functions of the vehicle 10, such as travelling movement, raising/lowering the load handling assembly 18, etc., may be disabled by the vehicle processor or controller if the sensor 120 detects that the steering assembly 80 is not locked in one of the first or second positions.

The steering assembly 80 may move independently of the first support structure 52 and the first housing 66, which helps to keep the operator compartment 16 free of obstruction and to prevent inadvertent contact between the operator control assembly 62 and the operator or other object(s), particularly when the steering assembly 80 is in the second position. For example, when the steering assembly 80 pivots about the pivot supports 100A, 100B from the first position (shown in FIGS. 3 and 5-7) to the second position (shown in FIGS. 3A, 4, and 8), it can be seen that only the steering assembly 80 moves. The first support structure 52 and the first housing 66 remain in a same position when the steering assembly 80 is in the first position, as compared to when the steering assembly 80 is in the second position, such that these structures do not protrude into the operator compartment 16. Additionally, because the steering assembly 80 moves independently of the control element area 70 of the first housing 66, an orientation of the control element area 70 with respect to the first support structure 52 is the same when the steering assembly 80 is in the first position, as compared to when the steering assembly 80 is in the second position, such that the control element area 70 may be easier for the operator to utilize while operating the vehicle 10.

Figure 9:
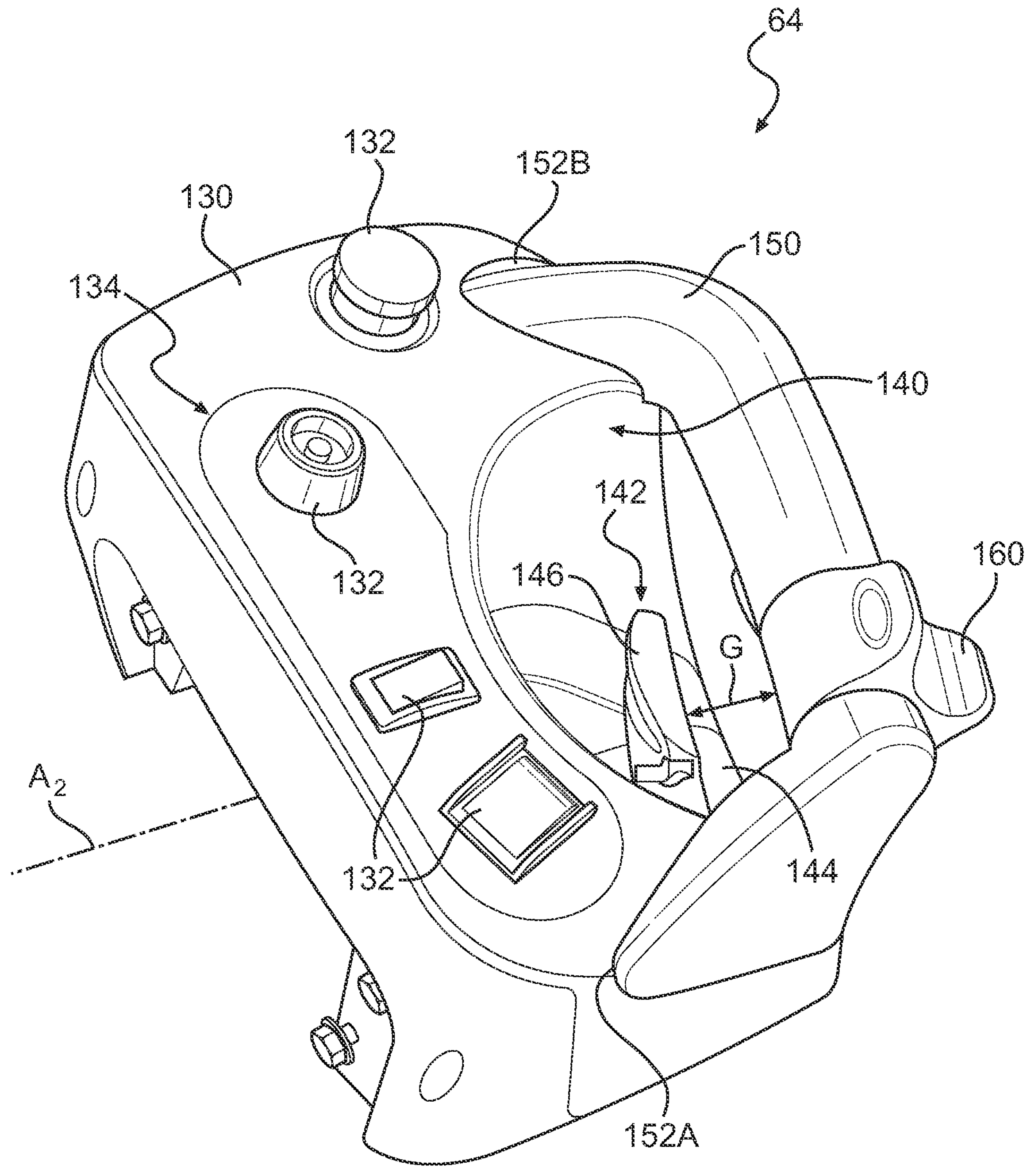
FIG. 9 is a perspective view of another operator control assembly of the operator control system shown in FIG. 2.
Figure 10A:
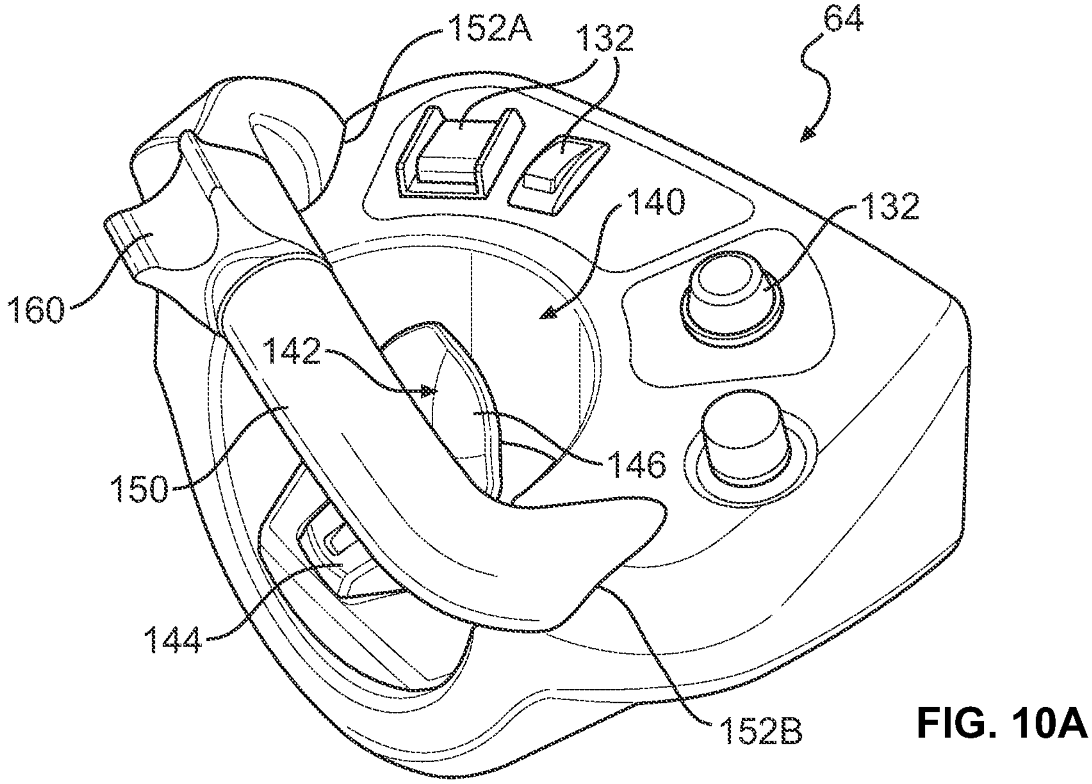
FIGS. 10A and 10B are perspective views of operator control assemblies according to embodiments.
Figure 10B:
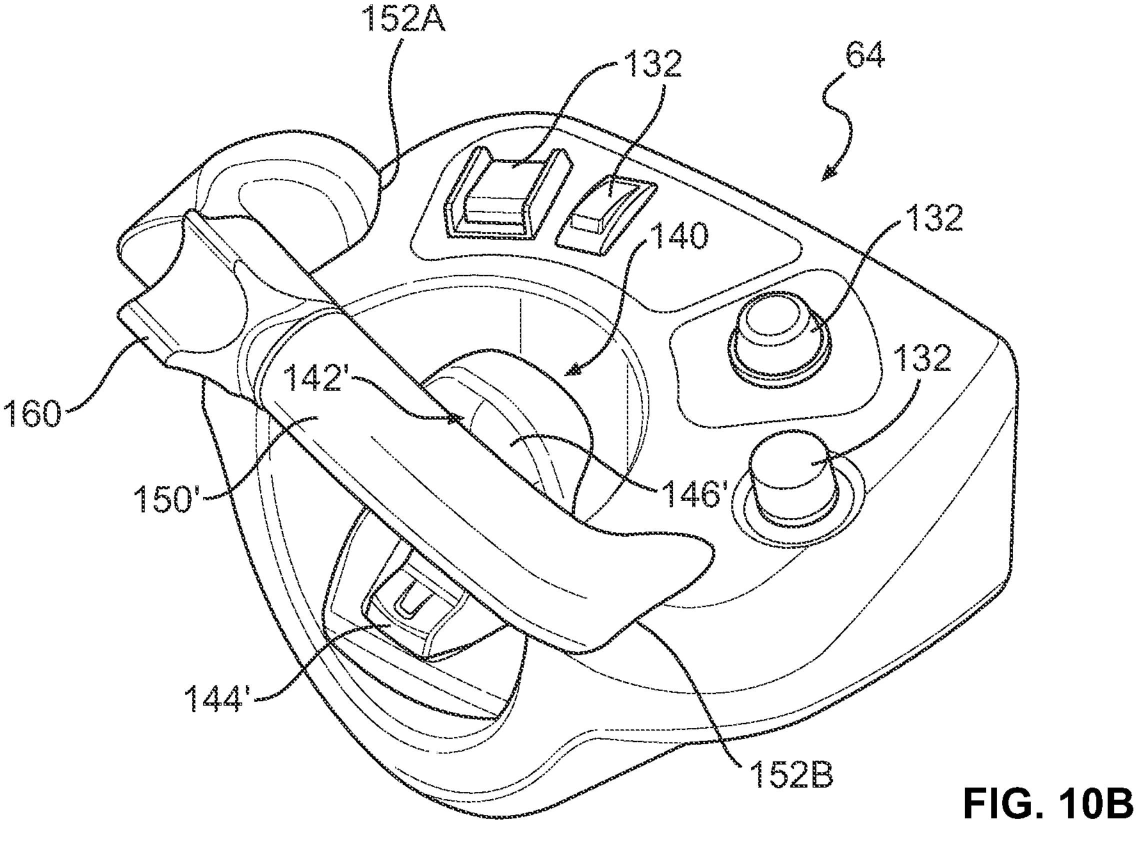

Turning now to FIG. 9, the second operator control assembly 64 comprises a second housing 130 separate from the second support structure 54 but mounted to the second support structure 54 (see FIG. 2) via fasteners, adhesive, etc., although the second housing 130 could be integral with the second support structure 54, as shown in the alternate embodiment illustrated in FIG. 2A. One or more control elements 132, such as buttons, switches, levers, etc., may be provided on a control element area 134 of the second housing 130 for generating control signals to the vehicle processor or controller to control respective functions of the vehicle 10, such as, for example, a horn, an emergency stop, a control for an interactive display, etc., i.e., the vehicle processor or controller may control functions of the vehicle 10 based on the control signals from the control elements 132. The control element area 134 may include any number of control elements or no control elements.

The second operator control assembly 64 further comprises a housing recess 140 that extends downwardly from the control element area 134 in a direction toward the floor surface 40 of the operator compartment 16. The housing recess 140 may have a curvilinear shape.

A control element 142 of the second operator control assembly 64 is mounted to the second housing 130 and extends outwardly from the housing recess 140. In the illustrated embodiment, the control element 142 comprises a base portion 144 and switch or lever 146 extending from the base portion 144. The control element 142 generates corresponding control signals to the vehicle processor or controller to control lift and lower functions of the load handling assembly 18, although the control element 142 could be used for other functions as desired. The control element 142 is positionable in a plurality of positions including two end positions, wherein a first one of the two end positions comprises a position in which the control element 142 is pushed forward until it reaches a first stop limit, and a second one of the two end positions comprises a position in which the control element 142 is pulled backward until it reaches a second stop limit. The control element 142 may also be positionable in other positions between the two end positions, including in default position, wherein the control element 142 may be located in a default position when not being pushed or pulled toward one of the two end positions.

The second operator control assembly 64 further comprises an elongate grip member 150 mounted to the second housing 130 and extending over the housing recess 140. The grip member 150 is mounted to the second housing 130 at least one grip mount location proximate to the housing recess 140. In the illustrated embodiment, the grip member 150 is fixedly mounted to the second housing 130 at first and second grip mount locations 152A, 152B located on opposed lateral sides of the housing recess 140. The grip member 150 may be grasped by the operator's hand while the operator is driving the vehicle 10 and/or when the operator is operating the control element 142.

As shown in FIG. 9, a gap G is defined between a surface of the control element 142 located closest to the grip member 150 and a surface of the grip member 150 located closest to the control element 142. The gap G is at all times preferably within a range of from a minimum clearance distance to a maximum reach distance. That is, the gap G is preferably always within this range whether the control element 142 is positioned in the first end position, the second end position, the default position, or any position between these defined positions. The range is selected such that the operator's finger will not be pinched between the control element 142 and the grip member 150 while the control element 142 is in any position, i.e., the gap G is greater than or equal to the minimum clearance distance, but also such that the control element 142 in any position is within reach of the operator's finger while grasping the grip member 150, i.e., the gap G is less than or equal to the maximum reach distance. According to one non-limiting exemplary working embodiment, the minimum clearance distance may be about 15 mm, and the maximum reach distance may be about 50 mm, and according to another non-limiting exemplary working embodiment, the minimum clearance distance may be about 30 mm, and the maximum reach distance may be about 40 mm, although these values may be different than the exemplary values provided, such as, for example, when the vehicle 10 is intended for use by operators wearing thick gloves, in which case these values may be larger than the exemplary values provided.

According to one embodiment, one or both of the first (or original) control element 142 and/or the grip member 150 can be removed and replaced with a second (or replacement) control element and/or grip member while the gap G is maintained within the range between the minimum clearance distance and the maximum reach distance regardless of whether the original or replacement components are in place. The replacement control element and/or replacement grip member may have different dimensions and/or different configurations than the original (replaced) control element 142 and/or grip member 150. FIGS. 10A to 11F illustrate this aspect.

Figure 11A:
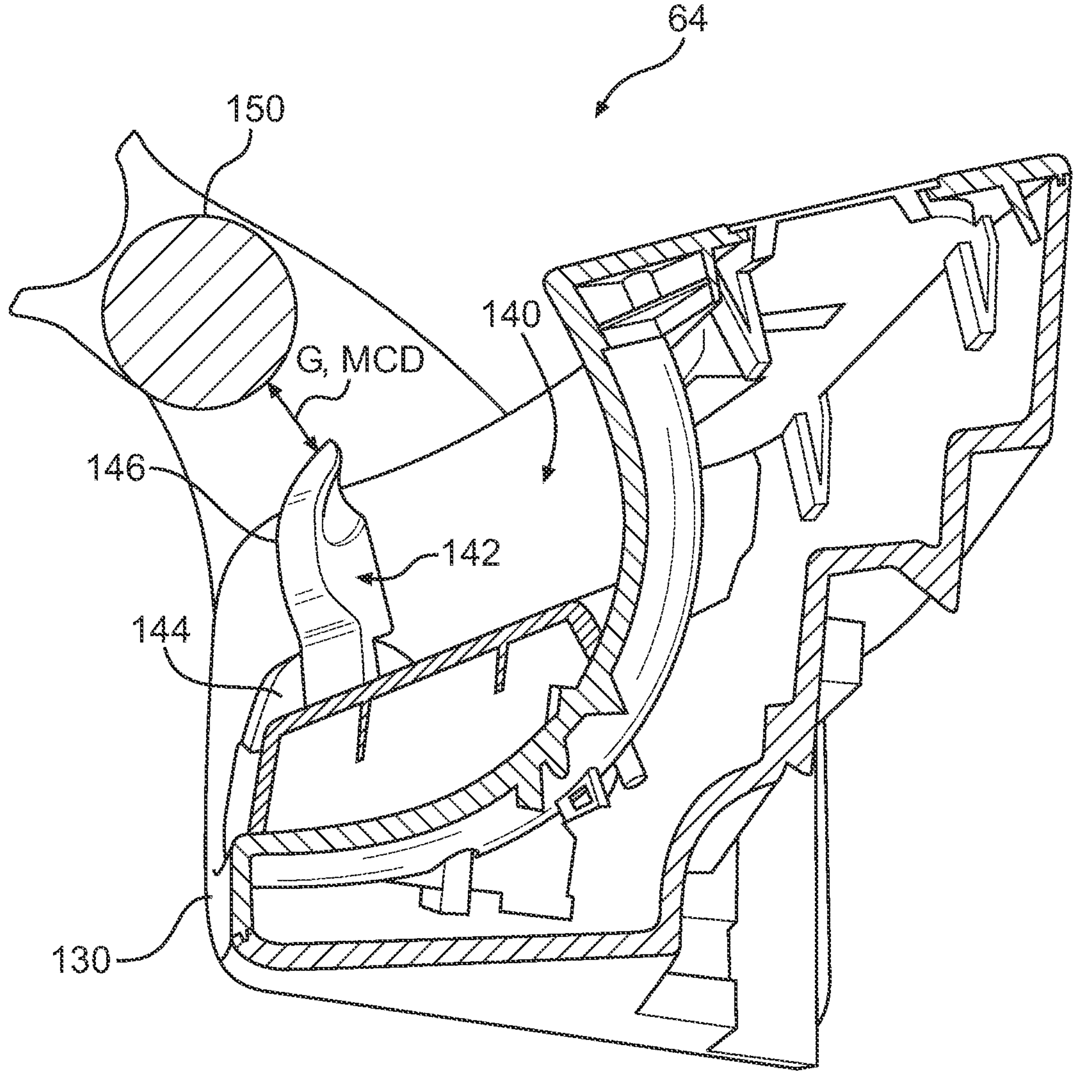
FIGS. 11A-11F are cross sectional views of operator control assemblies according to embodiments.
Figure 11B:
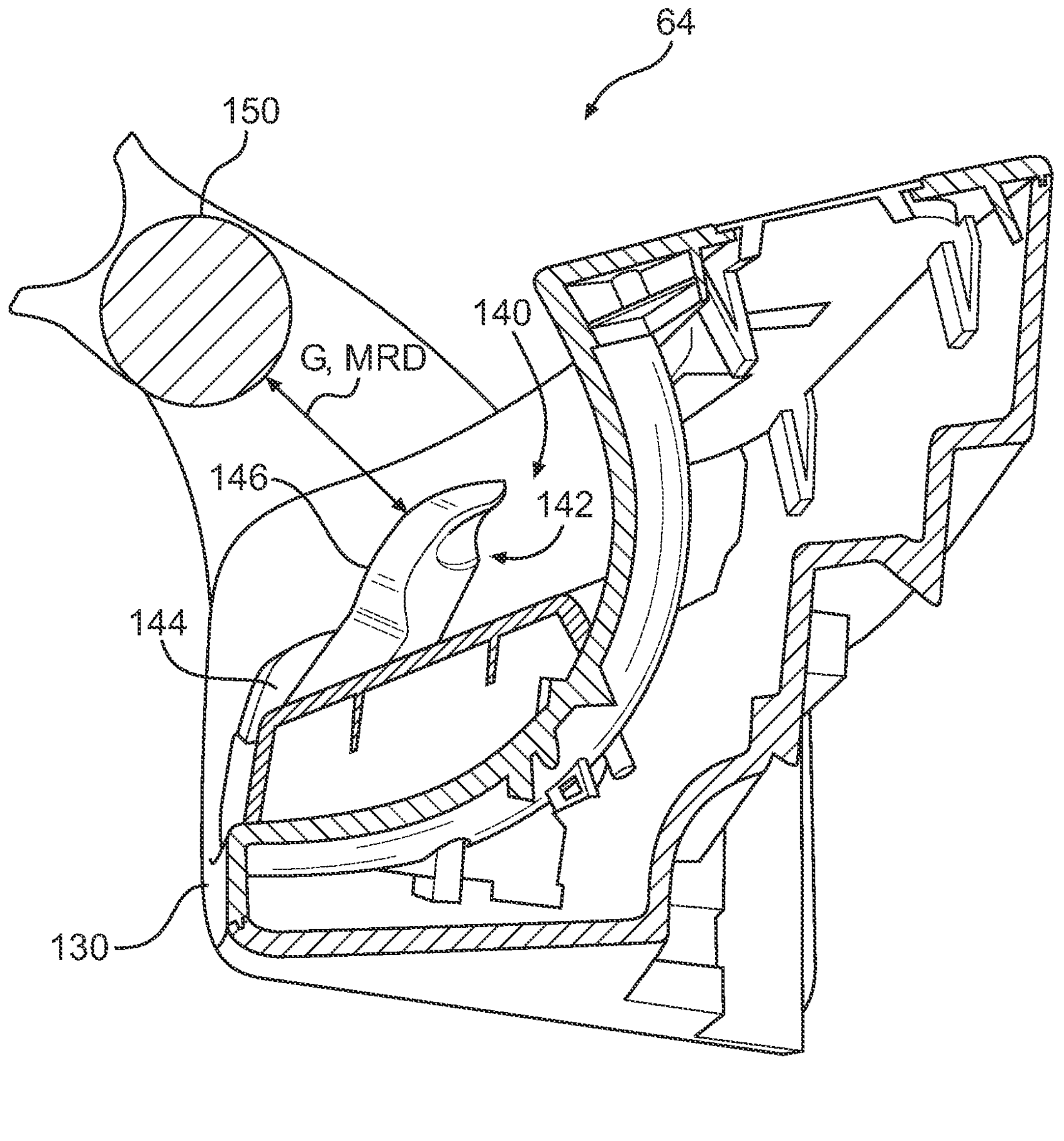
Figure 11C:
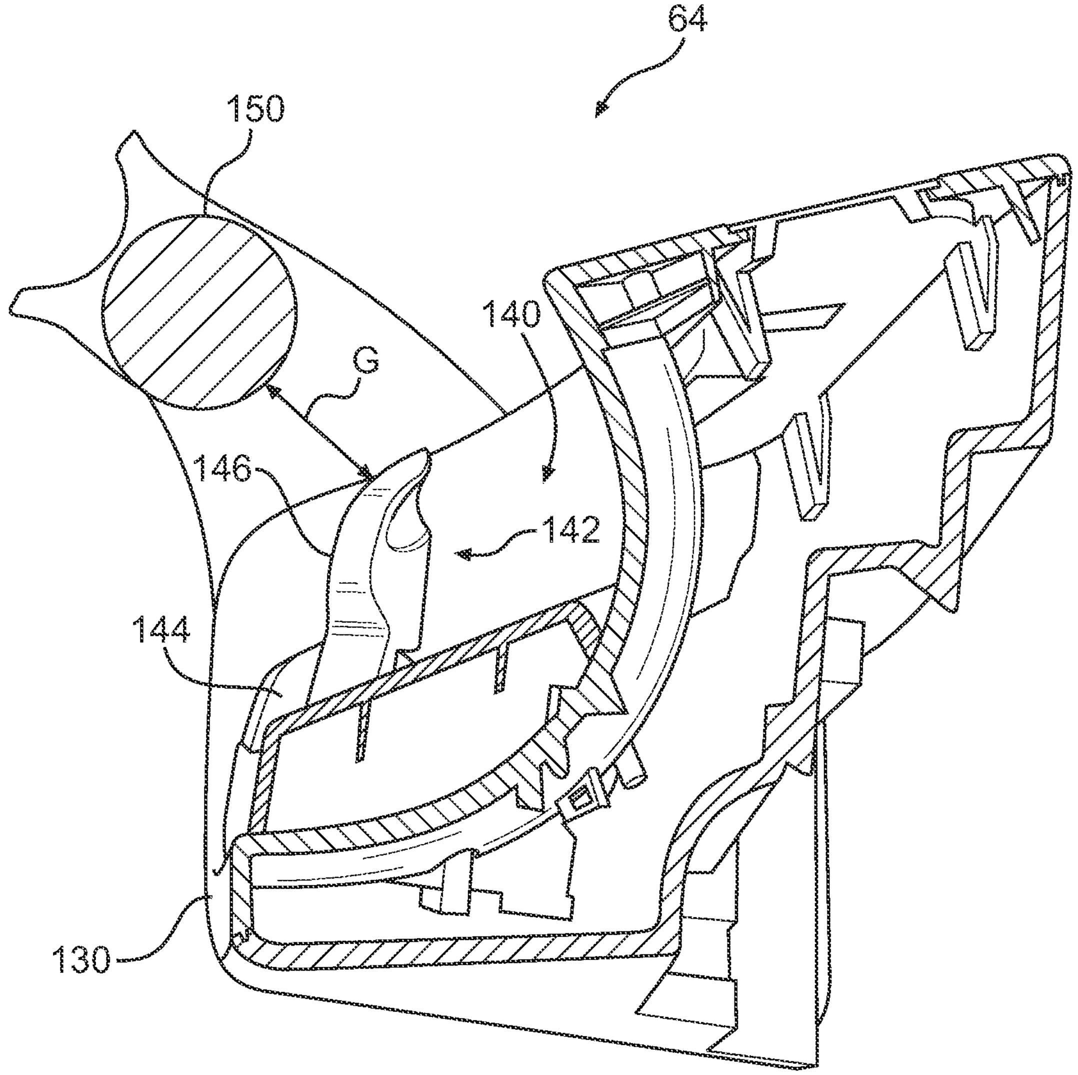

In a first embodiment of FIGS. 10A and 11A-11C, the second operator control assembly 64 includes an original control element 142 and an original grip member 150, also referred to herein as a first control element 142 and a first grip member 150. FIG. 11A shows the first control element 142 in the first end position, FIG. 11B shows the first control element 142 in the second end position, and FIG. 11C shows the first control element 142 in the default position. While the first control element 142 is in the first end position shown in FIG. 11A, the gap G is a first distance that is greater than the minimum clearance distance (depicted in FIG. 11A as MCD). While the first control element 142 is in the second end position shown in FIG. 11B, the gap G is a second distance less than the maximum reach distance (depicted in FIG. 11B as MRD). While the first control element 142 is in the default position shown in FIG. 11C, the gap G is a third distance intermediate the first and second distances.

Figure 11D:
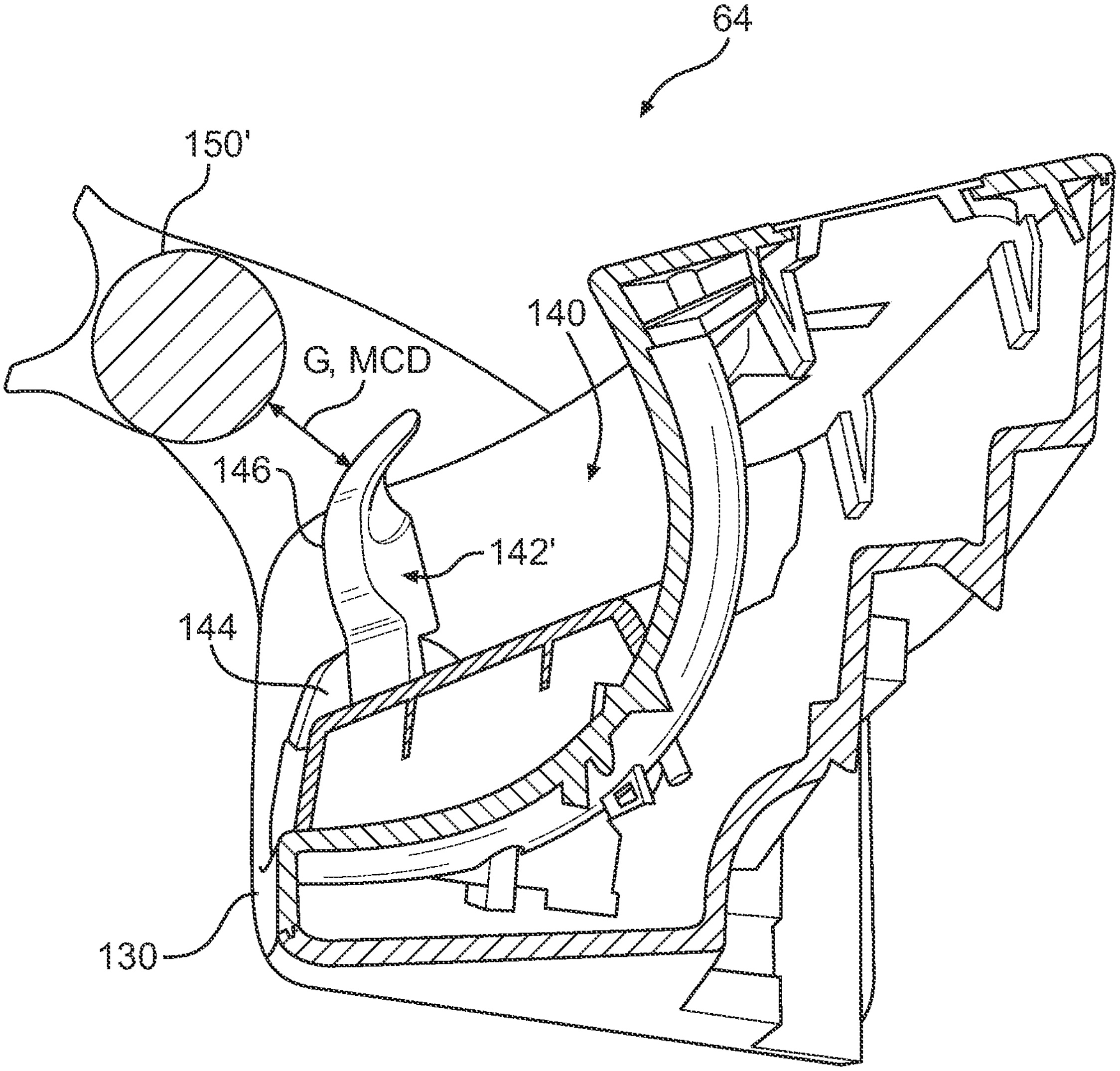
Figure 11E:
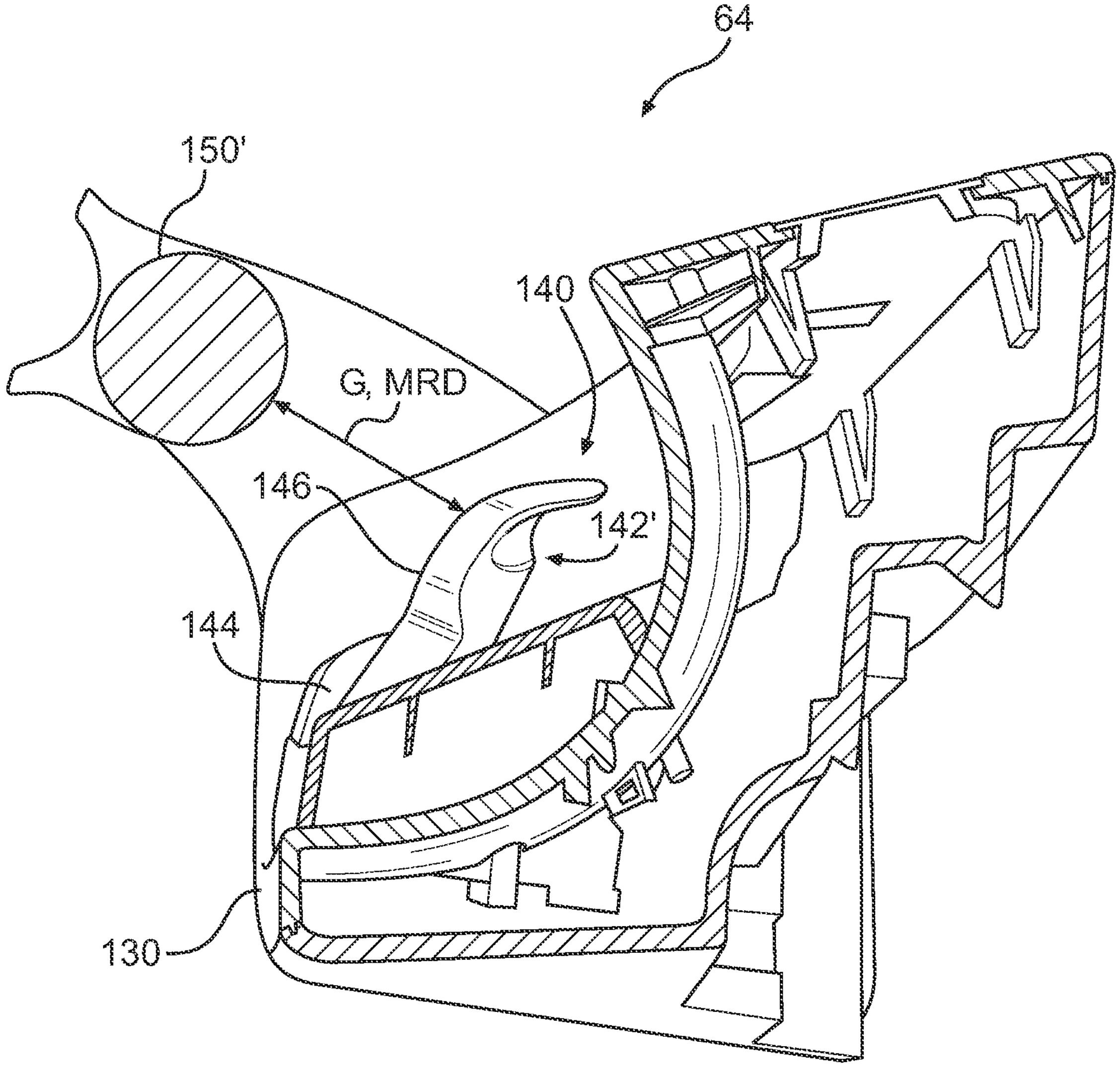
Figure 11F:
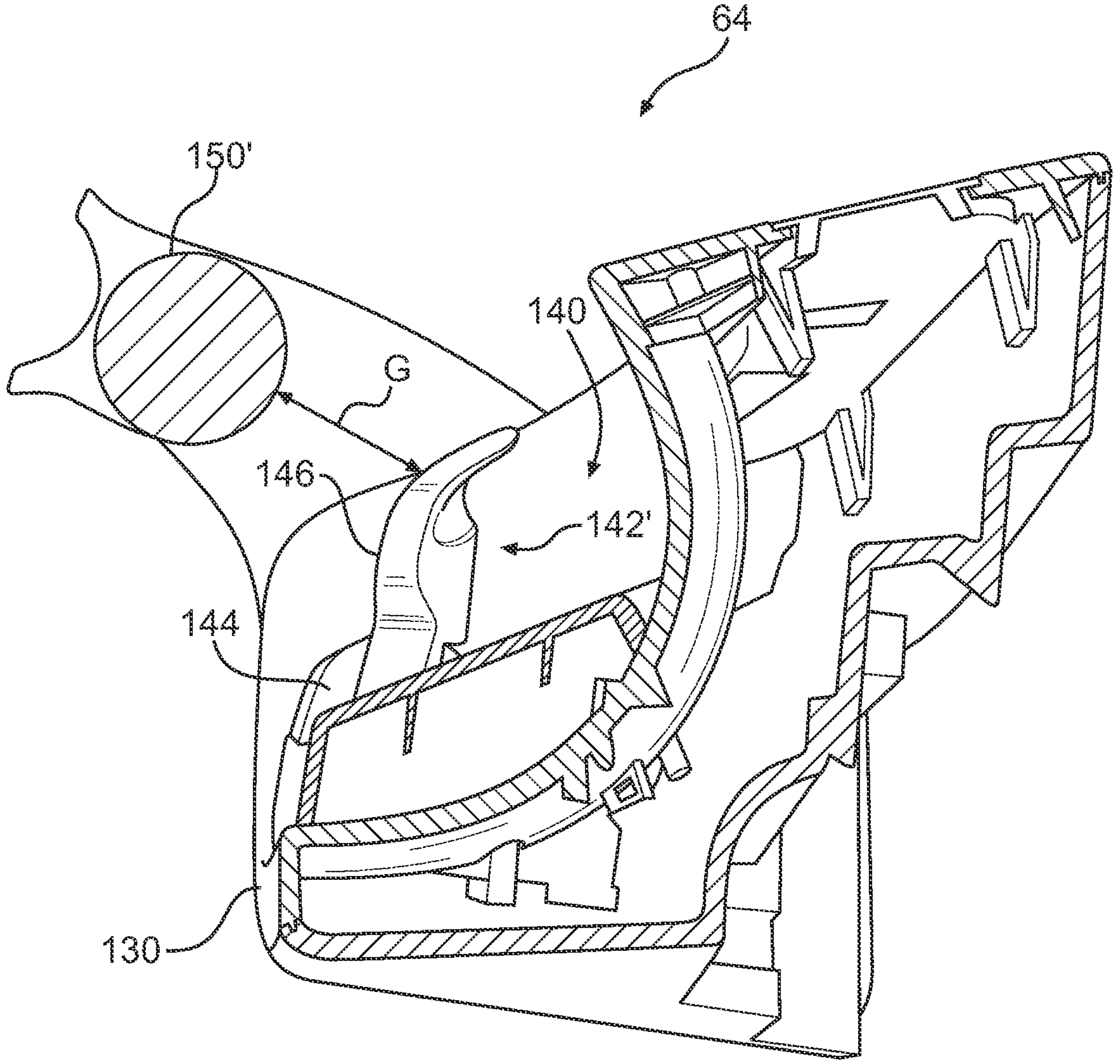

In a second embodiment of FIGS. 10B and 11D-11F, the second operator control assembly 64 includes a replacement control element 142' and a replacement grip member 150', also referred to herein as a second control element 142' and a second grip member 150'. Each of the second control element 142' and the second grip member 150' have at least one of different dimensions and/or different configurations than the first control element 142 and the first grip member 150. FIG. 11D shows the second control element 142' in the first end position, FIG. 11E shows the second control element 142' in the second end position, and FIG. 11F shows the second control element 142' in the default position. While the second control element 142' is in the first end position shown in FIG. 11D, the gap G is a first distance that is greater than the minimum clearance distance (depicted in FIG. 11D as MCD'). While the second control element 142' is in the second end position shown in FIG. 11E, the gap G is a second distance less than the maximum reach distance (depicted in FIG. 11E as MRD'). While the second control element 142' is in the default position shown in FIG. 11F, the gap G is a third distance intermediate the first and second distances.

One of the first control element 142 or the first grip member 150 may also be used with one of the second control element 142' or the second grip member 150', wherein the two installed components are always spaced from one another such that the gap G is greater than or equal to the minimum clearance distance and less than or equal to the maximum reach distance. Additional replacement control elements and/or grip members (not specifically shown) having at least one of different dimensions and/or configurations than the first and second control elements 142, 142' and grip members 150, 150' may also be installed, wherein the two installed components are always spaced from one another such that the gap G is greater than or equal to the minimum clearance distance and less than or equal to the maximum reach distance. The curvilinear shape of the housing recess 140 takes part in allowing different control elements to be used while maintaining the gap G within the aforementioned range, since the curvilinear shape at least in part sets the angle of the installed control element relative to the grip member. That is, positioning the control element in different locations along the curved surface of the curvilinear shape of the housing recess 140 and/or using control element base portions having different dimensions and/or configurations will modify the angle of the control element relative to the grip member.

The grip member 150 (and/or a replacement grip member) may include an additional control element 160 as shown in FIGS. 2, 9, 10A, and 10B. The additional control element 160 may generate control signals to the vehicle processor or controller to control a vehicle function such as, for example, the traveling direction of the vehicle 10, i.e., the vehicle processor or controller may control a traction motor of the vehicle 10 based on the control signals from the control element 160 to set the traveling direction of the vehicle 10.

Figure 12A:
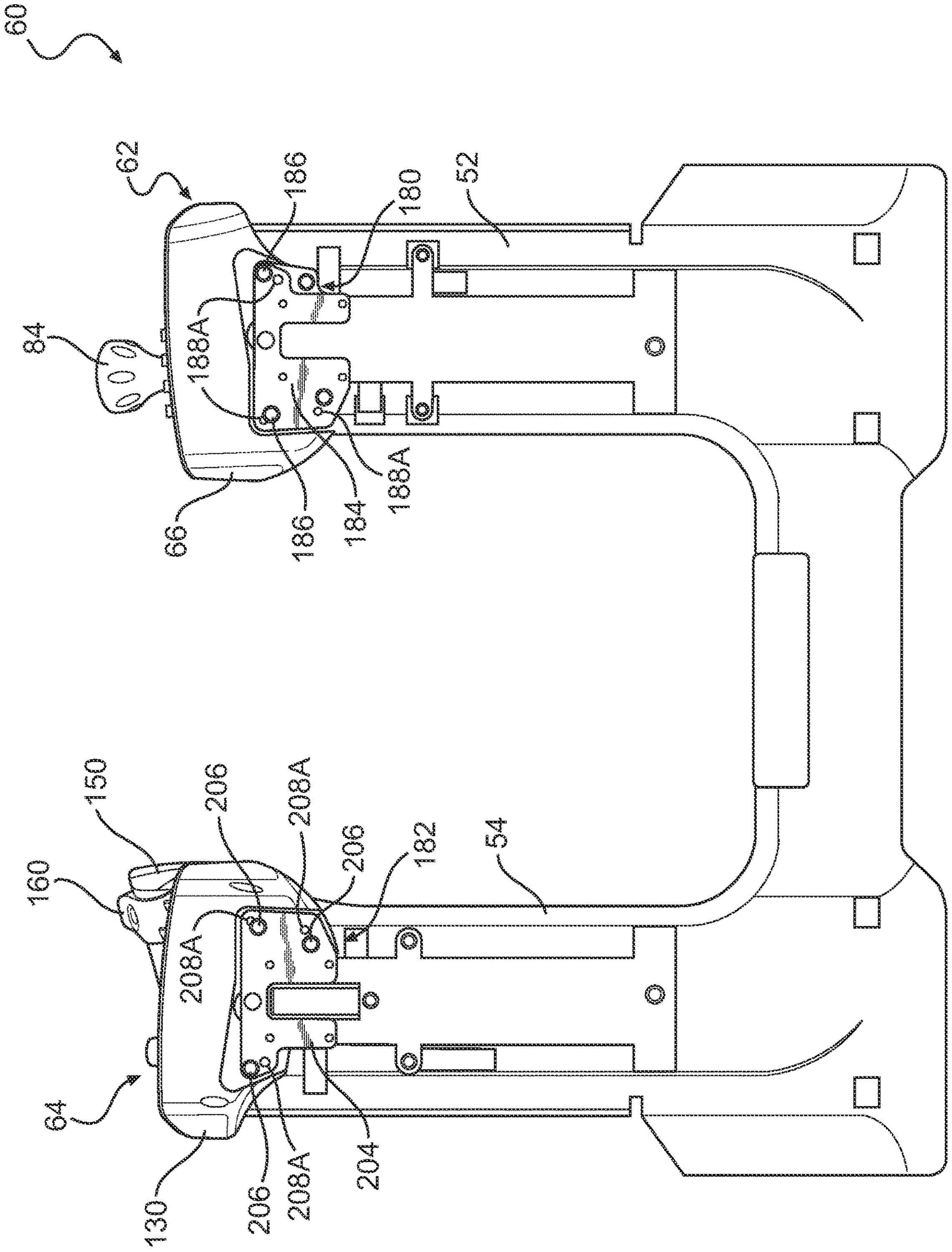
FIGS. 12A and 12B are back elevation views of the operator control system shown in FIG. 2.
Figure 12B:
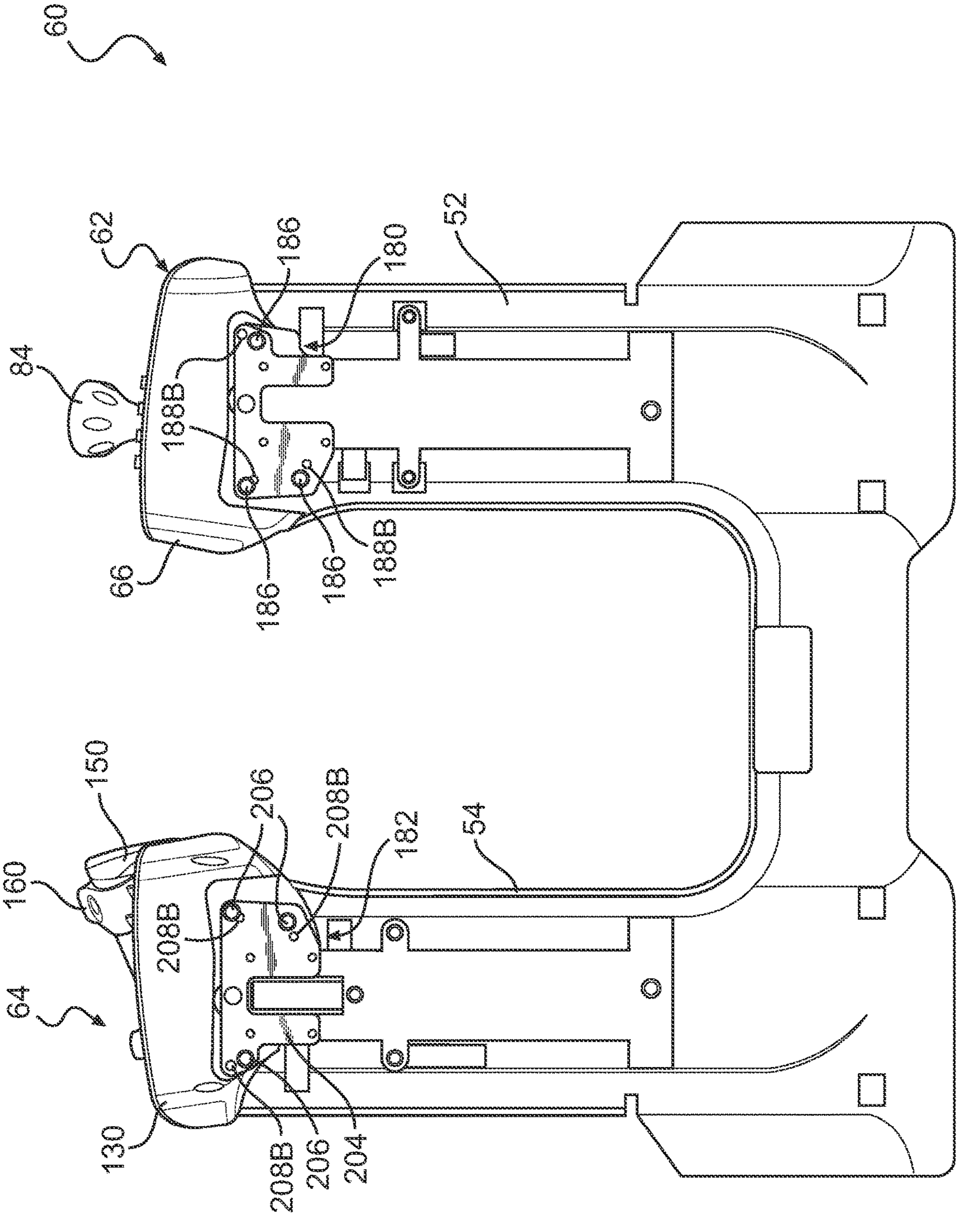

Turning now to FIGS. 12A and 12B, the operator control system 60 may optionally include first and second fixture structures 180, 182 to selectively allow one or both of the first and/or second operator control assemblies 62, 64 to be positioned in multiple respective positions. The first and second fixture structures 180, 182 may be coupled to or integral with the respective first and second support structures 52, 54.

Figure 13A:
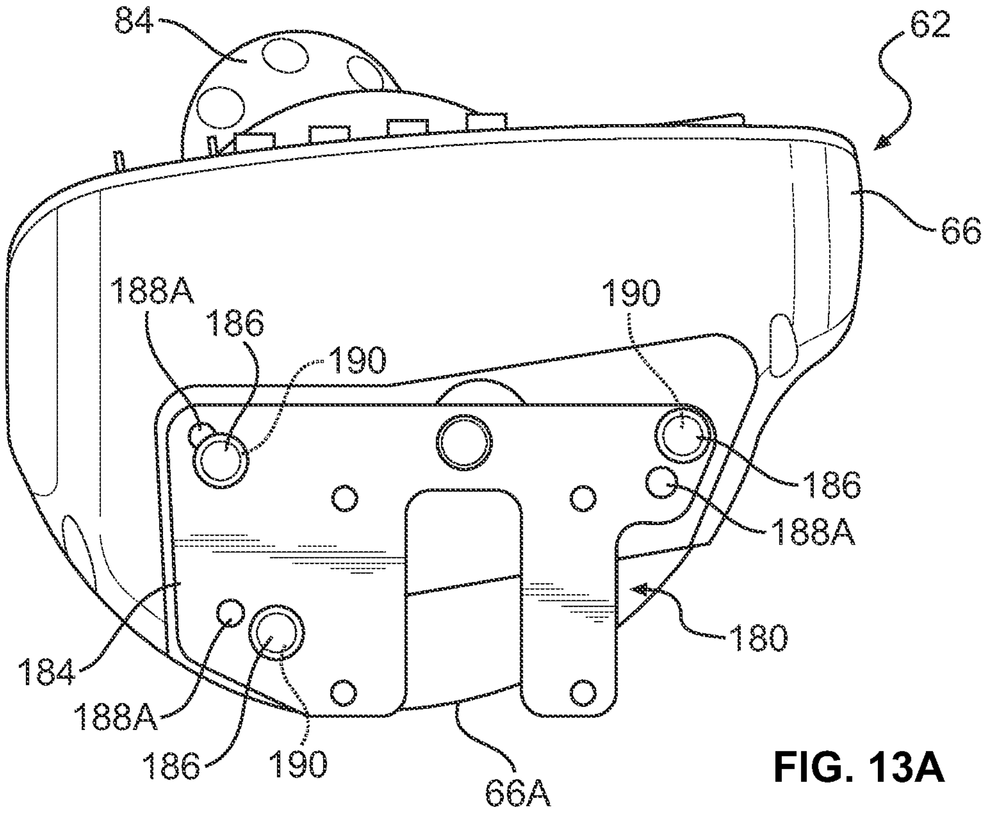
FIGS. 13A-13D are enlarged views illustrating operator control assemblies of the operator control system of FIGS. 12A and 12B.
Figure 13B:
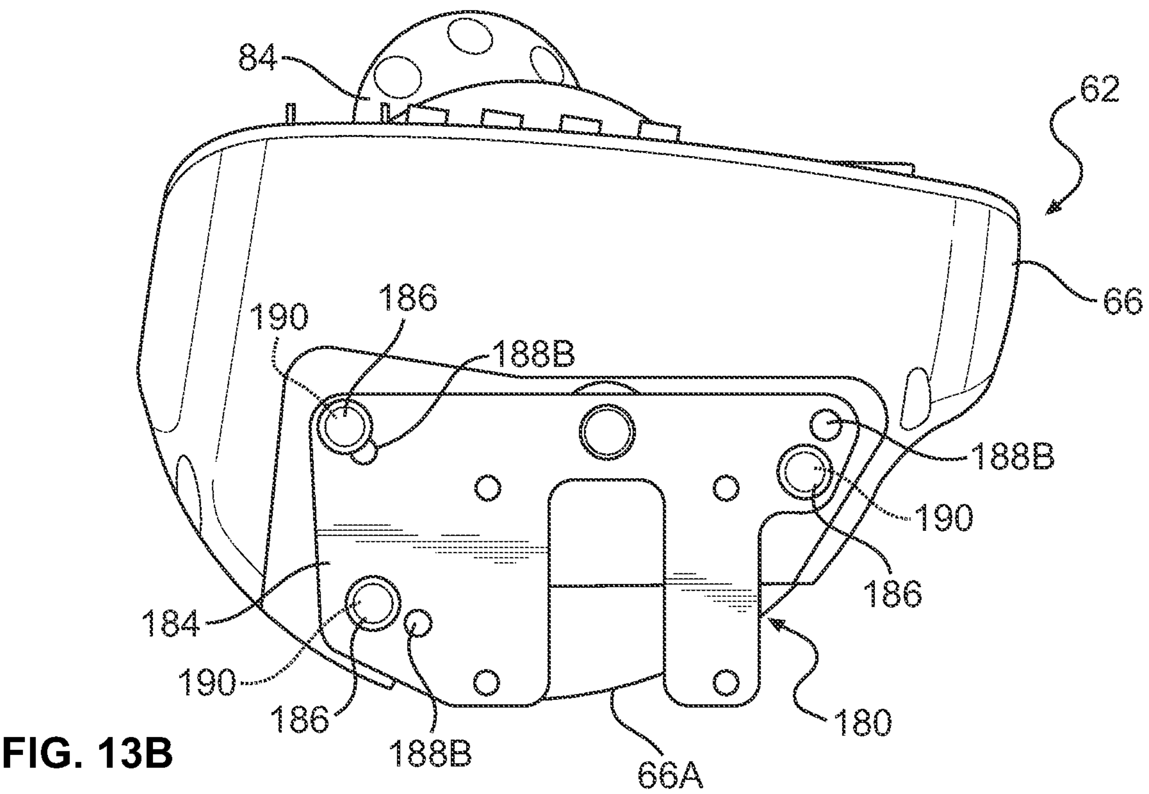

The first fixture structure 180 comprises a mounting plate 184 coupled to or integral with the first support structure 52. The mounting plate 184 may be an elongate plate extending in the vertical direction from the first support structure 52 to the first housing 66 of the first operator control assembly 62. With reference to FIGS. 13A and 13B, the first fixture structure 180 further comprises a plurality of fasteners 186, such as bolts, that selectively extend through first openings 188A or second openings 188B provided in the mounting plate 184 and into corresponding openings 190 formed in the backside of the first housing 66 to couple the first housing 66 to the first support structure 52. The first fixture structure 180 can support the first operator control assembly 62 in a first orientation relative to the first support structure 52 shown in FIGS. 12B and 13B by inserting the fasteners 186 through the first openings 188A in the mounting plate 184 and into the openings 190 in the first housing 66, or the first fixture structure 180 can support the first operator control assembly 62 in a second orientation relative to the first support structure 52, the second orientation different than the first orientation, as shown in FIGS. 12A and 13A by inserting the fasteners 186 through the second openings 188B in the mounting plate 184 and into the openings 190 in the first housing 66. While in the first orientation, the first operator control assembly 62 is positioned at a first angular orientation relative to the first support structure 52, and while in the second orientation, the first operator control assembly 62 is positioned at a second angular orientation relative to the first support structure 52 different than the first angular orientation. When moved from the first angular orientation to the second angular orientation, the first operator control assembly 62 is rotated about a first axis $A_1$ (see FIG. 7, noting that the first axis $A_1$ extends into the page in the views illustrated in FIGS. 12A-13B) that is generally parallel to the longitudinal axis $L_A$ of the vehicle 10. According to one non-limiting exemplary working embodiment, the first operator control assembly 62 may move through an angle of about −10 degrees to about 10 degrees relative to the vertical direction when moving from the first angular orientation to the second angular orientation, and according to another non-limiting exemplary working embodiment, the first operator control assembly 62 may move through an angle of about −5 degrees to about 5 degrees relative to the vertical direction when moving from the first angular orientation to the second angular orientation.

As shown in FIG. 2, the upper surface 52A of the first support structure 52 according to this embodiment may be a curved upper surface 52A, which corresponds to a curved lower surface 66A of the first housing 66. The corresponding curved surfaces 52A, 66A allow the first operator control assembly 62 to be moved between the first and second orientations while maintaining a close fit between the first support structure 52 and the first housing 66.

Figure 13C:
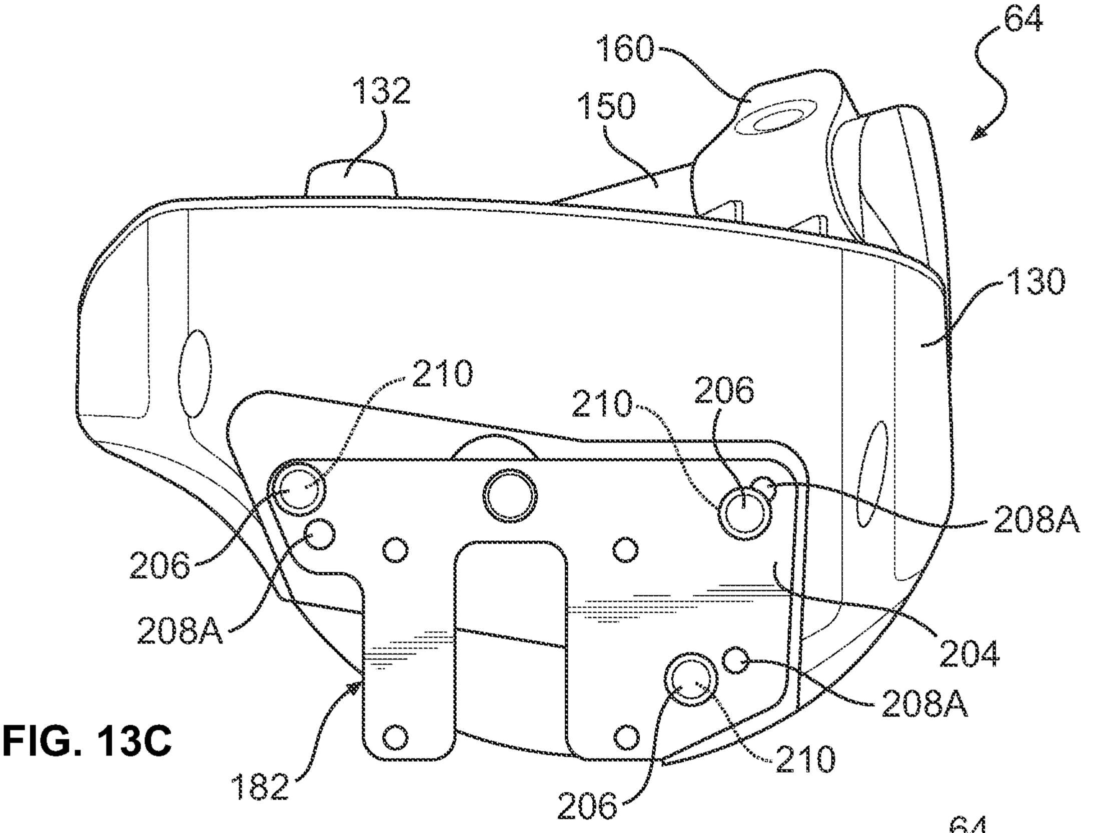
Figure 13D:
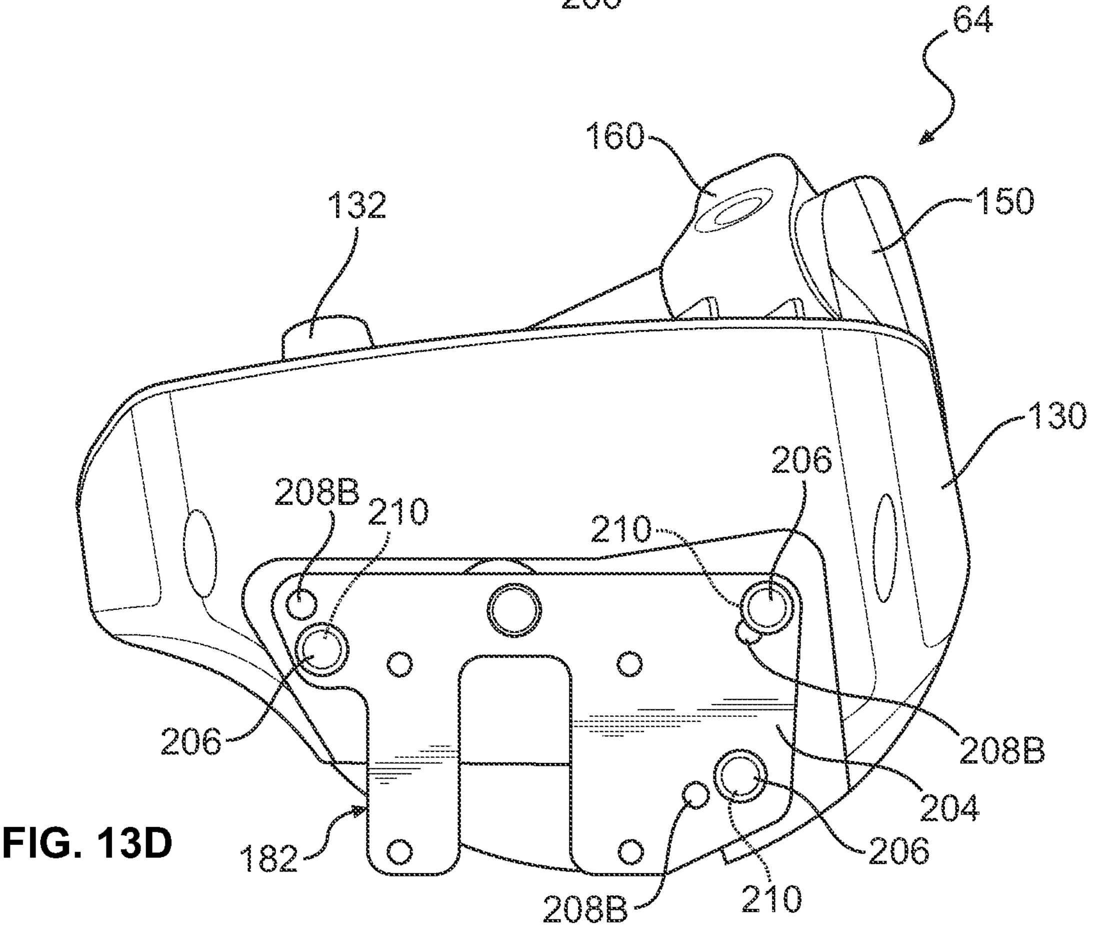

Referring back to FIGS. 12A and 12B, the second fixture structure 182 comprises a mounting plate 204 coupled to or integral with the second support structure 54. The mounting plate 204 may be an elongate plate extending in the vertical direction from the second support structure 54 to the second housing 130 of the second operator control assembly 64. With reference to FIGS. 13C and 13D, the second fixture structure 182 further comprises a plurality of fasteners 206, such as bolts, that selectively extend through first openings 208A or second openings 208B provided in the mounting plate 204 and into corresponding openings 210 formed in the backside of the second housing 130 to couple the second housing 130 to the second support structure 54. The second fixture structure 182 can support the second operator control assembly 64 in a first orientation relative to the second support structure 54 shown in FIGS. 12B and 13D by inserting the fasteners 206 through the first openings 208A in the mounting plate 204 and into the openings 210 in the second housing 130, or the second fixture structure 182 can support the second operator control assembly 64 in a second orientation relative to the second support structure 54, the second orientation different than the first orientation, as shown in FIGS. 12A and 13C by inserting the fasteners 206 through the second openings 208B in the mounting plate 204 and into the openings 210 in the second housing 130. While in the first orientation, the second operator control assembly 64 is positioned at a first angular orientation relative to the second support structure 54, and while in the second orientation, the second operator control assembly 64 is positioned at a second angular orientation relative to the second support structure 54 different than the first angular orientation. When moved from the first angular orientation to the second angular orientation, the second operator control assembly 64 is rotated about a second axis $A_2$ (see FIG. 9, noting that the second axis $A_2$ extends into the page in the views illustrated in FIGS. 12A, 12B, 13C, and 13D) that is generally parallel to the longitudinal axis $L_A$ of the vehicle 10. According to one non-limiting exemplary working embodiment, the second operator control assembly 64 may move through an angle of about −10 degrees to about 10 degrees relative to the vertical direction when moving from the first angular orientation to the second angular orientation, and according to another non-limiting exemplary working embodiment, the first operator control assembly 62 may move through an angle of about −5 degrees to about 5 degrees relative to the vertical direction when moving from the first angular orientation to the second angular orientation.

The first and second support structures 52 and 54 may be positioned closer to one another in a narrow width vehicle, e.g., vehicles having a width equal to or less than 40 inches, and further away from one another in a wide width vehicle, e.g., vehicles having a width equal to or greater than 42 inches. To provide preferred ergonomic hand positioning for a narrower width vehicle, the first operator control assembly 62 may be positioned in the first angular orientation (shown in FIG. 12B), and to provide preferred ergonomic hand positioning for a wider width vehicle, the first operator control assembly 62 may be positioned in the second angular orientation (shown in FIG. 12A).

As shown in FIG. 2, the upper surface 54A of the second support structure 54 according to this embodiment may be a curved upper surface 54A, which corresponds to a curved lower surface 130A of the second housing 130. The corresponding curved surfaces 54A, 130A allow the second operator control assembly 64 to be moved between the first and second orientations while maintaining a close fit between the second support structure 54 and the second housing 130.

Figure 14:
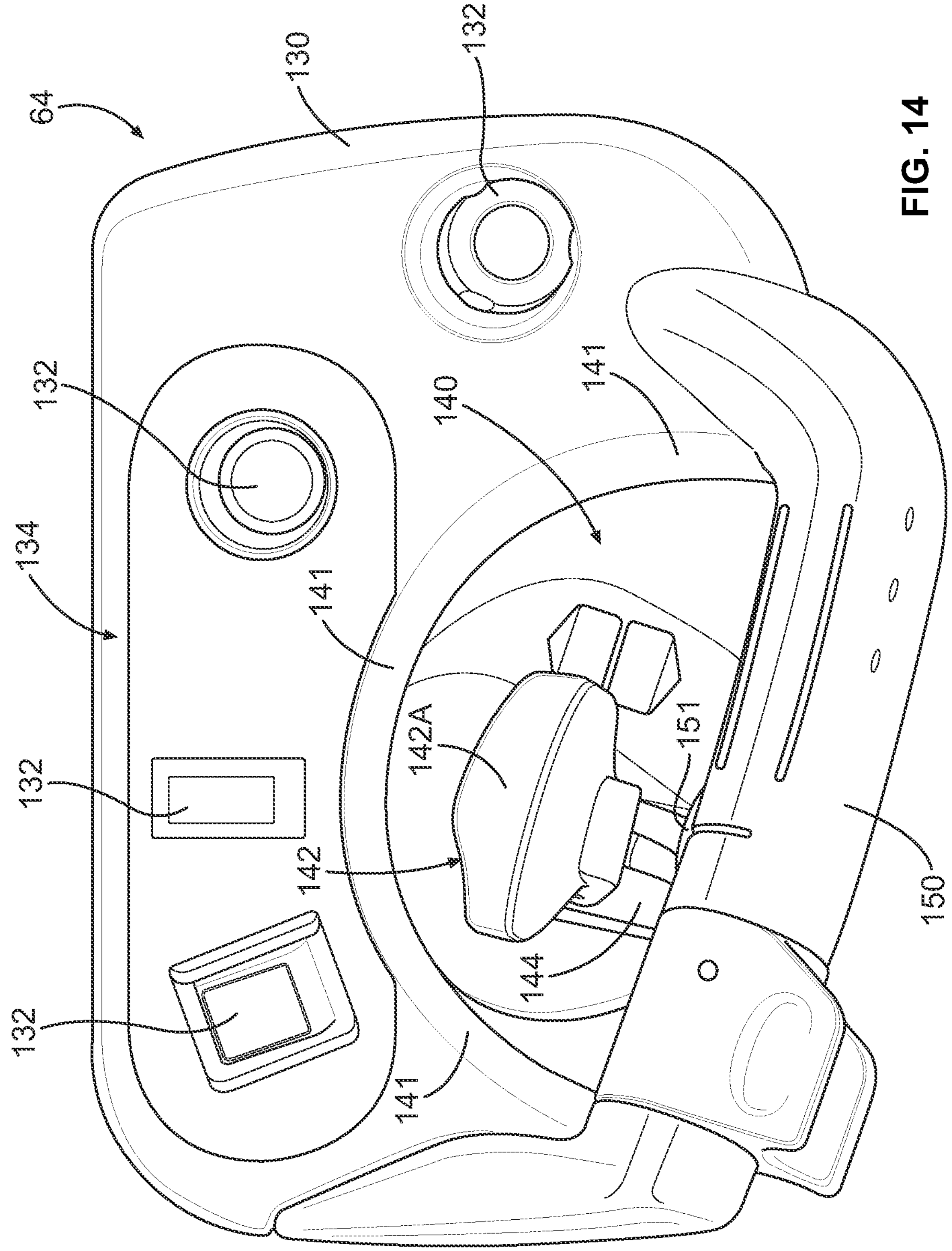
FIG. 14 is a perspective view of an operator control assembly according to embodiments.

FIG. 14 illustrates a second operator control assembly 64 according to additional embodiments. The second operator control assembly 64 according to FIG. 14 comprises a second housing 130 and one or more control elements 132, such as buttons, switches, levers, etc., provided on a control element area 134 of the second housing 130 for generating control signals to the vehicle processor or controller to control respective functions of the vehicle 10, such as, for example, an emergency stop, a control for an interactive display, etc. i.e., the vehicle processor or controller may control functions of the vehicle based on the control signals from the control elements 132. The control element area 134 may include any number of control elements or no control elements.

The operator control assembly 64 further comprises a housing recess 140 that extends downwardly from the control element area 134 in a direction toward the floor surface 40 of the operator compartment 16. The housing recess 140 may have a curvilinear shape. As shown in FIG. 14, a chamfered surface 141 extends around the outer periphery of the housing recess 140 in this embodiment, between the housing recess 140 and the control element area 134. The chamfered surface 141 may allow an operator increased space for reaching a control element 142 that is mounted to the second housing 130 and extends outwardly from the housing recess 140. The control element 142 may have an enlarged tip portion 142A distal from the base portion 144 compared to the control element 142 described above for FIG. 9 but may otherwise be the same or similar to the control element 142 described above for FIG. 9 and will not be described in detail herein.

An elongate grip member 150 according to this embodiment may be the same or similar to the grip member 150 described above for FIG. 9, but the grip member 150 of FIG. 14 may include an additional control element 151 located thereon, such as a horn button.

Figure 15:
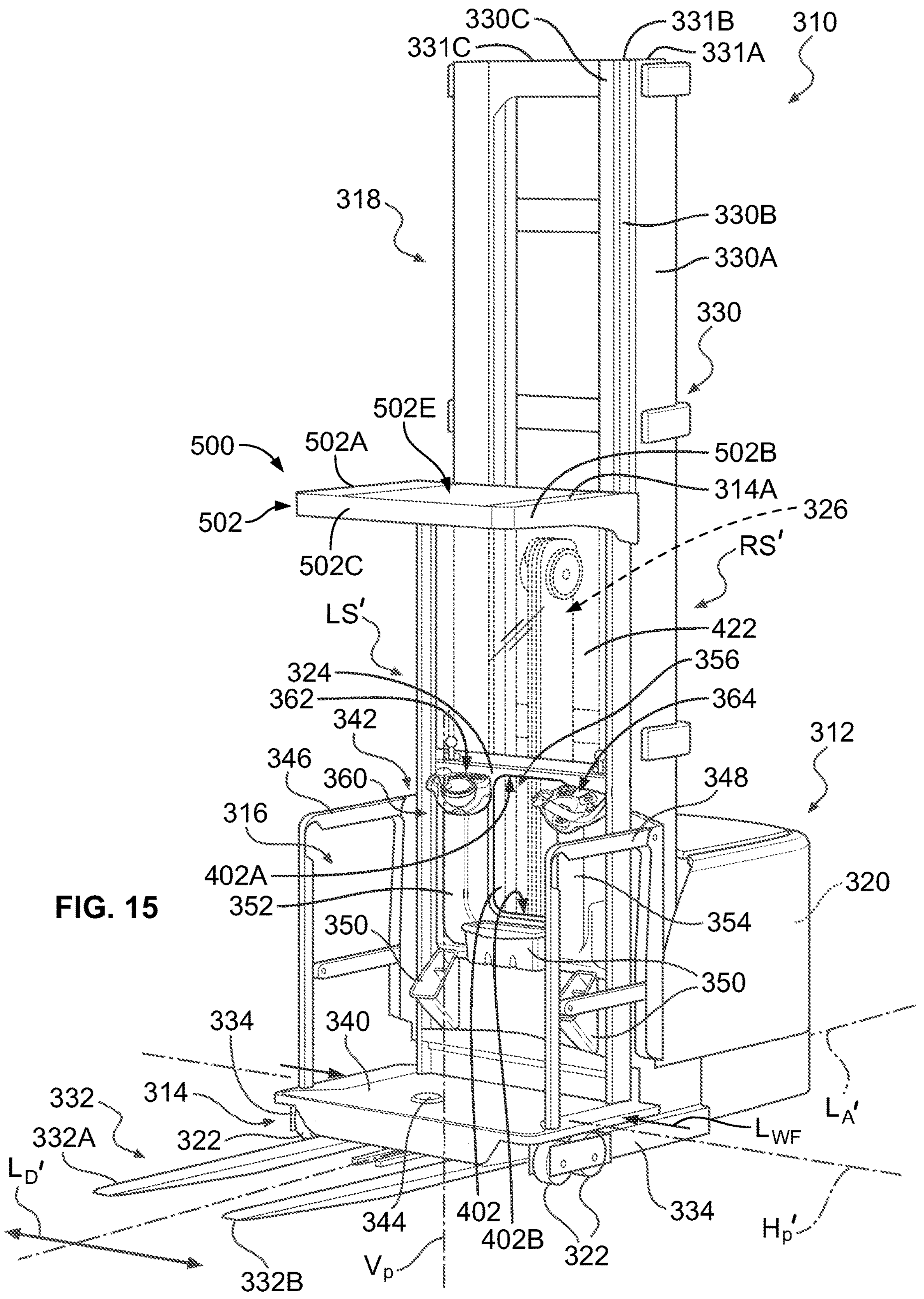
FIG. 15 is a perspective view of a materials handling vehicle including a platform assembly, operator control assembly, and non-horizontal viewing window according to embodiments.
Figure 16:
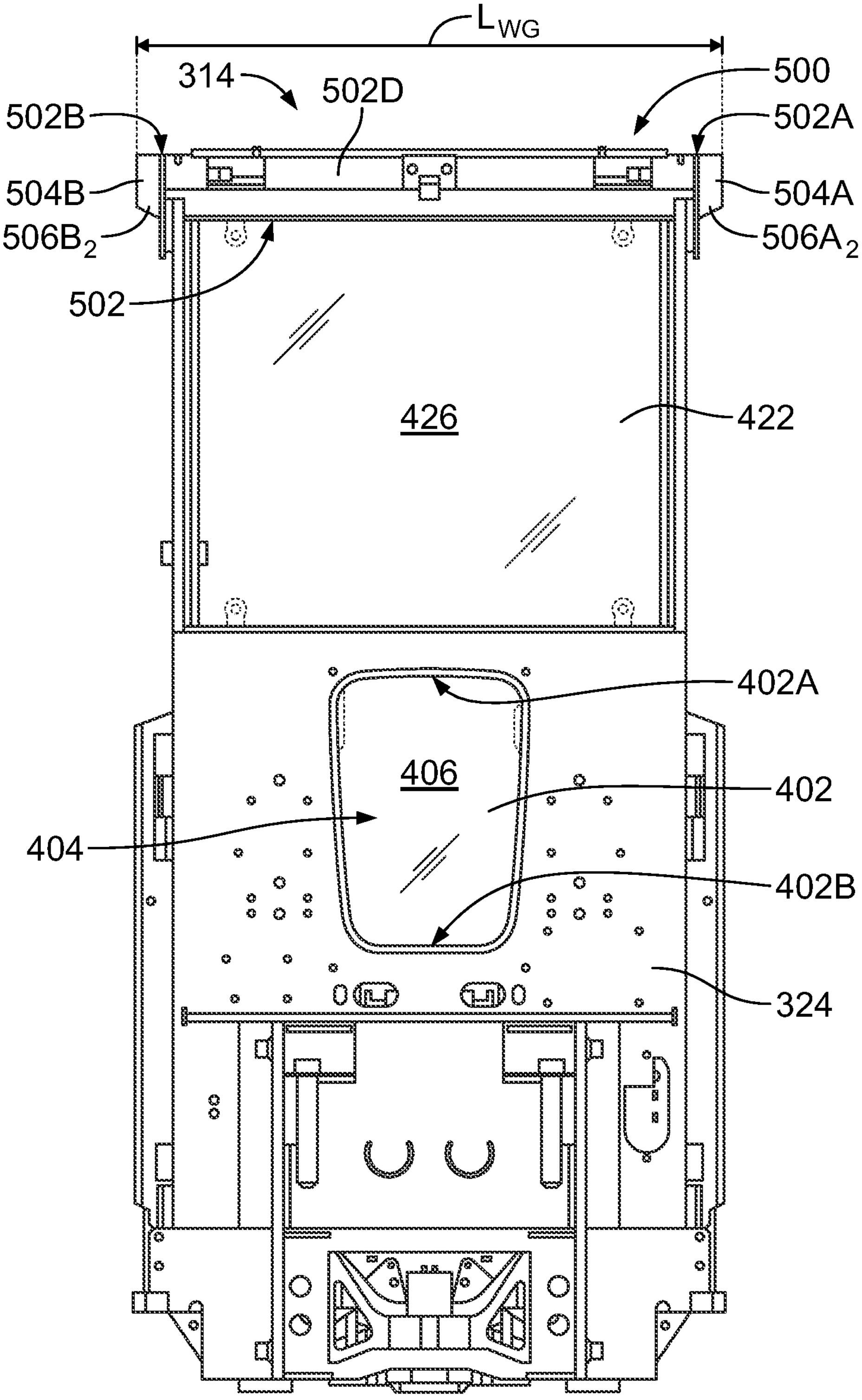
FIG. 16 is a back elevation view of a platform assembly with the non-horizontal viewing window shown in FIG. 15.
Figure 17:
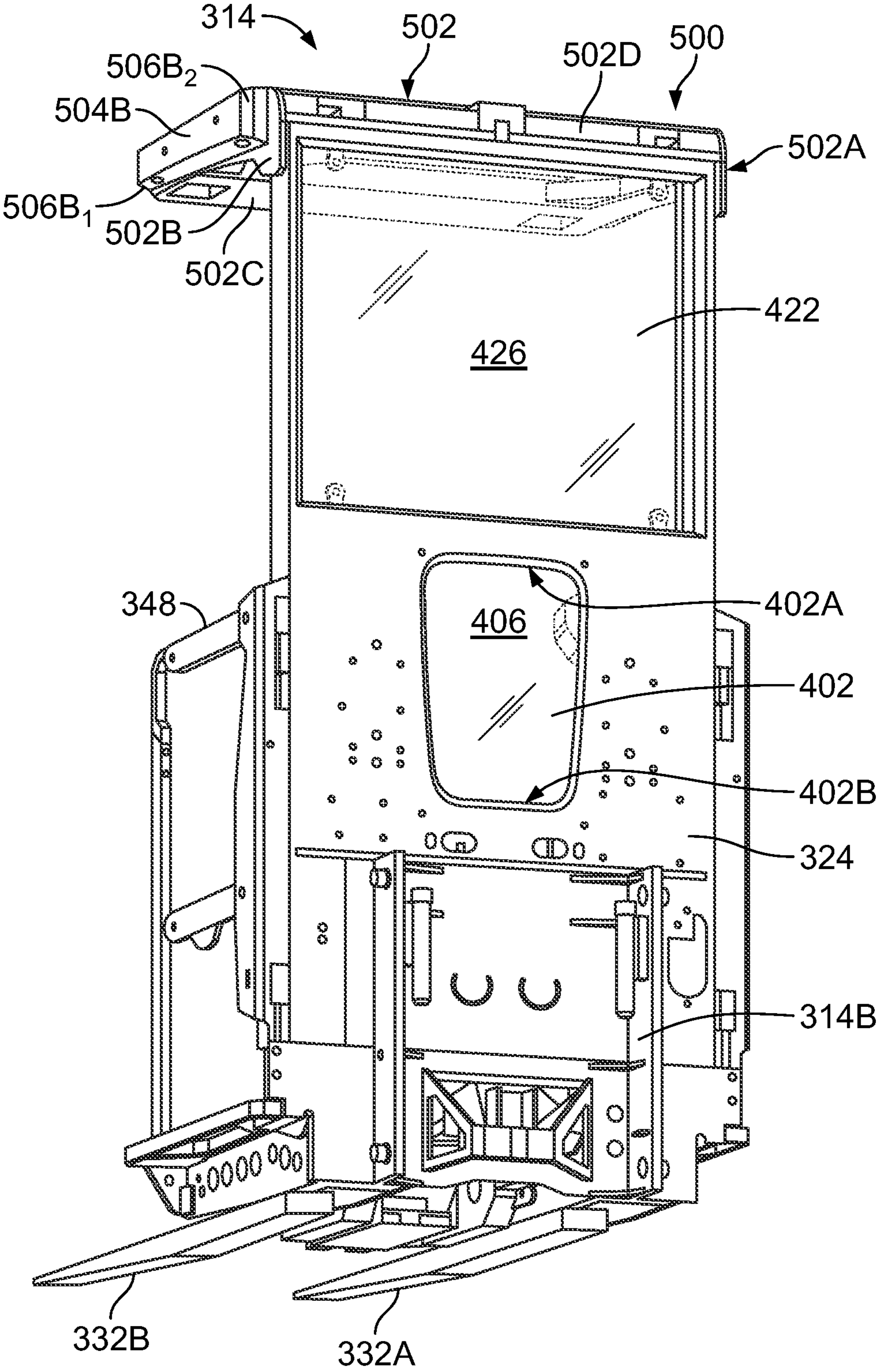
FIG. 17 is a back perspective view of a platform assembly with the non-horizontal viewing window shown in FIG. 15.

Referring now to FIGS. 15-31, FIG. 15 illustrates a materials handling vehicle 310 constructed in accordance with embodiments. In the illustrated embodiment, the vehicle 310 comprises a stockpicker, but could be another type of materials handing vehicle. The vehicle 310 includes a power unit 312, a platform assembly 314 including an operator compartment 316, and a load handling assembly 318. The power unit 312 includes a power source, such as a battery unit 320. The vehicle 310 includes a plurality of wheels 322 on which the vehicle 310 travels (one or more additional wheels are located underneath the power unit 312 but are not shown in FIG. 15). The load handling assembly 318 comprises a mast assembly 330 coupled to the power unit 312 on which the platform assembly 314 moves vertically. A fork structure 332 comprises a pair of forks 332A, 332B which are coupled to the platform assembly 314 or mast assembly 330 for movement with the platform assembly 314. The mast assembly 330 comprises one or more mast sections. Mast sections may also be referred to herein as mast weldments. The exemplary mast assembly 330 illustrated in FIG. 15 is a three-stage mast assembly comprising first, second and third mast sections or weldments 330A-330C, see also FIG. 19A. The platform assembly 314 is attached to and moves relative to the third mast section or weldment 330C via a carriage 314B with rollers (only studs on which the rollers are mounted are illustrated in FIG. 17), see FIG. 17, which carriage 314B forms part of the platform assembly 314 and is lifted via a primary lift ram/cylinder assembly 326 mounted to the third section. The second and third mast sections or weldments 330B and 330C move relative to the first, stationary mast section or weldment 330A. One or more hydraulic secondary lift ram/cylinder assemblies are fixed at their cylinder bases to the power unit 312 or first mast section 330A and the rams are fixed to the second mast section 330B. A chain is coupled at a first end to a cylinder of each secondary lift ram/cylinder assembly or to the first mast section, extends over a corresponding pulley on the second mast section 330B and is fixed at its second end to the third mast section 330C. As each ram extends, the ram causes the second mast section 330B to move relative to the first mast section 330A and also causes the third mast section 330C to move via the chain relative to the first and second mast sections 330A and 330B. As the second mast section 330B is raised, the third mast section 330C raises twice the distance. The mast assembly 300 is illustrated in its fully retracted home position in FIGS. 15 and 25, and in its fully extended state in FIG. 26. The platform assembly 314 is positioned in its fully retracted state in FIG. 15. When the second and third mast sections 330B and 330C are fully retracted and the platform assembly 314 is fully retracted, an upper portion 331A-331C of each of the first, second and third mast sections 330A-330C extends above an upper section 314A of the platform assembly 314, see FIG. 15. Further, when the second and third mast sections 330B and 330C are fully retracted and the platform assembly 314 is fully retracted, the upper portion 331A-331C of each of the first, second and third mast sections 330A-330C extends above an upper part 362A of first operator control assembly 362 and/or an upper part 364A of second operator control assembly 364, see FIGS. 15 and 20.

The operator compartment 316 includes a floor surface 340 upon which an operator stands while operating the vehicle 310 from an operator station 342 located in the operator compartment 316. An operator presence sensor 344 in the form of a pressure switch that senses an operator's foot is provided in the floor surface 340. The floor surface 340 may also be referred to herein as the floorboard. According to embodiments, one or more functions of the vehicle, such as traveling movement, raising/lowering the load handling assembly 318, etc. may be disabled unless the operator presence sensor indicates the presence of the operator in the operator compartment 316. First and second side restraints 346, 348 are provided at opposed left and right sides LS', RS' of the operator compartment 316, the left and right sides LS', RS' being spaced apart from one another in a lateral direction $L_D'$ that is perpendicular to a longitudinal axis $L_{A'}$ of the vehicle 310. A support wall 324 is connected to the floorboard and positioned adjacent to and spaced from the mast assembly 330, further defining the operator compartment 316 of the platform assembly 314. The support wall 324 may also be referred to herein as an "inner support wall."

The operator station 342 may include one or more bins 350 in which the operator can store items. The bins 350 may be positioned anywhere in the operator station 342 and may be movable as desired. The operator station 342 may further comprise a first support structure 352 and a second support structure 354 spaced apart from each other in the lateral direction $L_D'$, see FIG. 15. The first and second support structures 352, 354 are separated by a recessed portion 356 of the vehicle 310 that defines an open area between the first and second support structures 352, 354. In the illustrated embodiment, the open area extends to just above one of the bins 350 but could extend further towards the floor surface 340 if the bin 350 below the open area is not provided.

An operator control system 360 is provided in the operator station 342. The operator uses the operator control system 360 to drive the vehicle 310 and to control one or more other vehicle functions. With reference to FIG. 15, the operator control system 360 comprises the first operator control assembly 362 associated with the first support structure 352 and the second operator control assembly 364 associated with the second support structure 354. In the illustrated embodiment, the first operator control assembly 362 is provided to control steering of the vehicle 310 and optionally to control additional vehicle functions, and the second operator control assembly 364 is provided to control load handling assembly lift and lower functions, direction and speed control and optionally other vehicle functions. As further illustrated in the embodiment, the first operator control assembly 362 and second operator control assembly 364 are coupled to the support wall 324 and positioned to allow for operation by an operator located within the operator compartment 316.

A non-horizontal viewing window 402, which may also be referred to as a "mid window" or "first viewing window," is provided in the support wall 324 comprising an upper end 402A and lower end 402B, wherein the lower end 402B extends or is positioned below a lower part 362B of the first operator control assembly 362 and/or a lower part 364B of the second operator control assembly 364 to maximize downward viewing by the operator, see FIGS. 15 and 20. The non-horizontal viewing window 402 may be positioned between the first operator control assembly 362 and second operator control assembly 364 in the illustrated embodiment. The viewing window upper end 402A may be below, on level with, or extend above the upper part 362A of first operator control assembly 362 and/or the upper part 364A of second operator control assembly 364.

The term non-horizontal means that the viewing window 402 has a vertical dimension greater than a horizontal dimension. In some embodiments, the non-horizontal viewing window 402 has a vertical dimension $H_V$ between 18 inches and 22 inches, see FIG. 20. In the illustrated embodiments, the viewing window 402 appears as a generally rectangular or a tapered generally trapezoidal shape and its corners, sides and edges may vary provided that the shape of viewing window 402 is defined to maximize downward visibility. Thus, the sides and corners of window 402 may be linear or curvilinear to achieve this purpose. It is also contemplated that the viewing window 402 may comprise any other shape such as a circle, oval, square, triangle, etc.

Figure 19A:
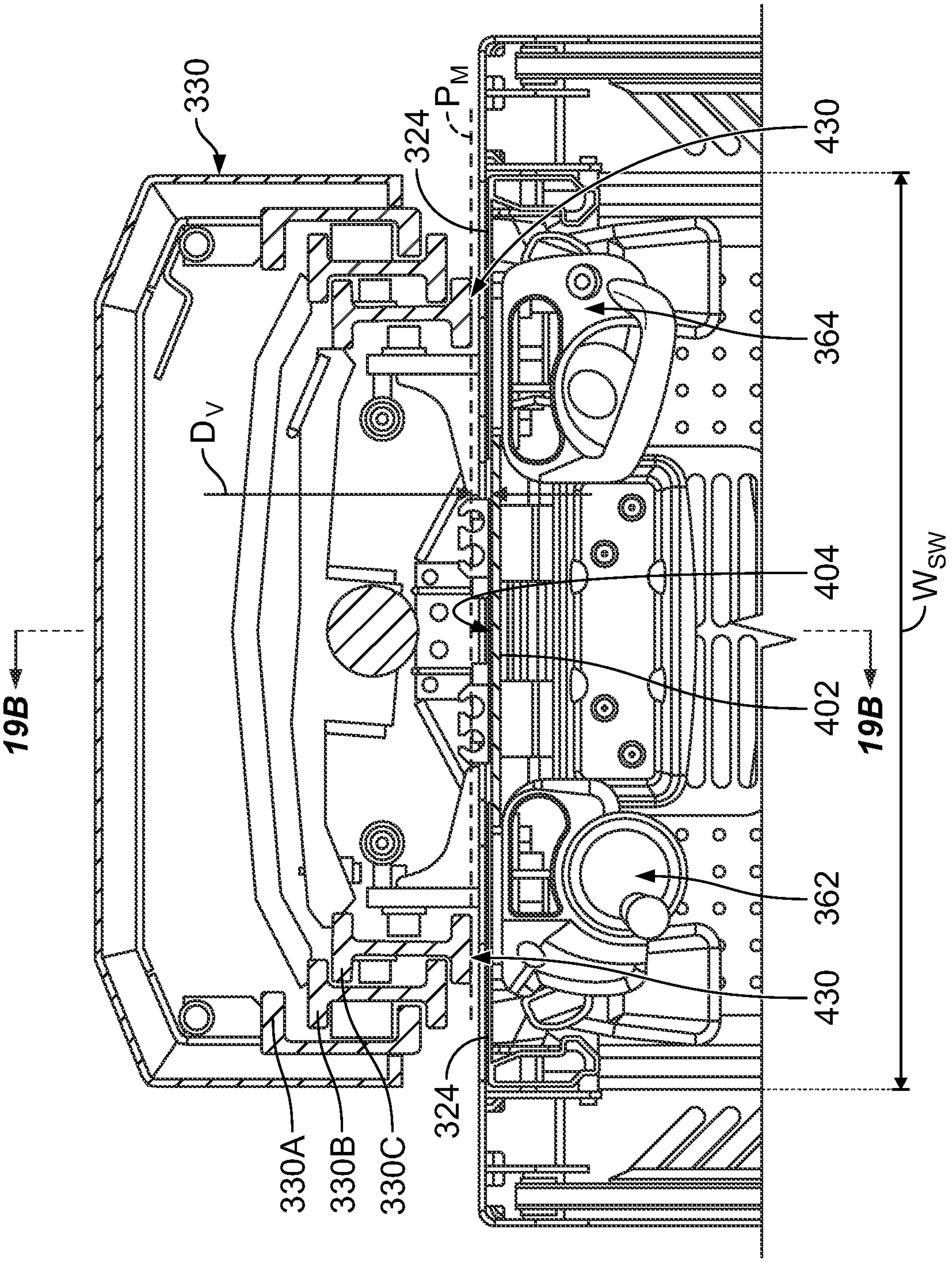
Figure 19B:
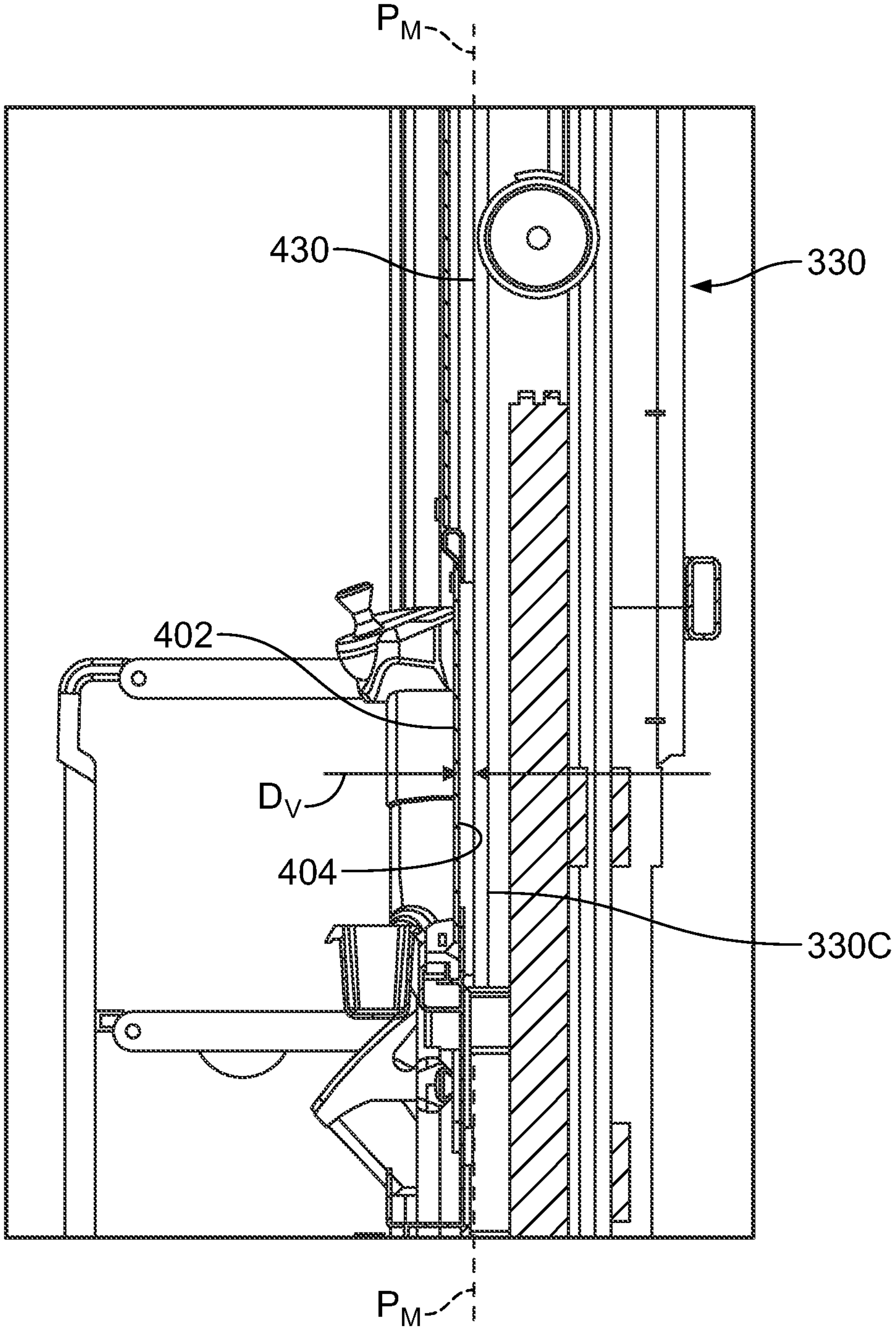
Figure 20:
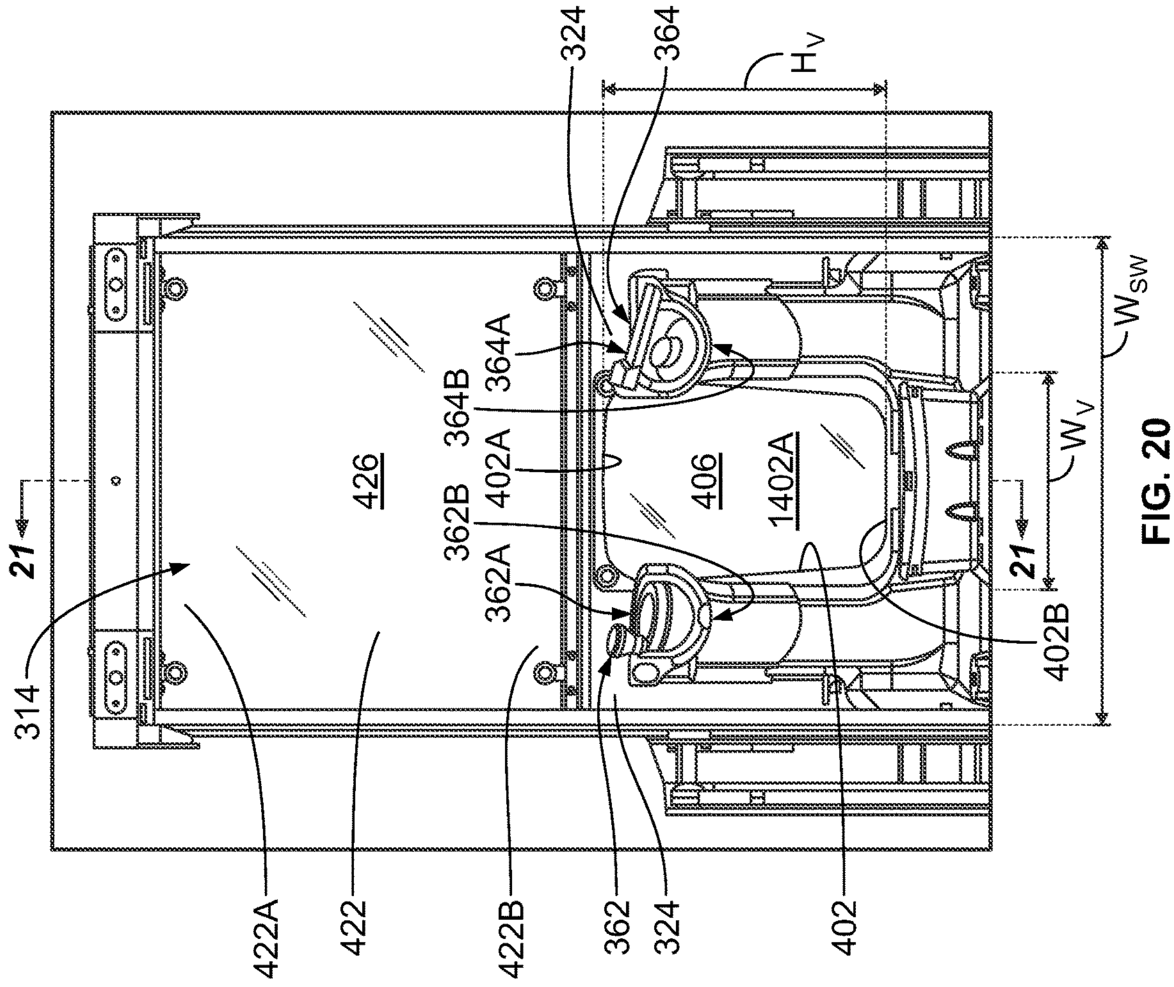
FIG. 20 is a partial front elevation view of the platform assembly shown in FIG. 15 with the non-horizontal viewing window according to embodiments.
Figure 21A:
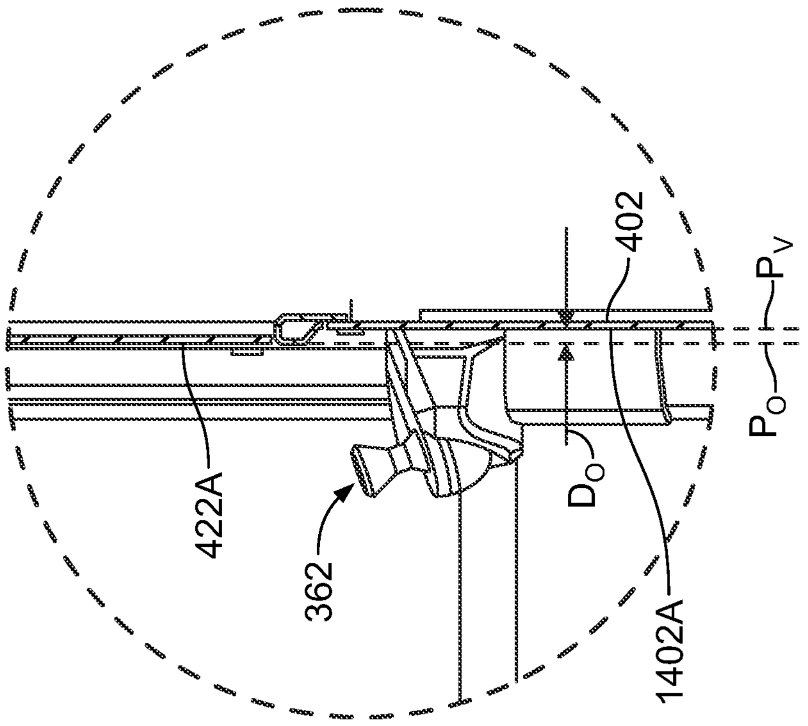
FIG. 21A is an enlarged view taken from FIG. 21.

In the embodiments shown in FIG. 15-31, the width $W_V$ of the non-horizontal viewing window 402 may be equal to between 30% to 50% of the overall width $W_{SW}$ of the support wall 324, see FIG. 20. The non-horizontal viewing window 402 is illustrated in FIGS. 15 and 20 as centered on the support wall 324 between generally the left side LS' and right side RS' of the operator compartment 316, but may be positioned horizontally at any location in the support wall 324 as required to maximize downward viewing by the operator between the first operator control assembly 362 and the second operator control assembly 364, and between the first support structure 352 and the second support structure 354.

Figure 22:
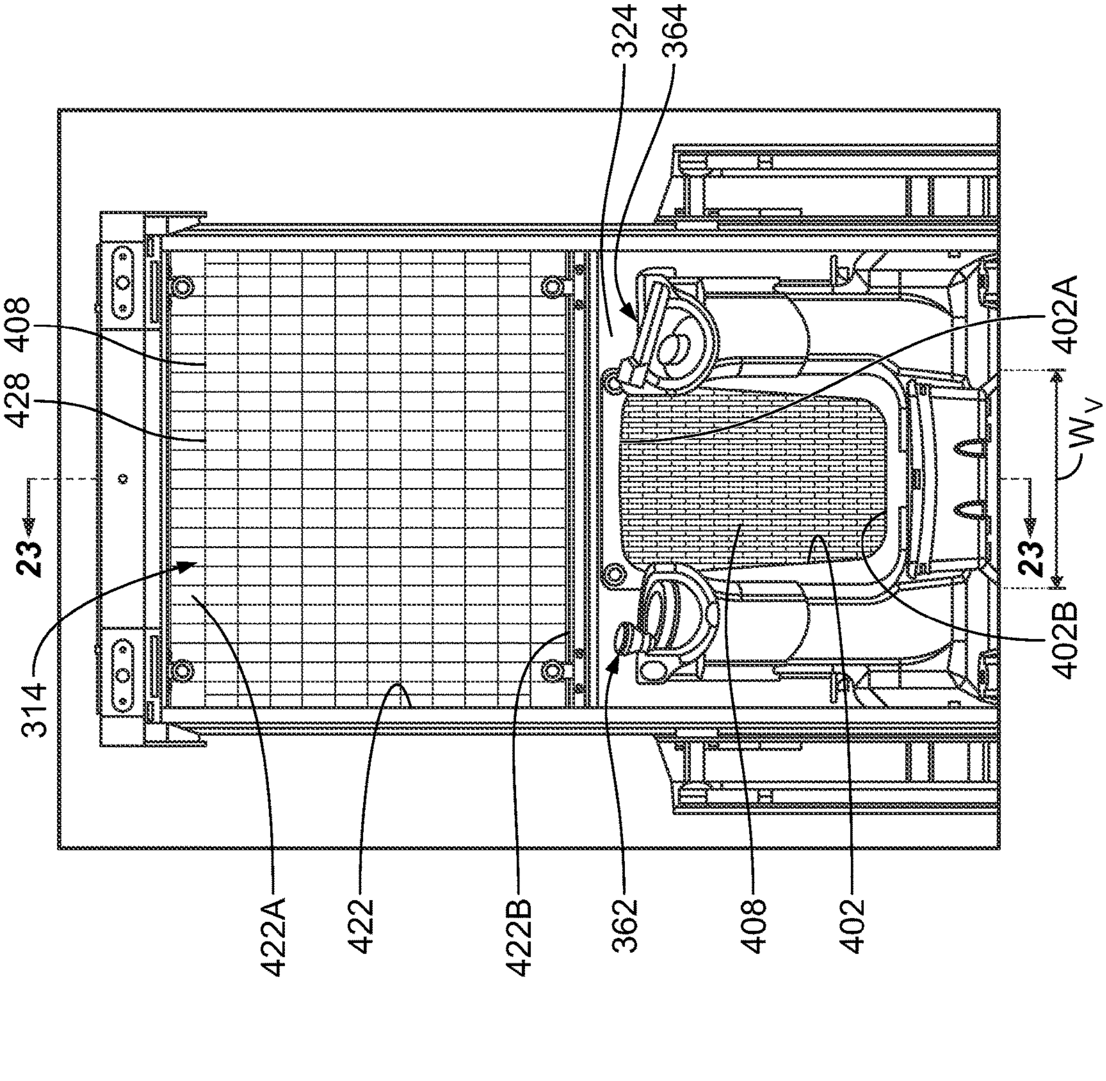
FIG. 22 is a partial front elevation view of the platform assembly with the non-horizontal viewing window according to embodiments.
Figure 24:
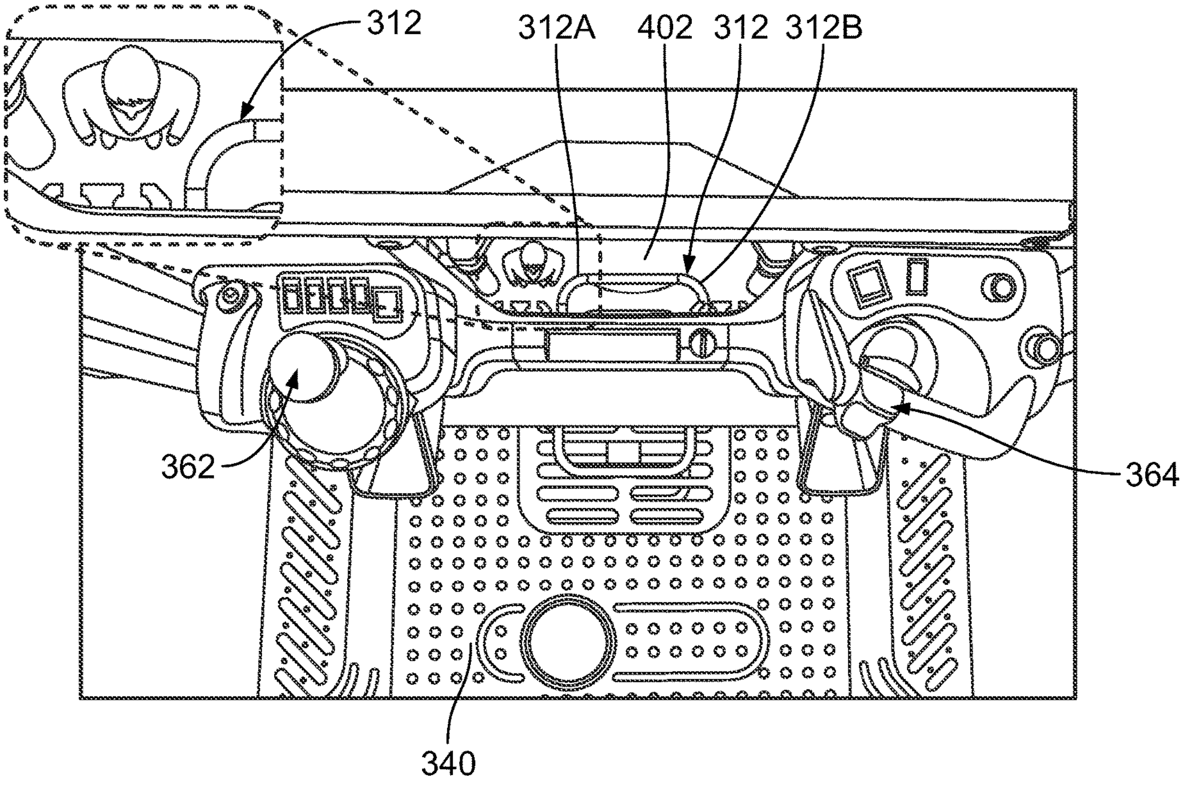
FIG. 24 is a partial top view from the operator's point of view with the platform assembly in the elevated position of FIG. 25 and including an enlarged view of what the operator sees through a portion of the viewing window.

In the embodiment of FIG. 20, the non-horizontal viewing window 402 may comprise a clear pane 406 of suitable material, such as clear polymer, glass, mesh-reinforced glass or, as in the embodiment of FIG. 22, a see-through screen 408.

Figure 21:
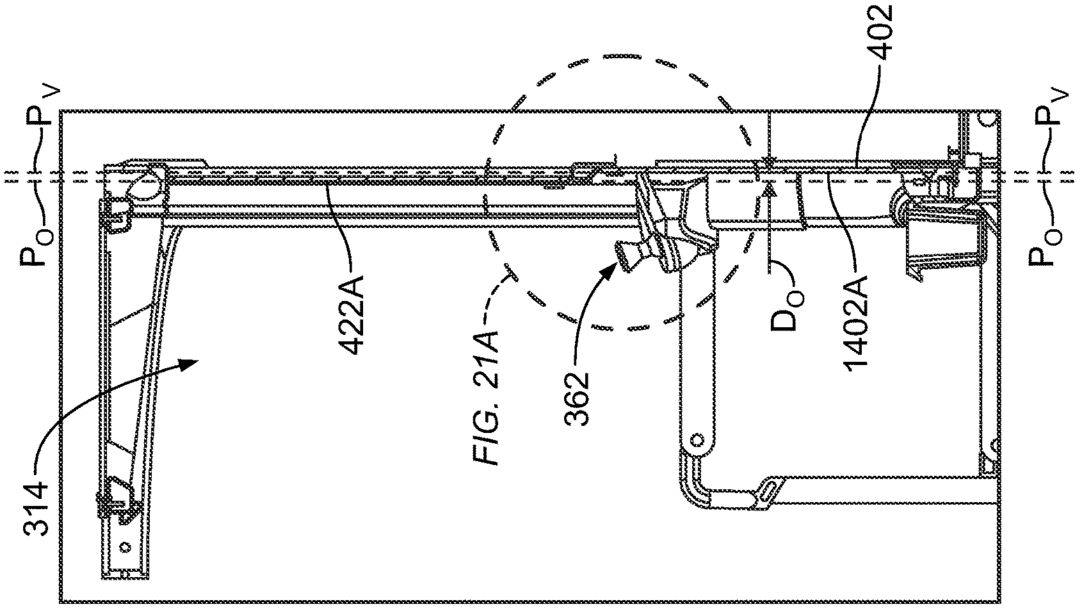
FIG. 21 is a cross-sectional view of the platform assembly of FIG. 20 at line 21-21 according to embodiments.
Figure 23A:
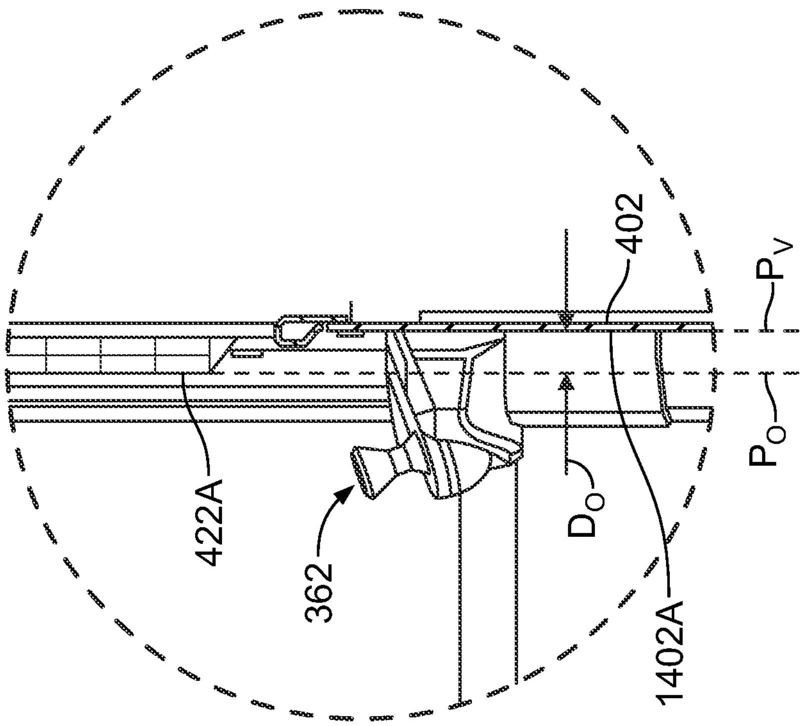
FIG. 23A is an enlarged view taken from FIG. 23.
Figure 23:
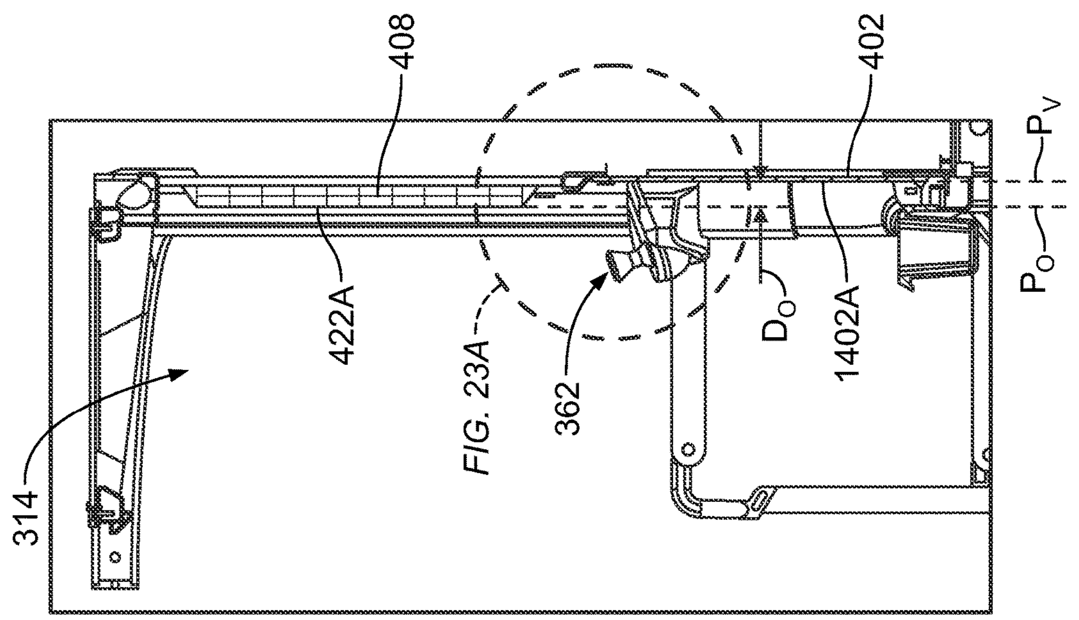
FIG. 23 is a cross-sectional view of the platform assembly of FIG. 22 at line 23-23 according to embodiments.

The support wall 324 and the non-horizontal viewing window 402 are in a generally vertical orientation in the platform assembly 314. The non-horizontal viewing window 402 is shown in FIGS. 21 and 23 positioned in a first vertical plane Pv. By generally vertical orientation, it is appreciated that "vertical" is relative to the floor surface 340 of the vehicle which lies on the generally horizontal plane of Hp' when the vehicle is located on level ground.

While not shown in the Figures, it can be appreciated in some embodiments that the non-horizontal viewing window 402 and adjacent portions of the support wall 324 may also be angled away from the mast assembly 330 at the viewing window lower end 402B and protrude slightly into the recessed portion 356 of the operator compartment 316 to enhance the ease of viewing through the non-horizontal viewing window 402 particularly for embodiments that include a see-through screen 408 as in FIG. 22. Below lower end 402B of non-horizontal viewing window 402, the support wall 324 may extend back towards the first vertical plane $P_V$ so that the recessed portion 356 below the non-horizontal viewing window 402 remains open for use by the operator.

FIGS. 19A and 19B illustrate the relationship between the non-horizontal viewing window 402, the support wall 324, and the mast assembly 330. An inner edge 430 of the third mast section or mast weldment 330C, i.e., the edge of the mast assembly 330 closest to the viewing window 402, defines an inner mast assembly vertical plane $P_M$, see FIGS. 19A and 19B. An outer surface 404 of the non-horizontal viewing window 402 is located a small distance $D_V$ from the inner mast assembly vertical plane $P_M$, which distance $D_V$ may be between 0.5 inches to 2 inches.

Figure 26:
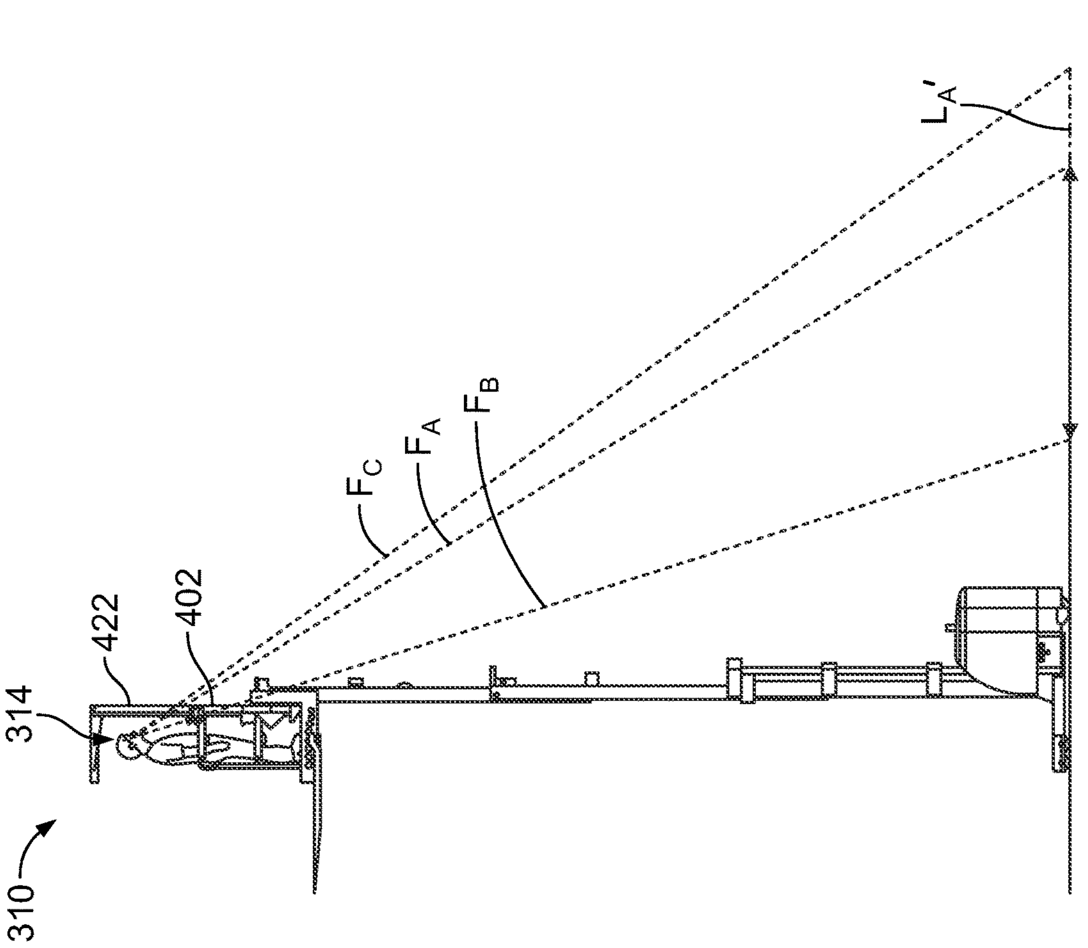
FIG. 26 is a side elevation view of the materials handling vehicle of FIG. 15 in a fully elevated position according to embodiments, showing view lines through the non-horizontal viewing window.
Figure 25:
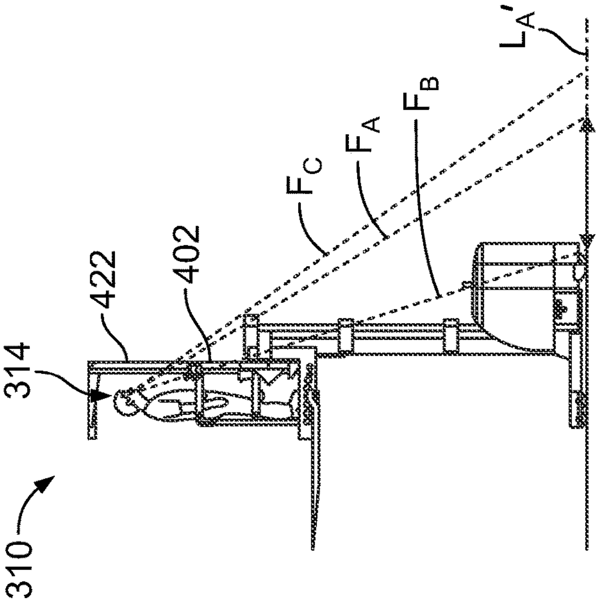
FIG. 25 is a side elevation view of the materials handling vehicle of FIG. 15 with the mast assembly in a retracted position and the operator compartment in an elevated position according to embodiments, showing view lines through the non-horizontal viewing window.

With reference to FIGS. 25 and 26, the operator of the materials handling vehicle 310 may see, without bending, through the non-horizontal viewing window 402 along view lines $F_A$ and $F_B$, enabling the operator to view forward areas left, right and along longitudinal axis $L_A$' of vehicle 310. View line $F_B$ extends from the operator's eye through the lower end 402B of non-horizontal viewing window 402, and view line $F_A$ extends from the operator's eye through the upper end 402A of non-horizontal viewing window 402. It is noted that the location of the view lines $F_A$ and $F_B$ may change based on operator height and position. Depending on the elevation of the platform assembly 314, the view area between view lines $F_A$ and $F_B$ may be steeper and narrower or less steep and broader. At some elevations the view area may advantageously include the power unit 312, such as left and right corners 312A and 312B of the power unit 312, as illustrated from the operator's perspective in FIG. 24. This allows the operator to have increased/enhanced viewing of the power unit 312 and surrounding area when elevated on the platform assembly 314. The view in FIG. 24 may be from the operator's point of view while standing without leaning with the platform assembly 314 in the elevated position of FIG. 25 but may also be from an operator's point of view with the platform assembly 314 in the elevated position of FIG. 26 if the operator leans forward so as to be close to the viewing window 402.

As illustrated in the embodiment of FIG. 15, the materials handling vehicle 310 may include a second viewing window 422 located above the non-horizontal viewing window 402. Referring to FIGS. 20-23, an inner surface 422A of the second viewing window 422 is positioned in a second generally vertical plane $P_O$, that represents the inner face closest to the operator of the second viewing window 422. An inner surface 1402A of the first viewing window 402 is positioned in the first vertical plane $P_V$. Second vertical plane $P_O$ may be spaced from the first vertical plane $P_V$, wherein the inner surface 1402A positioned in the first vertical plane $P_V$ represents the inner face closest to the operator of the first, non-horizontal viewing window 402. In the illustrated embodiment, the first vertical plane $P_V$ is located closer to the mast assembly 330 than the second vertical plane $P_O$. FIGS. 20-23 illustrate that the space or distance $D_O$ between the first vertical plane $P_V$ and second vertical plane $P_O$ may vary depending on whether the second viewing window 422 comprises a second transparent pane 426 or a second see-through screen 428 and the configuration thereof, and embodiments include a space $D_O$ of from 0.1 inches to 3 inches (transparent pane), and from 0.25 inches to 2.5 inches (screen). It is also contemplated that the first vertical plane $P_V$ and the second vertical plane $P_O$ may comprise the same plane. The second viewing window 422 may comprise a clear pane 426 of suitable material, see FIGS. 20 and 21, such as clear polymer, glass, mesh-reinforced glass or, as in the embodiment of FIGS. 22 and 23, a see-through screen 428. It is also contemplated that the first viewing window 402 may comprise a polymeric, e.g., plexiglass, pane and the second viewing window 422 may comprise a glass pane.

Referring again to FIGS. 25 and 26, the operator of materials handling vehicle 310 may see through a lower portion of the second viewing window 422 downward along view line $F_C$ and forward to the horizon and above, and left, right and along longitudinal axis $L_A$' of vehicle 310. The area viewed along view line $F_C$ from the same operator position as described above for view lines $F_A$ and $F_B$, begins further outward from the materials handling vehicle 310 along longitudinal axis $L_A$' than the area viewed through the non-horizontal viewing window 402, as illustrated in FIGS. 25 and 26.

As shown in FIG. 15, the upper section 314A of the platform assembly 314 additionally includes an overhead guard assembly 500 that is positioned over the operator compartment 316. The overhead guard assembly 500 comprises a base frame 502 that includes first and second side bar members 502A, 502B, a front bar member 502C, and a back bar member 502D, see also FIGS. 16 and 17. The bar members 502A, 502B, 502C, 502D may be formed separately and joined together, e.g., by welding or bolting, or one or more of the bar members 502A, 502B, 502C, 502D may be formed integrally together as a single structure. According to one exemplary embodiment, the first, second, and front bar members 502A, 502B, 502C are integrally formed as a single structure that is joined to the back bar member 502D. One or more spanning members (not shown) may span between the first and second side bar members 502A, 502B or the front and back bar members 502C, 502D to separate a central opening 502E defined by the base frame 502 into smaller sections. According to an alternate embodiment, a transparent window (not shown) may be used in place of the spanning members to allow an operator in the operator compartment 316 who is looking up to see through the central opening 502E.

The overhead guard assembly 500 may further comprise first and second extension members 504A, 504B that extend laterally from the respective first and second side bar members 502A, 502B. The extension members 504A, 504B effect an increase in a lateral width $L_{WG}$ of the overhead guard assembly 500, see FIG. 16. Front and back corner portions $506A_1$, $506A_2$, $506B_1$, $506B_2$ of the first and second extension members 504A, 504B provide the overhead guard assembly 500 with angled surfaces at its corners. Hence, when the vehicle 310 is traveling in a power unit-first or forks-first direction, contact between the first and second extension members 504A, 504B and objects, such as racks, pallets, etc., would not be at a 90 degree angle, which may reduce or prevent damage to the overhead guard assembly 500 and/or other parts of the platform assembly 314, i.e., since the objects may deflect off of the angled surfaces defined by the front or back corner portions $506A_1$, $506A_2$, $506B_1$, $506B_2$ instead of contacting non-angled surfaces at 90 degrees.

Figure 17A:
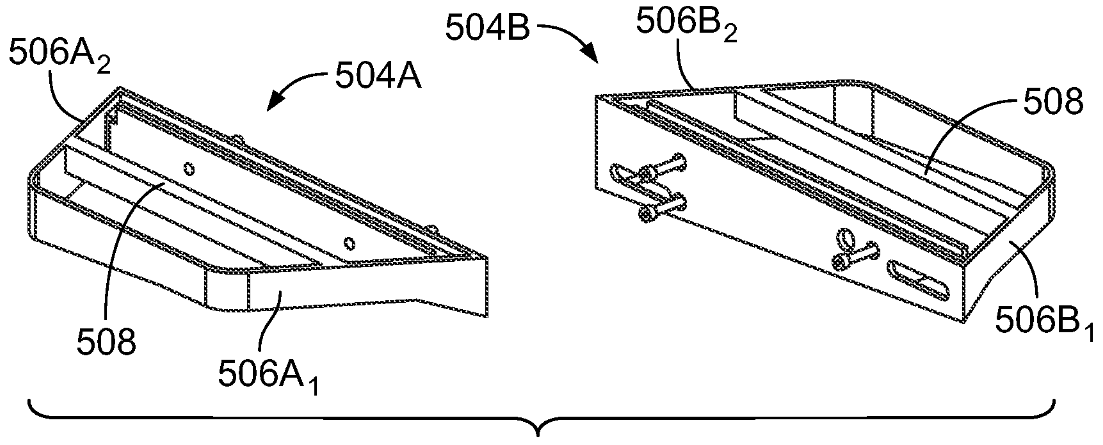
FIGS. 17A-17C are perspective views showing overhead guard extensions according to embodiments.
Figure 17B:
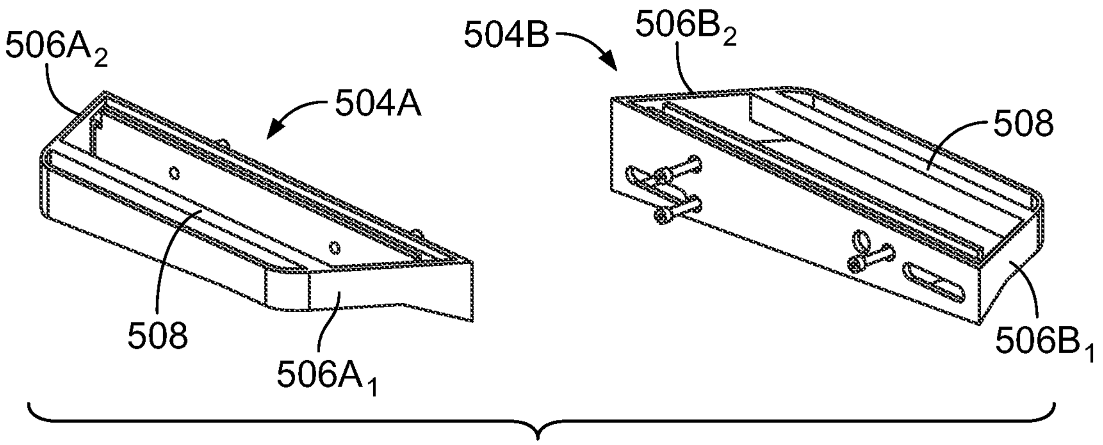
Figure 17C:
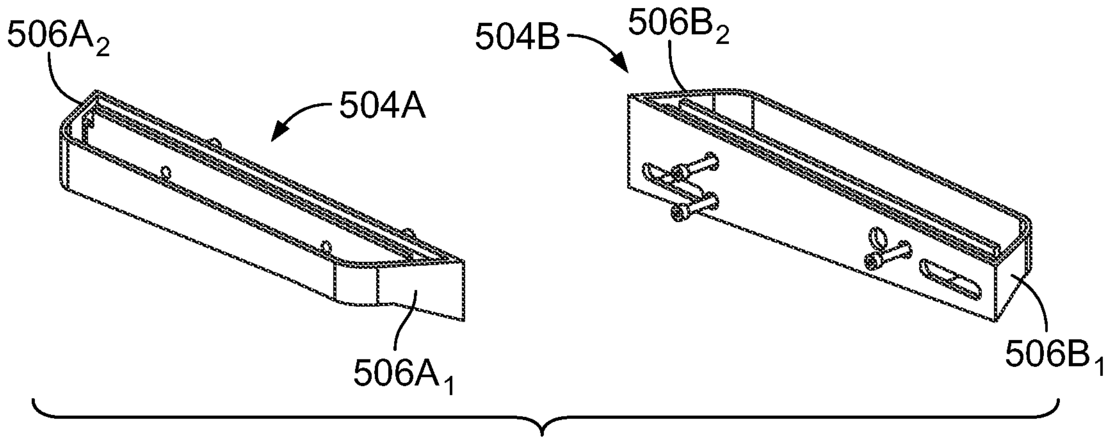
Figure 18:
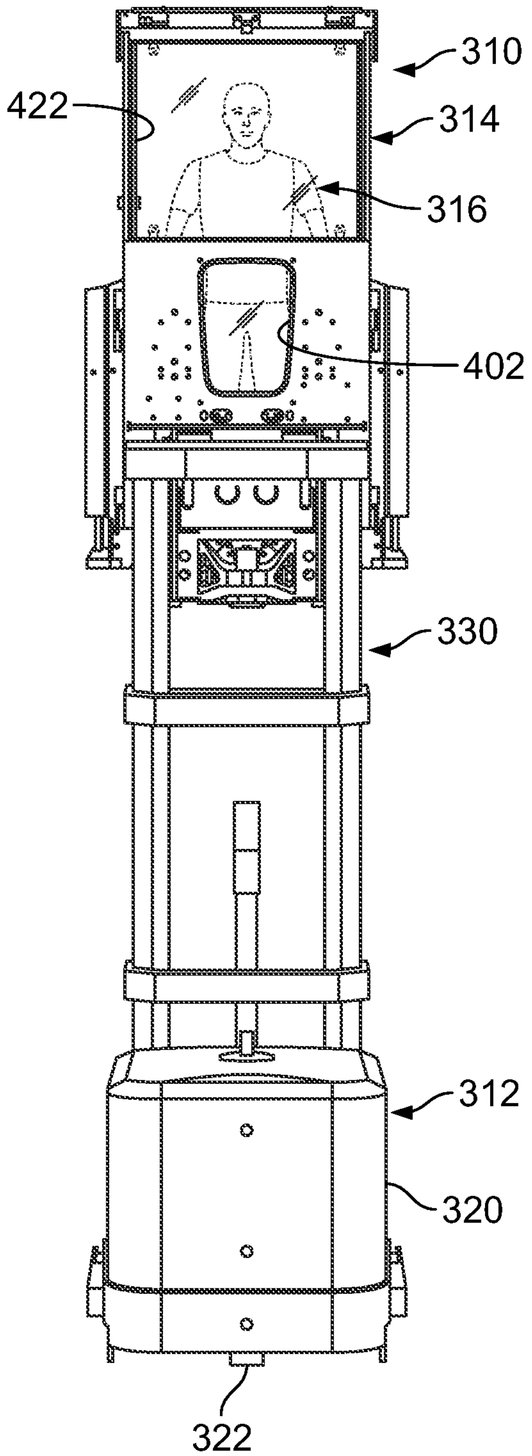
FIG. 18 is a back elevation view of the materials handling vehicle of FIG. 15 with the operator compartment and non-horizontal viewing window, shown in an elevated position.

First and second extension members 504A, 504B having different lateral widths according to additional embodiments are shown in FIGS. 17A-17C. In accordance with an aspect, the first and second extension members 504A, 504B selected for use on a particular vehicle 310 may be chosen based on a lateral width $L_{WF}$ of the floor surface 340 (see FIG. 15) of the operator compartment 316, e.g., the lateral width $L_{WG}$ of the overhead guard assembly 500, including the first and second extension members 504A, 504B, may be generally equal to the lateral width $L_{WF}$ of the floor surface 340. According to another embodiment, the lateral width $L_{WG}$ of the overhead guard assembly 500, including the first and second extension members 504A, 504B, may be greater than the lateral width $L_{WF}$ of the floor surface 340. The first and second extension members 504A, 504B shown in FIGS. 17A-17C also have the angled front and back corner portions $506A_1$, $506A_2$, $506B_1$, $506B_2$, and the first and second extension members 504A, 504B shown in FIGS. 17A-17B additionally include spanning members 508 that separate openings defined in an interior portion of the first and second extension members 504A, 504B into smaller sections.

Figure 27:
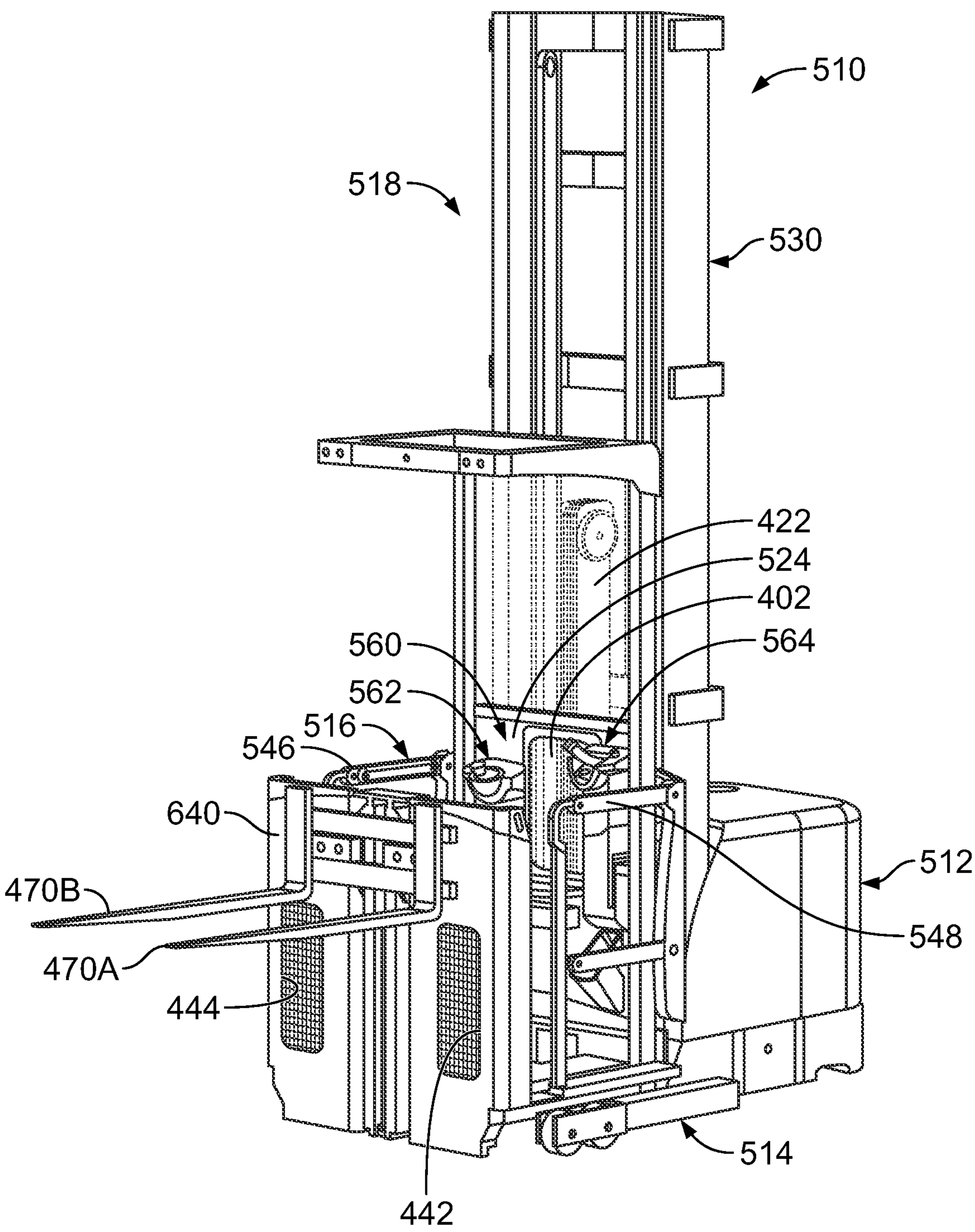
FIG. 27 is a perspective view of a materials handling vehicle where the platform assembly further includes an outer support wall, outer viewing windows, and fork carriage assembly movable relative to the outer support wall, according to embodiments.
Figure 30:
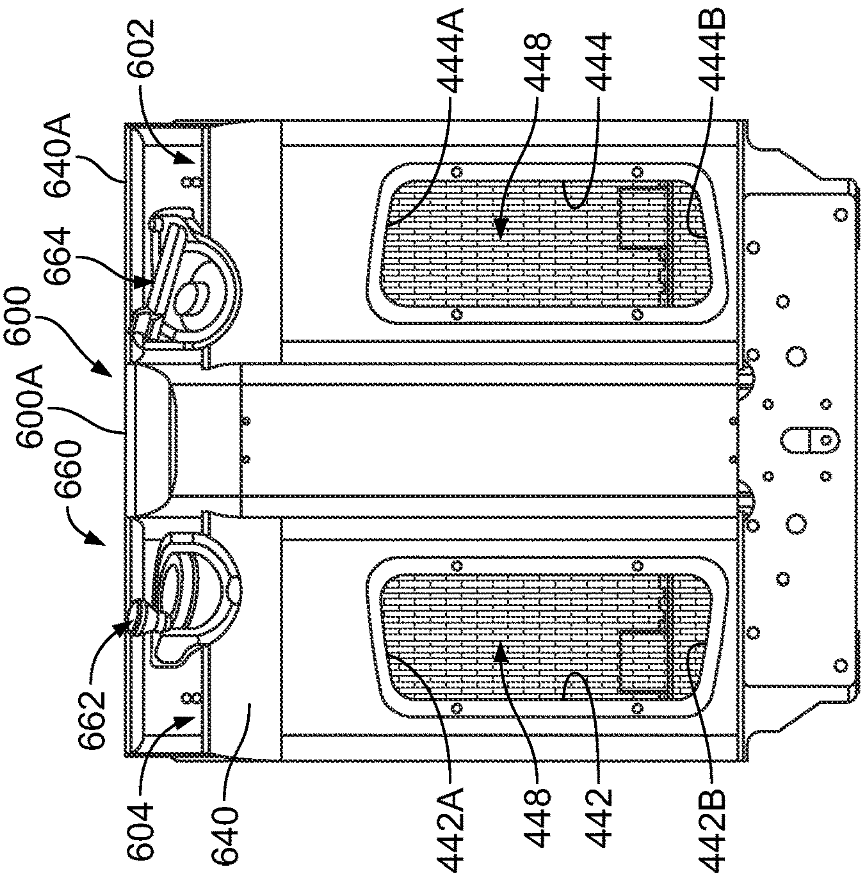
FIG. 30 is a partial front elevation view of the platform assembly including the outer support wall, outer viewing window, and operator control assembly, viewed from the operator compartment according to embodiments.
Figure 28:
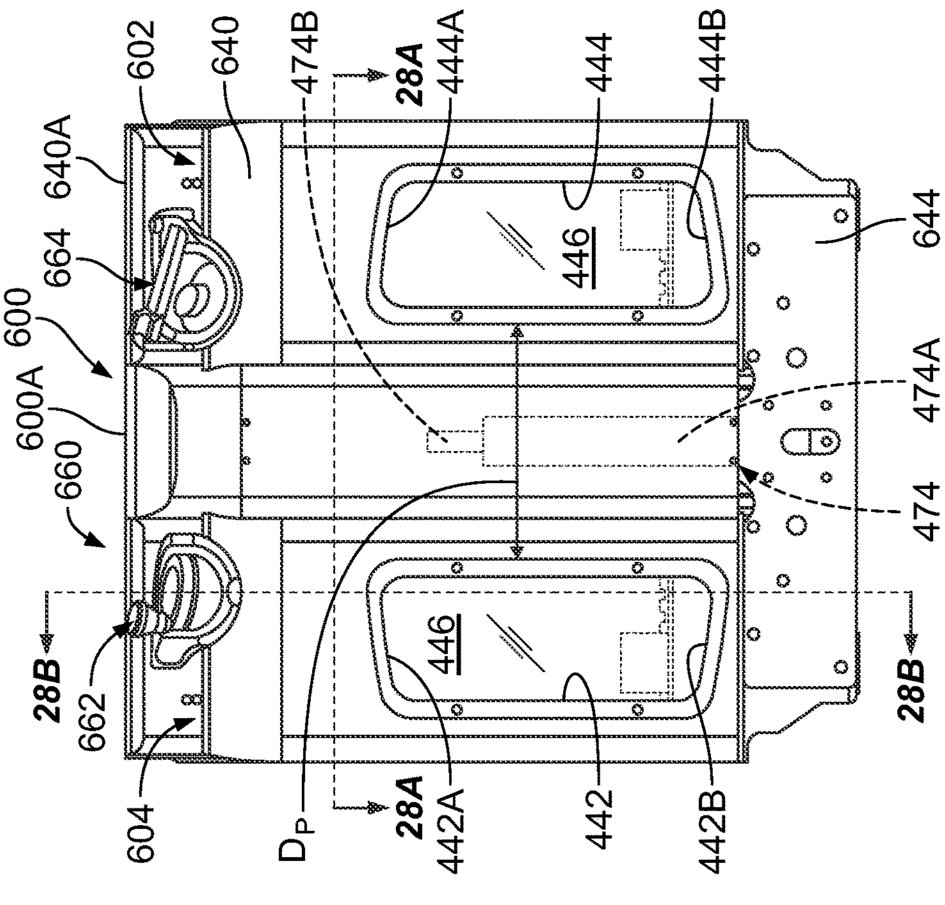
FIG. 28 is a partial elevation view of the platform assembly shown in FIG. 27 including the outer support wall, outer viewing windows, and operator control assemblies, viewed from the operator compartment according to embodiments.

Referring now to FIGS. 27-30, additional embodiments of a materials handling vehicle 510 are shown. As shown in FIG. 27, the vehicle 510 may include a power unit 512, a platform assembly 514, and a load handling assembly 518 with a mast assembly 530, which may be substantially similar to the vehicles 10 and 310 described herein. An operator compartment 516 may be at least partially defined by an inner support wall 524 including an inner viewing window 402, a floorboard 540 that defines a generally horizontal floor surface of the vehicle 510, and an outer support wall 640, in which the outer support wall 640 is connected to the floorboard 540 and opposite the inner support wall 524. First and second side restraints 546, 548 are provided on either side of the vehicle 510. As shown in FIG. 27, a first operator control system 560 (also referred to herein as an inner operator control system) is coupled to the inner support wall 524 and may comprise a first inner operator control assembly 562 and a second inner operator control assembly 564. As shown in FIGS. 28 and 30, a second operator control system 660 (also referred to herein as an outer operator control system) is coupled to the outer support wall 640 and may comprise a first outer operator control assembly 662 and a second outer operator control assembly 664. The first and second operator control systems 560 and 660 are positioned to allow for operation by an operator located within an operator compartment 516 of the vehicle 510, as described herein in more detail.

In the embodiments of FIGS. 27-30 at least one outer viewing window 442 or 444 is positioned in the outer support wall 640. First outer viewing window 442 and second outer viewing window 444 are located below the operator control assemblies 662, 664 of the outer operator control system 660 and spaced apart laterally a distance DP, see FIG. 28. First outer viewing window 442 has an upper end 442A and a lower end 442B, and second outer viewing window 444 has an upper end 444A and a lower end 444B. Each of the first and second outer viewing windows 442, 444 may comprise a clear pane 446 of suitable material, such as clear polymer, glass, mesh-reinforced glass, as illustrated in FIG. 28, or a see-through screen 448 as illustrated in FIG. 30.

Figure 28A:
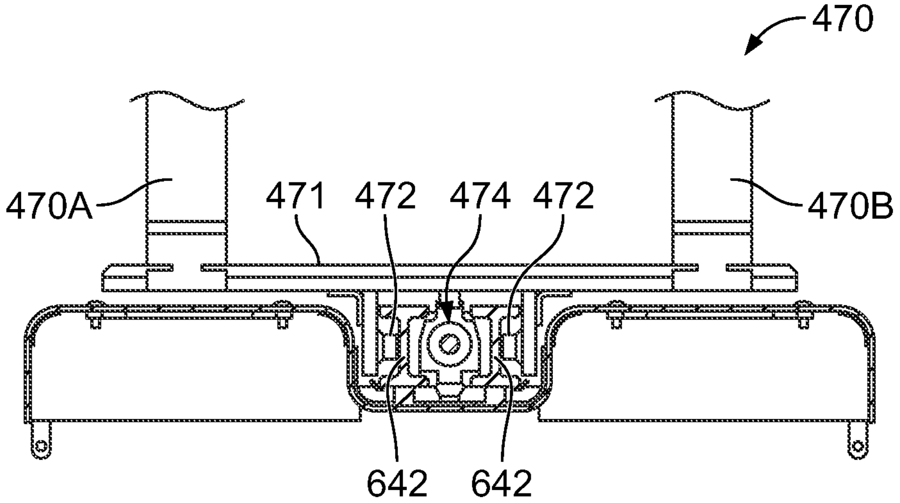
FIG. 28A is a cross-sectional view of FIG. 28 at line 28A-28A showing the movable fork carriage assembly.
Figure 28B:
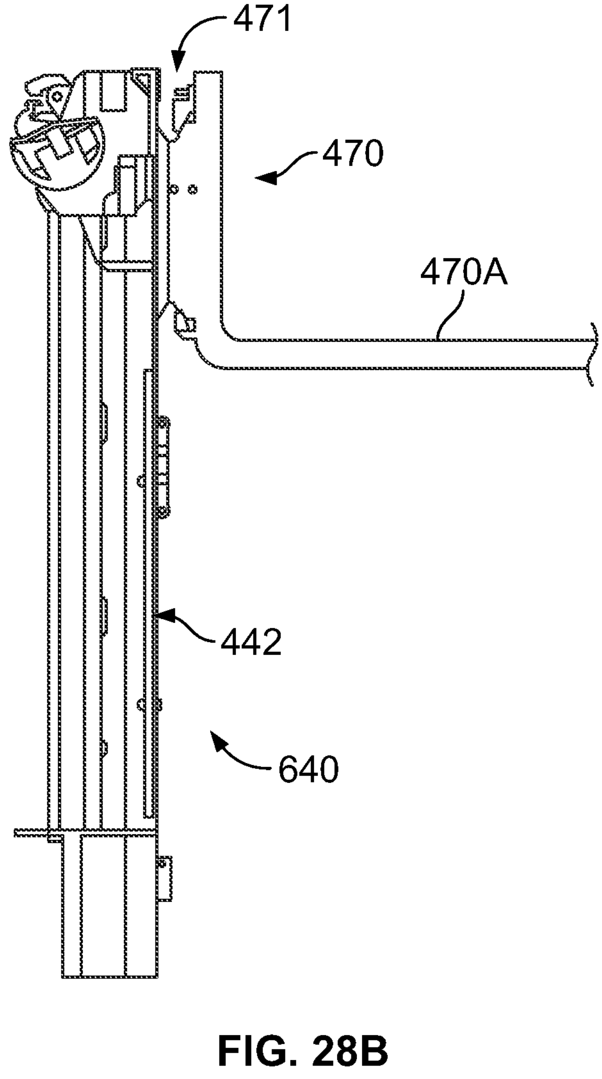
FIG. 28B is a cross-sectional view of FIG. 28 at line 28B-28B showing the movable fork carriage assembly in an elevated, upper position.
Figure 29:
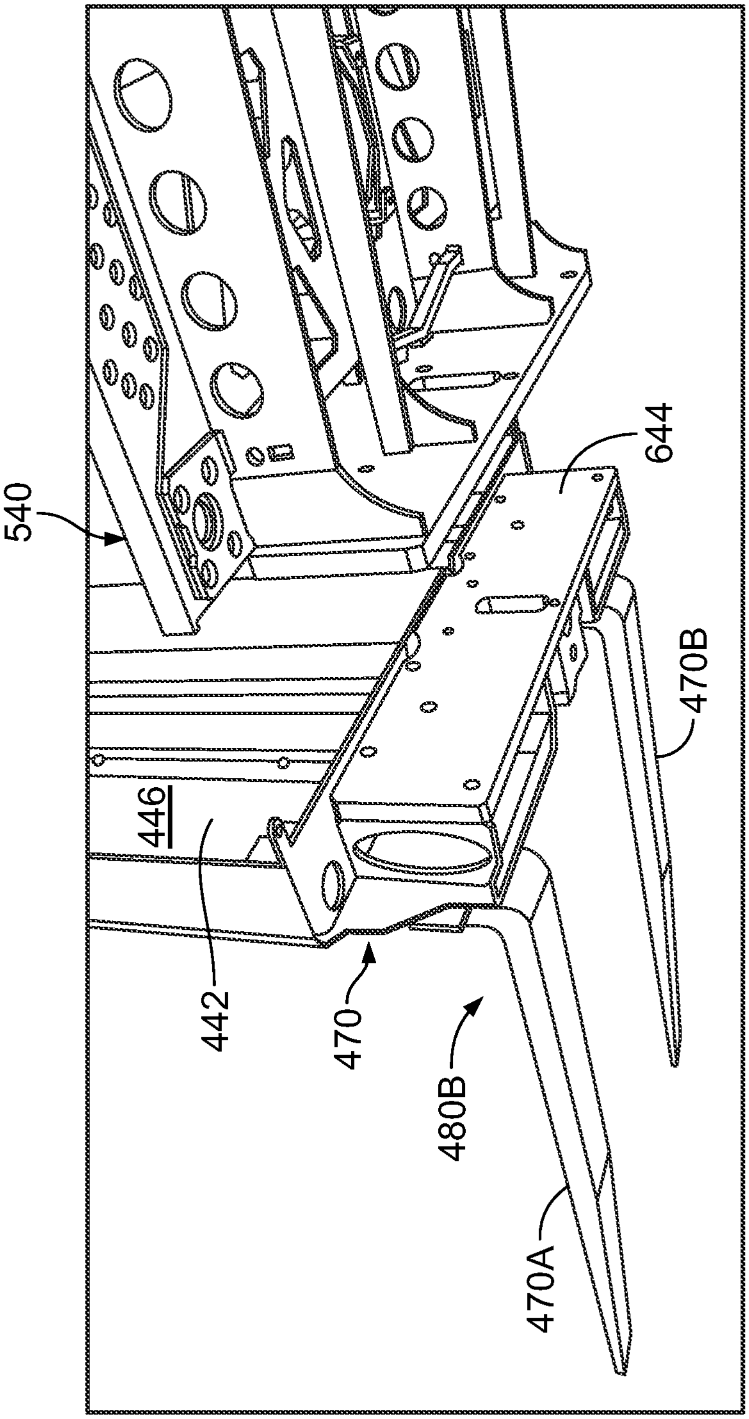
FIG. 29 is a partial bottom perspective view of the platform assembly of FIG. 27 with the fork carriage assembly in a lowered position and the outer support wall separated from the floorboard.

Illustrated in FIGS. 27, 28A and 28B, a fork carriage assembly 470 is coupled to the outer support wall 640 and includes first and second forks 470A and 470B and a movable fork carriage 471 to which the forks 470A and 470B are coupled for movement with the movable fork carriage 471. A ram/cylinder assembly 474 is provided for moving the fork carriage 471 and forks 470A and 470B vertically relative to the outer support wall 640. The fork carriage 471 includes rollers 472 that move within tracks of rails 642 forming part of the outer support wall 640, see FIG. 28A. The cylinder 474A of the ram/cylinder assembly 474 is fixed to a base member 644 of the outer support wall 640, see FIGS. 28 and 29. The ram 474B of the ram/cylinder assembly 474 may be fixed to the fork carriage assembly 470 such that movement of the ram 474B effects movement of the fork carriage assembly 470. Alternatively, a chain (not shown) may be fixed at one end to the cylinder 474A and at a second end to the fork carriage assembly 470. A roller may be fixed to an end of the ram 474B which roller engages the chain to effect lift of the fork carriage assembly 470. When the fork carriage assembly 470 is raised to an upper position, see FIG. 28B, the forks 470A and 470B are positioned such that an operator can view downwardly below the forks through the first and second outer viewing windows 442 and 444.

Figure 31:
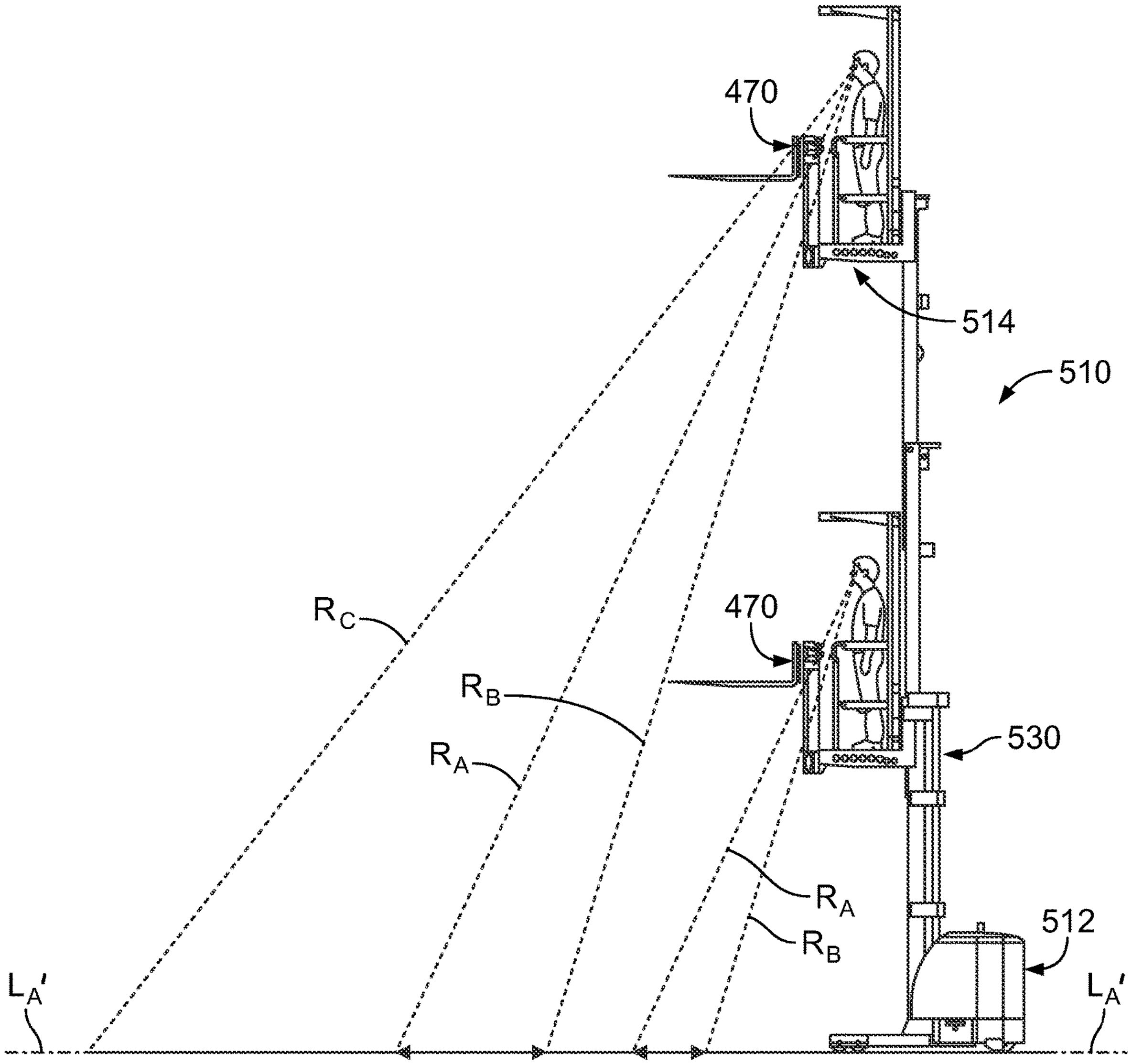
FIG. 31 is a side elevation view of the materials handling vehicle of FIG. 27 shown in both a partially elevated position and a fully elevated position according to embodiments, illustrating view lines through the non-horizontal viewing window in the outer support wall.

With reference to FIG. 31, the operator of materials handling vehicle 510 may see, without bending, through outer viewing windows 442, 444 along view lines $R_A$ and $R_B$, enabling the operator to view rearward areas, also referred to as "fork facing areas," to the left, right and rearward along the longitudinal axis $L_A'$ of vehicle 510. View lines $R_B$ extend from the operator's eye through the lower ends 442B and 444B of viewing windows 442, 444, respectively; and view lines $R_A$ extend from the operator's eye through the upper end 442A, 444A of viewing windows 442, 444. It is noted that the location of the view lines $R_A$ and $R_B$ may change based on operator height and position. Depending on the elevation of the platform assembly 514, the view area between view lines $R_A$ and $R_B$ may be steeper and narrower or less steep and broader as illustrated from the operator's perspective in FIG. 31.

With reference to FIGS. 32-38, the inner and outer operator control systems 560, 660 of the materials handling vehicle 510 of FIGS. 27-31 will be described in more detail (the side restraints 546, 548 are removed to illustrate other aspects in detail). While operating the vehicle 510 shown in FIG. 32, the operator stands on the floorboard 540 in the operator compartment 516 at one of a first operator station 542 (also referred to herein as an inner operator station) or a second operator station 543 (also referred to herein as an outer operator station). An operator presence sensor 544, e.g., a pressure switch, is provided in the floorboard 540 and senses an operator's foot. As described herein, one or more functions of the vehicle may be disabled unless the operator presence sensor 544 indicates the presence of the operator in the operator compartment 516.

Figure 32:
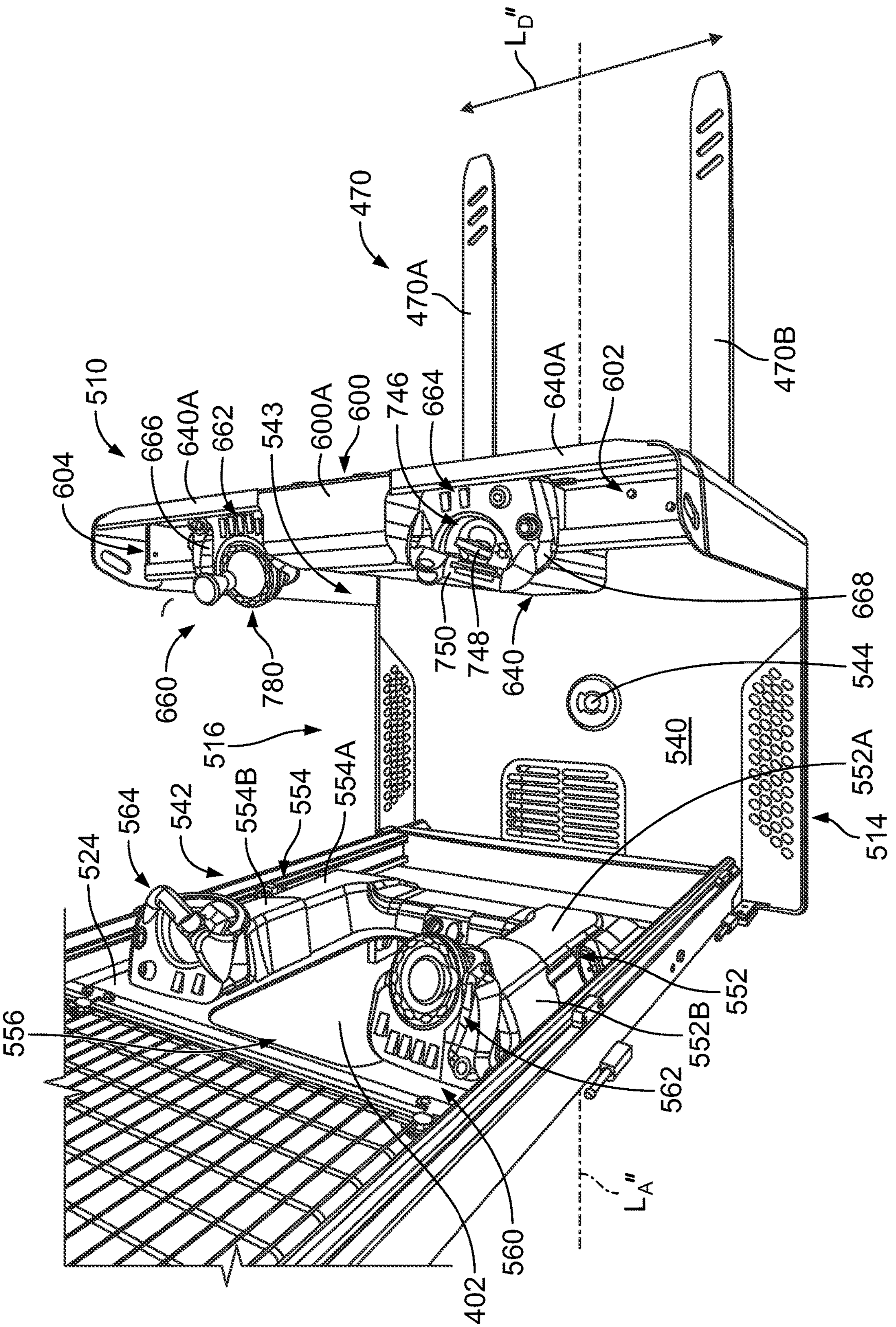
FIG. 32 is a detailed top, perspective view of the materials handling vehicle of FIG. 27 comprising an inner operator control system and an outer operator control system.

With continued reference to FIG. 32, the inner operator station 542 may be substantially similar to the operator station 42, 342 described herein and may comprise a first support structure 552 and a second support structure 554. The first and second support structures 552, 554 may be spaced apart from each other in a lateral direction $L_{D''}$ that is perpendicular to a longitudinal axis $L_{A''}$ of the vehicle 510. The first and second support structures 552, 554 are separated by a recessed portion 556 of the vehicle 510 that defines an open area extending downward from upper surfaces (not labeled) of the first and second support structures 552, 554 toward the floorboard 540.

The inner operator control system 560 comprises the first and second operator control assemblies 562, 564, which are provided at the inner operator station 542 and are coupled to the inner support wall 524 to allow for operation by an operator located at the inner operator station 542, e.g., by an operator facing toward the inner support wall 524. The first and second operator control assemblies 562, 564 are used to drive the vehicle 510 and to control one or more other vehicle functions, as described in detail herein. In the illustrated embodiment, the first operator control assembly 562 is provided to control steering of the vehicle 510 and optionally to control additional vehicle functions, and the second operator control assembly 564 is provided to control a traveling direction of the vehicle 510, load handling assembly lift and lower functions, and optionally other vehicle functions, as described in greater detail herein above in relation to first and second operator control assemblies 62, 64.

Figure 33:
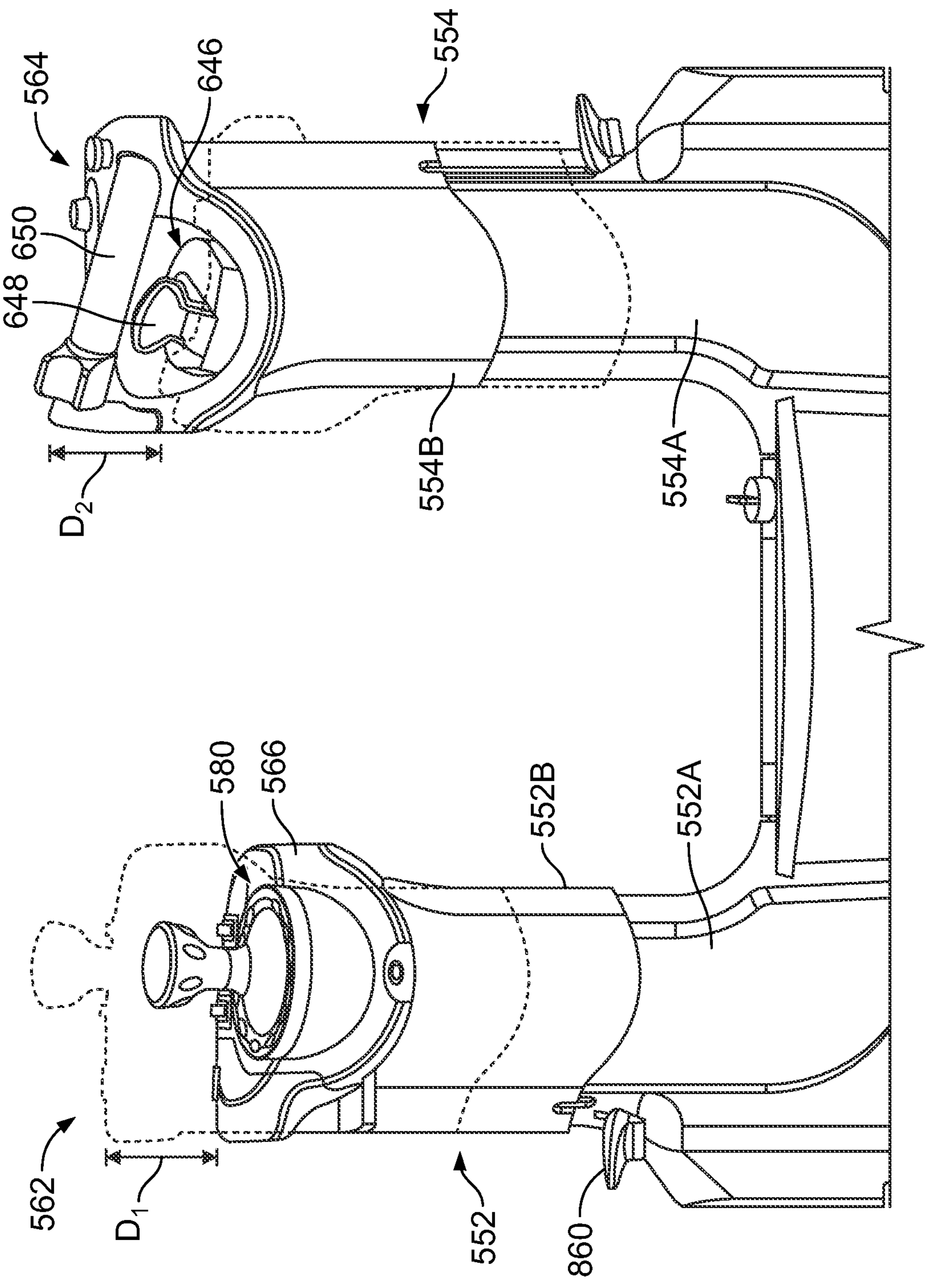
FIG. 33 is a front elevation view of the inner operator control system shown in FIG. 32.
Figure 36:
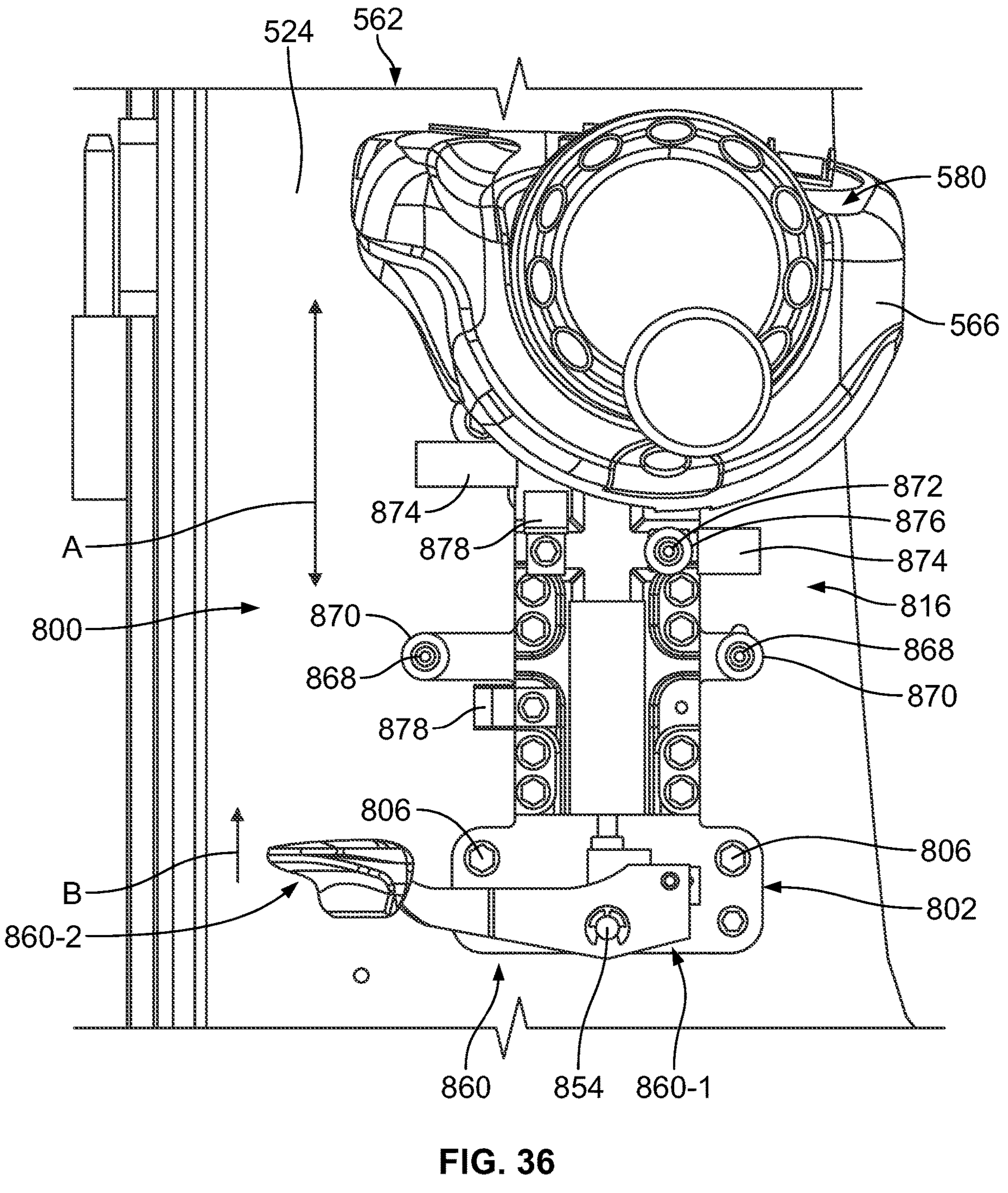
FIG. 36 is a front elevation view of one of the operator control assemblies shown in FIG. 33 in which a portion of a housing is removed.

With reference to FIGS. 33 and 36, the first operator control assembly 562 may be substantially similar to the first operator control assembly 62, as described herein. The first operator control assembly 562 is associated with the first support structure 552 and comprises a first housing 566 that may be separate from, but mounted to, the first support structure 552 via fasteners, adhesive, etc. In other examples, the first housing 566 may be integral with a portion of the first support structure 552 (see FIG. 2A). The first operator control assembly 562 further comprises a steering assembly 580. As described in detail herein with respect to the first operator control assembly 62 and the steering assembly 80, the steering assembly 580 is movable between a first position (shown in FIG. 33) and a second position (shown in FIG. 36) and may be locked in these two positions via a lock assembly (not labeled).

With reference to FIG. 33, the second operator control assembly 564 may be substantially similar to the second operator control assembly 64, as described herein. The second operator control assembly 564 is associated with the second support structure 554 and comprises a second housing 582 that may be separate from, but mounted to, the second support structure 554 via fasteners, adhesive, etc. In other examples, the second housing 582 may be integral with the second support structure 554 (see FIG. 2A). The second operator control assembly 564 comprises a housing recess 646 that extends downwardly in a direction toward the floorboard 540 of the operator compartment 516 (see FIG. 32); a control element 648 mounted to the second housing 582 and extends outwardly from the housing recess 646; and an elongate grip member 650 mounted to the second housing 582 and extending over the housing recess 646. The control element 648 and elongate grip member 650 may be substantially similar to the control element 142 and elongate grip member 150 of the second operator control assembly 64, and one or both of the control element 648 and the elongate grip member 650 may be removed and replaced with a replacement control element and/or replacement grip member (not shown) having different dimensions and/or different configurations than the original (replaced) control element 648 and/or elongate grip member 650 (see FIGS. 10A-11F).

Figure 34:
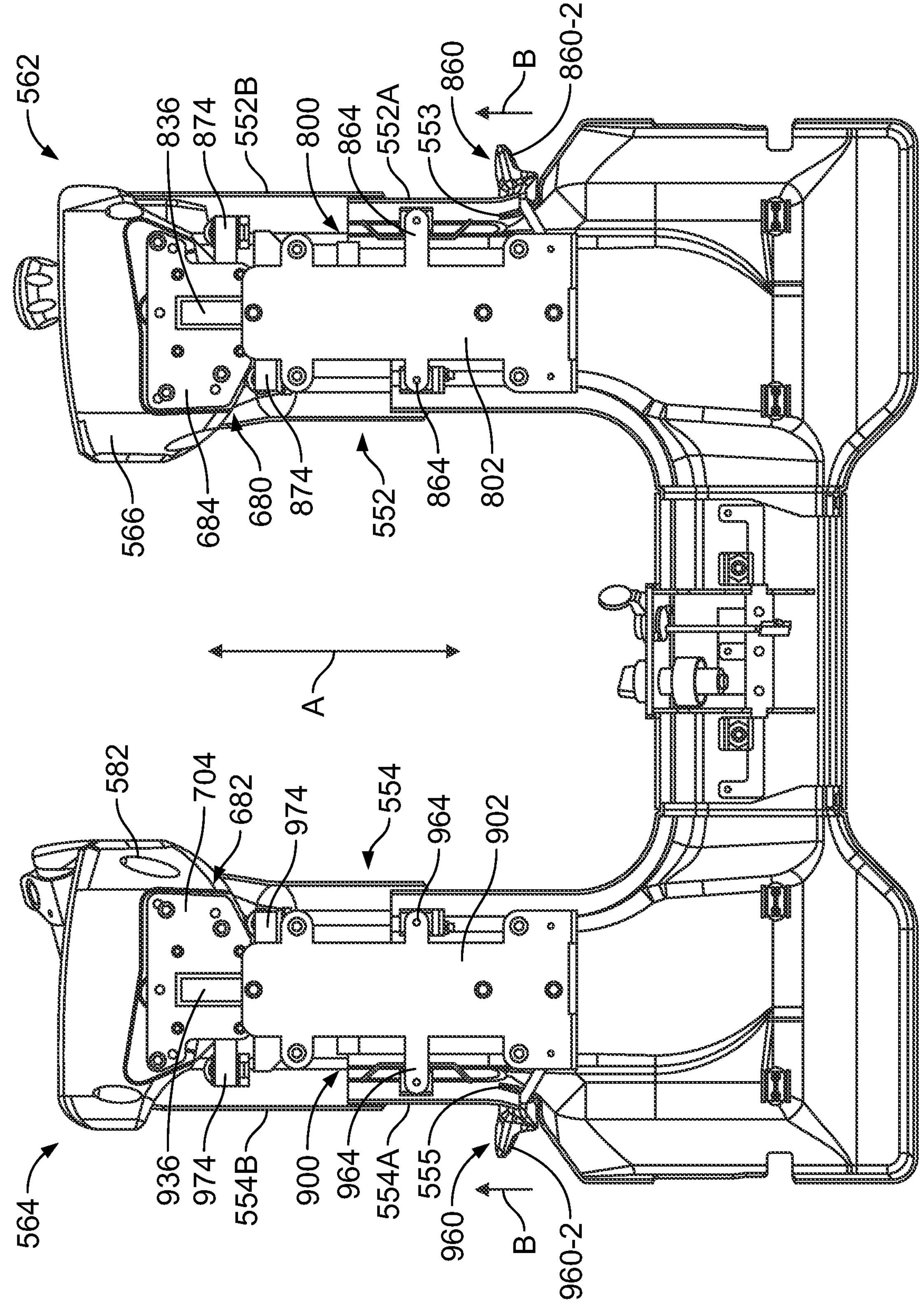
FIGS. 34 and 35 are back elevation views of the operator control system shown in FIG. 33.

Similar to the first and second operator control assemblies 62, 64, the first and second operator control assemblies 562, 564 may optionally be mounted to the first and second support structures 552, 554 to allow the first and/or second operator control assemblies 562, 564 to be positioned in multiple respective positions relative to the first and second support structures 552, 554. With reference to FIG. 34, the first and second operator control assemblies 562, 564 may comprise respective first and second fixture structures 680, 682, e.g., mounting plates 684, 704, which may be substantially similar to the mounting plates 184, 204 associated with the first and second operator control assemblies 62, 64, respectively. As described herein, the mounting plates 684, 704 may support the first and second operator control assemblies 562, 564 in respective first and second angular orientations relative to the first and second support structures 552, 554 (see FIGS. 12A-13D). Also as described herein, the first and second support structures 552, 554 may be positioned closer to one another in a narrow width vehicle and further away from one another in a wide width vehicle. The angular orientation of one or both of the first and second operator control assemblies 562, 564 may be selected to provide preferred ergonomic hand positioning for a narrower width vehicle or a wider width vehicle.

Alternatively, or in addition, a vertical position of the first and second operator control assemblies 562, 564 relative to the floorboard 540 (e.g., in a direction substantially parallel to the vertical plane $V_P$ shown in FIG. 1) may be adjustable to achieve ergonomic positioning for operators of varying dimension (e.g., height, arm length, etc.) and to accommodate operator preference. With reference first to FIG. 33, the first support structure 552 may comprise a fixed housing portion 552A and a movable housing portion 552B that is movable relative to the fixed housing portion 552A. The second support structure 554 may similarly comprise a fixed housing portion 554A and a movable housing portion 554B that is movable relative to the fixed housing portion 554A. As described herein in more detail, the movable housing portions 552B, 554B may be positioned to telescope over the respective fixed housing portions 552A, 554A as the vertical position of the first and second operator control assemblies 562, 564 is adjusted.

The first operator control assembly 562 and movable housing portion 552B in FIG. 33 are shown in a lowered position with solid lines, and an outline of the first operator control assembly 562 and movable housing portion 552B in a raised position is indicated with dashed lines. The second operator control assembly 564 and movable housing portion 554B are shown in a raised position with solid lines, and an outline of the second operator control assembly 564 and movable housing portion 554B in a lowered position is indicated with dashed lines. As described herein in more detail, the first operator control assembly 562 may be fixedly coupled to the movable housing portion 552B, such that the first operator control assembly 562 and movable housing portion 552B move together, and the second operator control assembly 564 may similarly be fixedly coupled to the movable housing portion 554B, such that the second operator control assembly 564 and movable housing portion 554B move together. The first and second operator control assemblies 562, 564 may each be movable continuously between respective raise and lowered positions to allow the first and second operator control assemblies 562, 564 to be arranged at a desired vertical position. The first operator control assembly 562 and movable housing portion 552B, when moving between the lowered position and the raised position, may be movable by a distance $D_1$. The second operator control assembly 564 and movable housing portion 554B, when moving between the lowered position and the raised position, may similarly be movable by a distance $D_2$. In some examples, the distances $D_1$ and $D_2$ may be between about 0.1 to about four inches.

Figure 37:
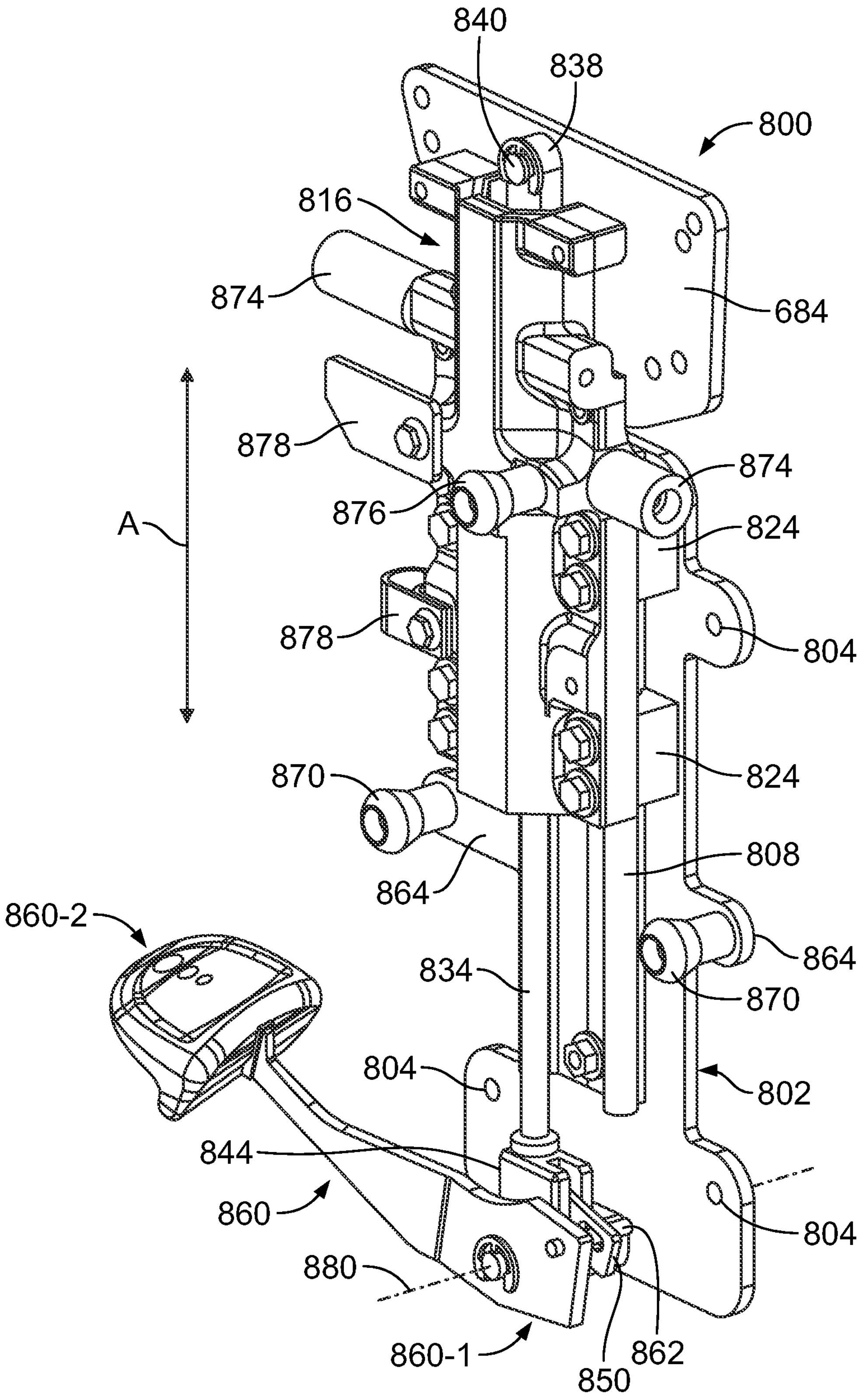
FIG. 37 is a perspective view of a vertical adjustment assembly for adjusting a vertical position of the operator control assembly of FIG. 36.
Figure 38:
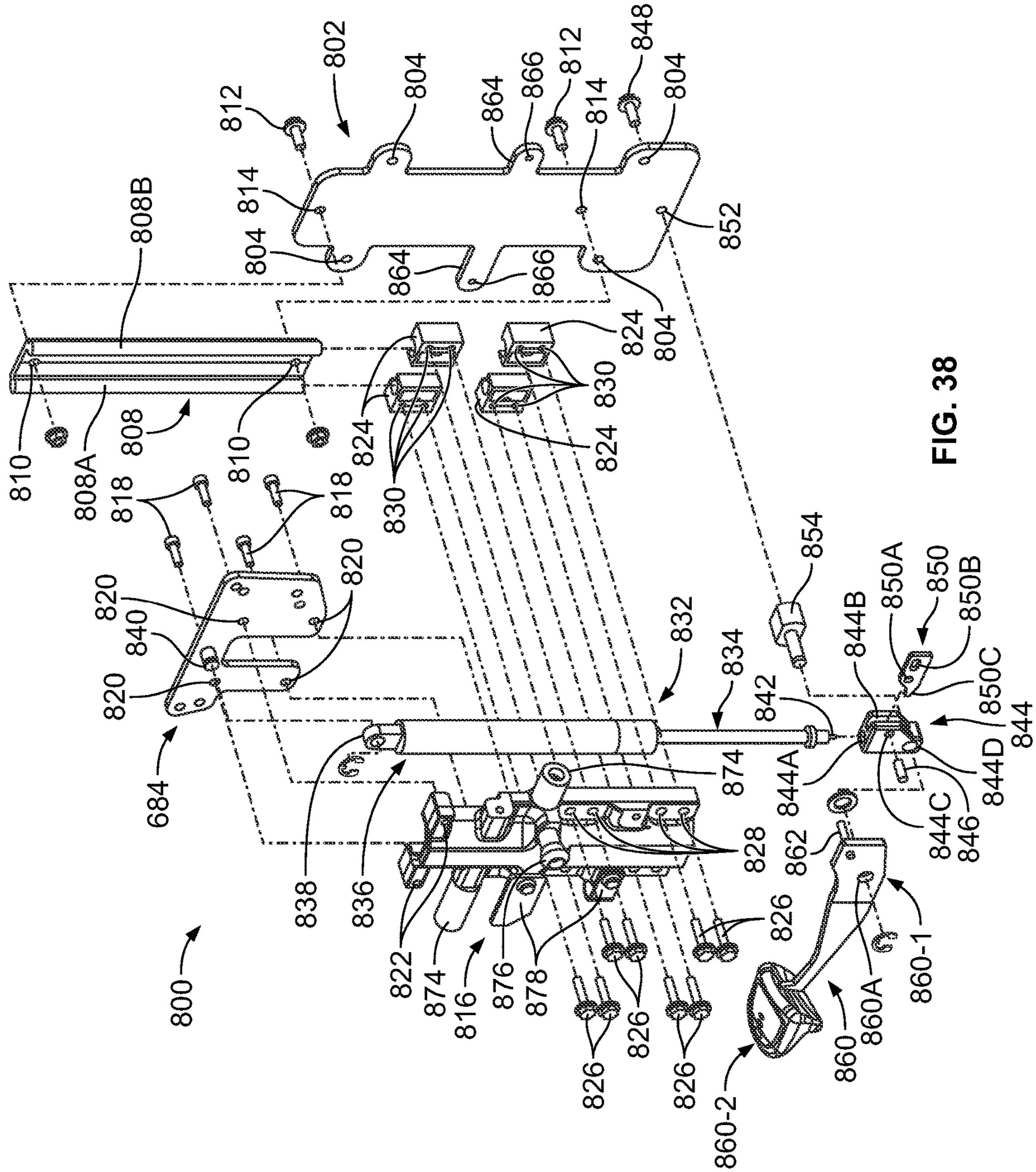
FIG. 38 is an exploded view of the vertical adjustment assembly shown in FIG. 37.

With reference to FIGS. 36-38, a first vertical adjustment assembly 800 for selectively supporting the first operator control assembly 562 at a plurality of vertical positions is illustrated. The first vertical adjustment assembly 800 is coupled to the first operator control assembly 562 to provide for movement of the first operator control assembly 562 in a vertical direction indicated by arrow A relative to the floorboard 540 (see FIG. 32) and relative to the fixed housing portion 552A. The first vertical adjustment assembly 800 may comprise a first mounting plate 802 that fixedly couples the first vertical adjustment assembly 800 to the inner support wall 524. For example, the first mounting plate 802 may comprise a plurality of openings 804 and a plurality of fasteners 806 such as bolts, which extend through the openings 804 and are received in corresponding openings (not shown) formed in the inner support wall 524 to attach the first mounting plate 802 to the inner support wall 524. In other examples, the first mounting plate 802 may be welded or otherwise attached to the inner support wall 524.

The first vertical adjustment assembly 800 may further comprise a rail member 808 that is coupled to the first mounting plate 802. For example, a plurality of fasteners 812 such as bolts may extend through a plurality of openings 814 formed in the first mounting plate 802 and may be received in corresponding openings 810 formed in the rail member 808 to attach the rail member 808 to the first mounting plate 802. In other examples, the rail member 808 may be welded or otherwise attached to the first mounting plate 802.

With continued reference to FIGS. 36-38, the fixture structure 680, i.e., the mounting plate 684, of the first operator control assembly 562 may be coupled to the first mounting plate 802 and to the rail member 808 via a carriage assembly 816. For example, the mounting plate 684 may comprise a plurality of openings 820, and a plurality of fasteners 818 may extend through the openings 820 and may be received in corresponding openings 822 formed in the carriage assembly 816 to couple the mounting plate 684 to the carriage assembly 816. The carriage assembly 816 may be movably coupled to the rail member 808 via a plurality of linear bearing blocks 824. The linear bearing blocks 824 may be coupled to the carriage assembly 816 via a plurality of fasteners 826, which extend through a plurality of openings 828 formed in the carriage assembly 816 and are received in corresponding opening 830 formed in the linear bearing blocks 824. As described herein in more detail, the linear bearing blocks 824 slide vertically along the rail member 808 to effect vertical movement of the carriage assembly 816.

In the embodiment shown, the rail member 808 comprises first and second rails 808A, 808B, and the carriage assembly 816 comprises four linear bearing blocks 824. A first pair of the linear bearing blocks 824 engage the first rail 808A, and a second pair of the linear bearing blocks 824 engage the second rail 808B. In other examples (not shown) the rail member 808 may comprise a single rail or three or more rails, and the number of linear bearing blocks 824 may be varied as desired to achieve a stable coupling between the carriage assembly 816 and the rail member 808. Cables, wiring, etc. (not shown) extending between the first operator control assembly 562 and the vehicle electronic processor or controller provide control signals to the electronic processor/controller to control respective functions of the vehicle 510. The carriage assembly 816 may optionally comprise one or more cable guides 878 that secure the cables and prevent them from interfering with vertical movement of the first operator control assembly 562.

The first mounting plate 802 may be coupled to the fixed housing portion 552A of the first support structure 552. For example, as shown in FIGS. 36-38, the first mounting plate 802 may comprise one or more extensions 864 with openings 866 formed therein. Fasteners 868 extend through spacers 870 and are received in the openings 866. The spacers 870 surround the fasteners 868, and upon receipt of the fasteners 868 in the openings 866, the spacers 870 may extend outward from an inner face (not labeled) of the first mounting plate 802, i.e., the portion of the first mounting plate 802 facing toward the operator compartment 516. With reference to FIG. 34, in which an outer face (not labeled) of the first mounting plate 802 (i.e., the portion of the first mounting plate 802 facing away from the operator compartment 516) is visible, the fixed housing portion 552A may comprise, for example, brackets (not labeled) that engage the first mounting plate 802 (e.g., the spacers 870 extending outward from the inner face) to secure the fixed housing portion 552A to the first mounting plate 802.

The carriage assembly 816 may similarly be coupled to the movable housing portion 552B of the first support structure 552. For example, as shown in FIGS. 36-38, the carriage assembly 816 may comprise one or more threaded bores (not visible) formed in an inner face and/or one or more side faces (not labeled), which receive fasteners 872 (only one fastener 872 is visible in FIG. 36). Each fastener 872 comprises a respective spacer 874, 876 that surrounds the fastener 872, and upon receipt of the fasteners 872 in the threaded bores, the spacers 874, 876 may extend outward from the inner and/or side face(s) of the carriage assembly 816. The movable housing portion 552B may comprise brackets (not labeled) that engage the carriage assembly 816 (e.g., the spacers 874, 876 extending outward from the inner and/or one or more side faces) to secure the movable housing portion 552B to the carriage assembly 816 (the spacers 874 extending outward from the side faces of the carriage assembly 816 may be seen in FIG. 34).

As best seen in FIGS. 37 and 38, the first vertical adjustment assembly 800 further comprises a locking gas spring 832 that controls the vertical position and movement of the carriage assembly 816 and the mounting plate 684 (and thus the first operator control assembly 562) relative to the first mounting plate 802 and the rail member 808. The locking gas spring 832 may comprise a rod 834 and a cylinder 836. One end of the cylinder 836 comprises a fitting 838 that engages a protrusion 840 formed on the mounting plate 684. A snap ring (not labeled) may be used to secure the fitting 838 to the protrusion 840.

A receiver 844 may be coupled to the first mounting plate 802 by, for example, a fastener 848 that extends through an opening 852 and is received in an internally threaded bore of a standoff 854. An opposing end of the rod 834, which may comprise a release valve 842, is inserted into an opening 844A formed in the receiver 844. The receiver 844 comprises a slot 844B that receives a cam 850. An opening 844C is formed through the portion of the receiver 844 comprising the slot 844B, and a pin 846 extends through the opening 844C and through an opening 850A formed in the cam 850 to pivotably secure the cam 850 to the receiver 844. A lower portion of the opening 844A may be in communication with the slot 844B, such that when the rod 834 of the locking gas spring 832 is inserted into the opening 844A, an extension 850C of the cam 850 is positioned adjacent to, or in contact with, the release valve 842.

A lever 860 is positioned below the locking gas spring 832 and is coupled to the receiver 844 and to the cam 850 to operate the release valve 842 of the locking gas spring 832. The lever 860 comprises a fixed end 860-1 and a free end 860-2. In the embodiment shown, the standoff 854 may extend through an opening 844D formed in the receiver 844 and through an opening 860A formed in the fixed end 860-1 of the lever 860. A snap ring (not labeled) may be used to secure the fixed end 860-1 of the lever 860 to the receiver 844 and pivotably couple the lever 860 to the receiver 844. The fixed end 860-1 of the lever 860 comprises a protrusion 862 that is received in an opening 850B formed in the cam 850. The standoff 854 maintains the necessary spacing to prevent contact between the protrusion 862 and the first mounting plate 802.

With reference to FIGS. 34-38, operation of the first vertical adjustment assembly 800 will be described in detail. As shown in FIGS. 34 and 36, the free end 860-2 of the lever 860 is in a rest or first position, and the first operator control assembly 562 is in a lowered position, i.e., a first vertical position. An operator applies an upward force to the free end 860-2 of the lever 860, as indicated by arrow B, to move the free end 860-2 of the lever 860 from the first position to a raised or second position shown in FIGS. 35 and 37. The fixed housing portion 552A may comprise a slot 553 that accommodates movement of the lever 860.

Movement of the free end 860-2 of the lever 860 from the first to the second position causes the fixed end 860-1 of the lever 860 to rotate about an axis 880 shown in FIG. 37. Engagement between the cam 850 and the protrusion 862 formed on the lever 860 causes the cam 850 to pivot, such that the extension 850C of the cam 850 moves upward and actuates, e.g., depresses, the release valve 842. Actuation of the release valve 842 unlocks the locking gas spring 832 and permits vertical movement of the first operator control assembly 562 in the direction indicated by arrow A. The mounting plate 684 moves upward with the cylinder 836 of the locking gas spring 832 due to the engagement between the fitting 838 and the protrusion 840 (a portion of the cylinder 836 is visible in FIGS. 34 and 35). The carriage assembly 816, which is coupled to the mounting plate 684, slides upward along the rail member 808 via the linear bearing blocks 824, and the movable housing portion 552B, which is coupled to the carriage assembly 816, telescopes upward along the fixed housing portion 552A. Thus, the first operator control assembly 562 and the movable housing portion 552B (via the carriage assembly 816 and the mounting plate 684) move from the first vertical position shown in FIGS. 34 and 36 toward a second vertical position, i.e., the raised position shown in FIGS. 35 and 37.

In some examples, the locking gas spring 832 may be configured such that the cylinder 836 immediately moves upward (i.e., away from the release valve 842) upon actuation of the release valve 842, without the need for the application of an additional force. In other examples, the locking gas spring 832 may be configured such that an additional upward force is needed to effect upward movement, e.g., the operator may actuate the lever 860 with a foot or with one hand and may use the other hand to exert an additional upward force on the first operator control assembly, e.g., the first housing 566, to guide the first operator control assembly 562 to the desired position. In further examples, the first vertical adjustment assembly 800 may optionally comprise one or more additional structures, e.g., a cable assembly (not shown) extending between the lever 860 and the locking gas spring 832, that actuate the release valve 842 to unlock the locking gas spring 832, and in some particular examples, the lever 860 may be positioned at a different location on the first support structure 552 or the first operator control assembly 562 (e.g., above all or part of the locking gas spring 832).

Following placement of the first operator control assembly 562 at the desired vertical position, the operator releases the free end 860-2 of the lever 860. The free end 860-2 of the lever 860 returns to the first position, which disengages the extension 850C of the cam 850 from the release valve

842 and causes the locking gas spring 832 to lock, thereby fixing the first operator control assembly 562 in place.

To lower the first operator control assembly 562, the operator moves the free end 860-2 of the lever 860 from the first position to the second position by applying an upward force in the direction indicated by arrow B with a foot or one hand, which depresses the release valve 842 and unlocks the locking gas spring 832. The operator then applies a downward force to the first operator control assembly 562, e.g., to the first housing 566, with the other hand to cause a downward movement of the first operator control assembly 562 in the direction indicated by arrow A. The mounting plate 684 and carriage assembly 816 move downward with the cylinder 836 of the locking gas spring 832, such that the first operator control assembly 562 and the movable housing portion 552B move from a first vertical position (in this case, the raised position shown in FIG. 35) toward a second vertical position (in this case, the lowered position shown in FIGS. 34 and 36). Following placement of the first operator control assembly 562 at the desired vertical position, the operator releases the free end 860-2 of the lever 860, which causes the locking gas spring 832 to lock again, thereby fixing the first operator control assembly 562 in place. The fixed housing portion 552A, the first mounting plate 802, and the rail member 808 remain stationary during adjustment of the first operator control assembly 562.

Figure 35:
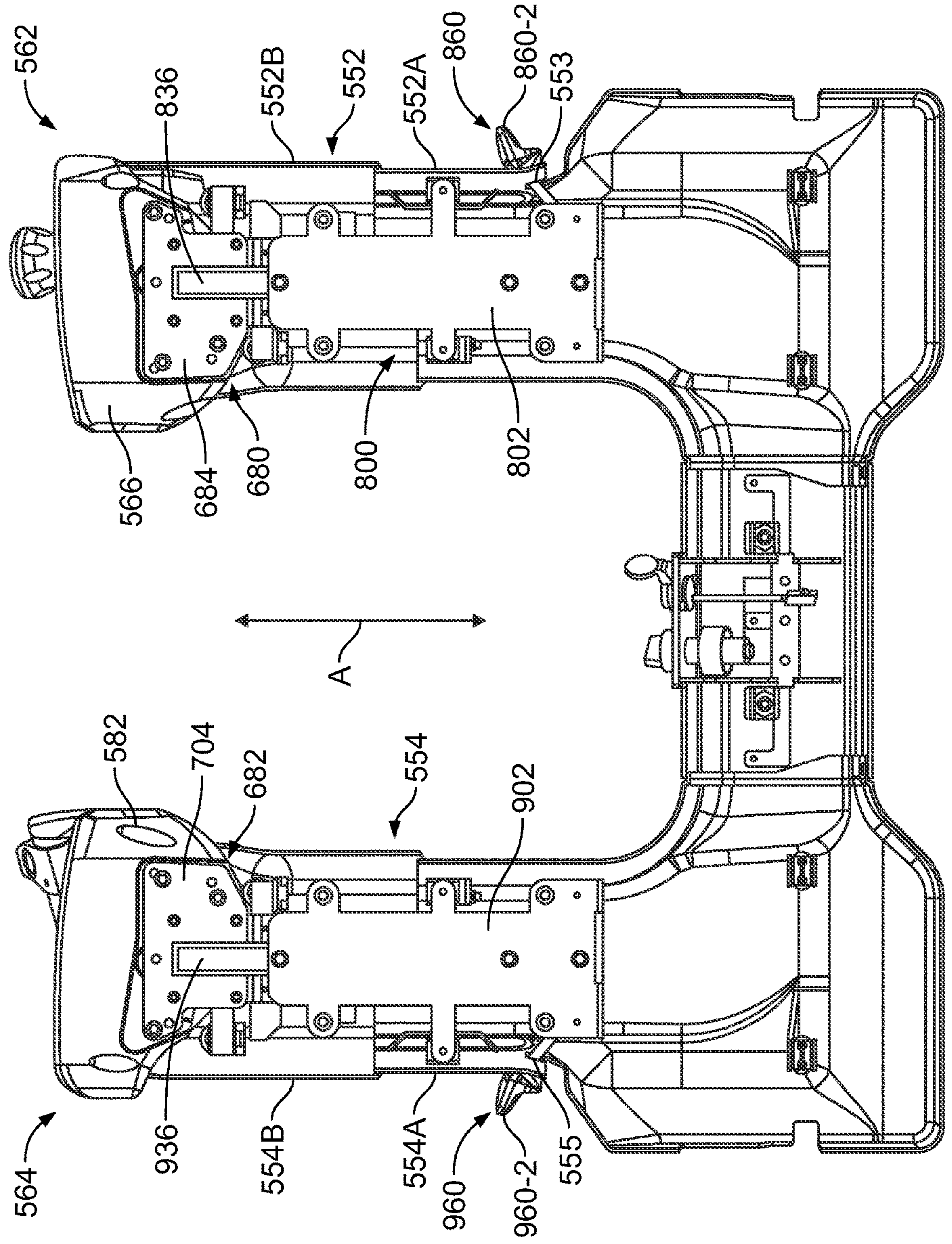

With reference to FIGS. 34 and 35, the second operator control assembly 564 may comprise a second vertical adjustment assembly 900, which may be substantially similar to the first vertical adjustment assembly 800. The second vertical adjustment assembly 900 is coupled to the second operator control assembly 564 to selectively support the second operator control assembly 564 at a plurality of vertical positions and provide for movement of the second operator control assembly 564 in the vertical direction indicated by arrow A relative to the floorboard 540 (see FIG. 32) and relative to the fixed housing portion 554A. The second vertical adjustment assembly 900 may comprise a second mounting plate 902 that fixedly couples the second vertical adjustment assembly 900 to the inner support wall 524, as described with respect to the first mounting plate 802. Although not visible, the second vertical adjustment assembly 900 may further comprise a rail member and carriage assembly that are substantially similar to the rail member 808 and carriage assembly 816, in which the rail member is attached to the second mounting plate 902 and the carriage assembly is movably coupled to the rail member via a plurality of linear bearing blocks. The fixture structure 682, i.e., the mounting plate 704, of the second operator control assembly 564 as shown in FIGS. 34 and 35 may be coupled to the second mounting plate 902 and the rail member via the carriage assembly.

Similar to the first mounting plate 802, the second mounting plate 902 may be coupled to the fixed housing portion 554A of the second support structure 554. As shown in FIG. 34, in which an outer face (not labeled) of the second mounting plate 902 is visible, the second mounting plate 902 may comprise one or more extensions 964 that receive fasteners with spacers (not visible), and the fixed housing portion 554A may comprise brackets (not labeled) that engage the second mounting plate 902 (e.g., via the spacers) to secure the fixed housing portion 554A to the second mounting plate 902.

Similar to the movable housing portion 552B of the first support structure 552, the movable housing portion 554B of the second support structure 554 may be coupled to the carriage assembly. For example, spacers 974 extending outward from side faces of the carriage assembly are visible in FIG. 34, and the movable housing portion 554B may comprise brackets (not labeled) that engage the carriage assembly (e.g., the spacers 974 extending outward from the side faces) to secure the movable housing portion 554B to the carriage assembly. Although not visible, the movable housing portion 554B may similarly comprise brackets that engage spaces extending outward from an inner face of the carriage assembly.

With continued reference to FIGS. 34 and 35, the second vertical adjustment assembly 900 may comprise a locking gas spring (only a cylinder 936 of the locking gas spring is visible in FIGS. 34 and 35), which may be substantially similar to the locking gas spring 832 described herein. The locking spring may be coupled to the mounting plate 704 of the second operator control assembly 564 to control the vertical position and movement of the carriage assembly and the mounting plate 704 (and thus the second operator control assembly 564) relative to the second mounting plate 902 and the rail member. Although not visible, the second vertical adjustment assembly 900 may further comprise a receiver and a cam, which may be substantially similar to the receiver 844 and cam 850 of the first vertical adjustment assembly 800.

A lever 960 is coupled to the receiver and to the cam to operate a release valve of the locking gas spring and allow vertical movement of the second operator control assembly 564. For example, to move the second operator control assembly 564 from a first vertical position to a second vertical position (i.e., to raise and lower the second operator control assembly 564), the operator applies an upward force with a foot or with one hand to a free end 960-2 of the lever 960, as indicated by arrow B, to move the free end 960-2 from a rest or first position shown in FIG. 34 to a raised or second position shown in FIG. 35. The fixed housing portion 554A may comprise a slot 555 that accommodates movement of the lever 960. As described herein in detail with respect to the first vertical adjustment assembly 800, upward movement of the free end 960-2 of the lever 960 depresses the release valve and unlocks the locking gas spring. The second operator control assembly 564, along with the movable housing portion 554B, may then be moved upward or downward in the direction indicated by arrow A between the lowered position shown in FIG. 34 and the raised position shown in FIG. 35. Following placement of the second operator control assembly 564 at the desired vertical position, the operator releases the free end 960-2 of the lever 960. The free end 960-2 of the lever 960 returns to the first position, which causes the locking gas spring to lock, thereby fixing the second operator control assembly 564 in place. The fixed housing portion 554A, the second mounting plate 902, and the rail member remain stationary during adjustment of the second operator control assembly 564.

The first and second operator control assemblies 562, 564 may be adjusted continuously between the lowered and raised positions and may be placed at any desired vertical position along a path of motion permitted by the first and second vertical adjustment assemblies 800, 900 to achieve ergonomic positioning for operators of varying heights and to accommodate operator preferences.

The vertical positions of the first and second operator control assemblies 562, 564 may be adjusted independently of each other. In addition, adjustment of the vertical position of the first and second operator control assemblies 562, 564 may be used in conjunction with one or more of the other adjustment features described herein, including changing a position of the steering assembly 580 of the first operator control assembly 562, replacing one or more elements of the second operator control assembly 564, and/or adjusting an angular orientation of the first and/or second operator control assembly 562, 564 relative to the respective first and second support structures 552, 554. For example, when the steering assembly 580 is in the first position as shown in FIGS. 33-35, an operator may wish to place the first operator control assembly 562 at a lower vertical position, as compared to when the steering assembly 580 is in the second position as shown in FIG. 36. The operator may also wish to adjust the vertical position of the first and/or second operator control assemblies 562, 564 based on whether the first and second operator control assemblies are positioned at the first or second angular orientation relative to their respective first and second support structures 552, 554 (see FIGS. 12A to 13D) and/or based on the dimension and/or configuration of replaceable elements in the second operator control assembly 564. All adjustments of the first and second operator control assemblies 562, 564 may be performed independently of each other.

With reference to FIGS. 28, 30, and 32, the outer operator control system 660 comprising the first and second operator control assemblies 662, 664 is provided at the outer operator station 543 and may be used as an alternative to the first operator control system 560 to drive the vehicle 510 and to control one or more other vehicle functions. For example, the first and second operator control assemblies 662, 664 are coupled to the outer support wall 640 via one or more mounting brackets (not visible) and are positioned to allow for operation by an operator located at the outer operator station 543, e.g., by an operator facing toward the outer support wall 640 and the fork carriage assembly 470 (see also FIG. 31).

The first and second operator control assemblies 662, 664 are spaced apart from each other in the lateral direction $L_{D''}$ and may be positioned, for example, on either side of the ram/cylinder assembly 474. The first operator control assembly 662 may be substantially similar to the first operator control assembly 62, 562 described herein and may comprise a first housing 666 and a steering assembly 780, which may be movable between a first position (shown in FIGS. 28, 30, and 32; see also FIGS. 2, 3, and 5-7) and a second position (not shown; see FIGS. 4 and 8). The second operator control assembly 664 may be substantially similar to the second operator control assembly 64, 564 described herein and may comprise a second housing 668, a housing recess 746, a control element 748, and an elongate grip member 750. One or both of the control elements 748 and the elongate grip member 750 may be removed and replaced with a replacement control element and/or replacement grip member (not shown) having different dimensions and/or different configurations. In addition, as described herein, the first and/or second operator control assemblies 662, 664 may optionally be mounted to the outer support wall 640 such that the first and/or second operator control assemblies 662, 664 may be positioned at multiple angular orientations and/or multiple vertical positions.

A dash 600 may extend between the first and second operator control assemblies 662, 664 and may define a horizontal support surface, which may be used as a work surface by the operator. As best seen in FIGS. 28 and 30, at least a portion of the first and second operator control assemblies 662, 664 may be recessed with respect to an upper surface 600A, 640A of the dash 600 and the outer support wall 640, respectively. The first and second operator control assemblies 662, 664 may be positioned such that a respective uppermost portion (e.g., the steering assembly 780 and the elongate grip member 750) of the first and second operator control assemblies 662, 664 is flush with, or recessed with respect to, the upper surfaces 600A, 640A of the dash 600 and outer support wall 640. The positioning of the first and second operator control assemblies 662, 664 below the upper surfaces 600A, 640A of the dash 600 and outer support wall 640 allows objects, e.g., boxes, to slide across the upper surfaces 600A, 640A without contacting the first and second operator control assemblies 662, 664. One or more trays 602, 604 may be provided adjacent to the first and/or second operator control assemblies 662, 664, which may be used by the operator to store items.

The various features, aspects, and embodiments described herein can be used in any combination(s) with one another, or on their own.

Having thus described embodiments in detail, it will be apparent that modifications and variations are possible without departing from the scope of the appended claims.

What is claimed is:

1. An operator control system for a materials handling vehicle, the materials handling vehicle including an operator station having a support structure, the operator control system comprising:

an operator control assembly comprising:

a housing mounted to or integral with the support structure, the housing including a top portion and a recessed portion, the recessed portion being defined by a curvilinear edge at a front side of the top portion and a curved surface extending downwardly from the curvilinear edge;

a first elongate grip member mounted to the housing and extending over the recessed portion of the housing; and a first control element mounted to the curved surface, the first control element configured to control a function of the materials handling vehicle and positionable in a plurality of positions; and wherein;

the first elongate grip member is mounted to the top portion of the housing at a first grip mount location on a first side of the recessed portion and at a second grip mount location on a second side of the recessed portion opposite the first side;

the first control element is secured to the curved surface at a first control mount location on the curved surface;

the curved surface is configured so that the first control element mount location is selectable to modify a clearance distance and a reach distance based on a dimension or configuration of the first control element, a dimension or configuration of the first elongate grip member, an angle of the first control element relative to the elongate grip member, or a combination thereof, such that in all of the plurality of positions of the first control element, adjacent portions of the first control element and the first elongate grip member define a gap between the first control element and the first elongate grip member, the gap having a distance greater than or equal to a minimum clearance distance and less than or equal to a maximum reach distance.

2. The operator control system according to claim 1, wherein the first control element comprises a base portion mounted to the curved surface and a switch or lever extending from the base portion.

3. The operator control system according to claim 1, wherein the first elongate grip member includes a third control element configured to control a function of the materials handling vehicle.

4. The operator control system according to claim 1, wherein:

the minimum clearance distance accommodates a finger of an operator without pinching of the finger between the first elongate grip member and the first control element; and the maximum reach distance is within reach of the finger of the operator while the operator is grasping the first elongate grip member.

5. The operator control system according to claim 1, wherein the minimum clearance distance is from about 15 millimeters to about 30 millimeters and the maximum reach distance is from about 40 millimeters to about 50 millimeters.

6. The operator control system according to claim 1, further comprising a second elongate grip member having different dimensions or a different configuration than the first elongate grip member, wherein the second elongate grip member is mountable to the top portion of the housing in place of the first elongate grip member at the first grip mount location and the second grip mount location to extend over the recessed portion such that, when the second elongate grip member is mounted, in all of the plurality of positions of the first control element, adjacent portions of the first control element and the second elongate grip member define a gap between the first control element and the second elongate grip member, the gap having a distance greater than or equal to the minimum clearance distance and less than or equal to the maximum reach distance.

7. The operator control system according to claim 1, further comprising a second control element, wherein:

the second control element is configured to control a function of the materials handling vehicle and is positionable in a plurality of positions;

the second control element has different dimensions or a different configuration than the first control element; and the second control element is mountable to the curved surface in place of the first control element at a second control element mount location the same as or different from the first control element mount location such that, when the second control element is mounted, in all of the plurality of positions of the second control element, adjacent portions of the second control element and the first elongate grip member define a gap between the second control element and the first elongate grip member, the gap having a distance greater than or equal to the minimum clearance distance and less than or equal to the maximum reach distance.

8. The operator control system according to claim 1, further comprising a second elongate grip member and a second control element, wherein:

the second elongate grip member has different dimensions or a different configuration than the first elongate grip member;

the second elongate grip member is mountable in place of the first elongate grip member at the first grip mount location and the second grip mount location to extend over the recessed portion;

the second control element is configured to control a function of the materials handling vehicle and is positionable in a plurality of positions;

the second control element has different dimensions or a different configuration than the first control element and comprises a base portion mounted to the curved surface and a switch or lever extending from the base portion first control element; and the second control element is mountable to the curved surface in place of the first control element at a second control element mount location the same as or different from the first control element mount location, such that, when both the second elongate grip member and the second control element are mounted, in all of the plurality of positions of the second control element, adjacent portions of the second control element and the second elongate grip member define a gap between the second control element and the second elongate grip member, the gap having a distance greater than or equal to the minimum clearance distance and less than or equal to the maximum reach distance.

9. The operator control system according to claim 1, wherein the top portion of the housing comprises a control element area, the control element area comprising one or more control elements each configured to control a respective function of the materials handling vehicle.

10. An operator control system for a materials handling vehicle, the materials handling vehicle including an operator station having a support structure, the operator control system comprising:

an operator control assembly comprising:

a housing having a lower surface mounted to or integral with the support structure, the housing including a top portion and a recessed portion, the recessed portion being defined by a curvilinear edge at a front side of the top portion and a curved surface extending downwardly from the curvilinear edge toward the lower surface;

a first elongate grip member mounted to the top portion of the housing at a first grip mount location on a first side of the recessed portion and at a second grip mount location on a second side of the recessed portion opposite the first side so that the first elongate grip member extends over the recessed portion of the housing; and a first control element comprising a base portion mounted to the curved surface at a first control mount location and a switch or lever extending from the base portion and positionable in a plurality of positions, the first control element configured to control a function of the materials handling vehicle, wherein:

the curved surface is configured so that an angle of the switch or lever relative to the first elongate grip member is modifiable by repositioning the first control mount location to a different location on the curved surface; and in each of the plurality of positions of the first control element, adjacent portions of the first control element and the first elongate grip member define a gap between the first control element and the first elongate grip member; and the gap has a distance greater than or equal to a minimum clearance distance and less than or equal to a maximum reach distance.

11. The operator control system according to claim 10, wherein the minimum clearance distance is from about 15 millimeters to about 30 millimeters and the maximum reach distance is from about 40 millimeters to about 50 millimeters.

12. An operator control system for a materials handling vehicle, the materials handling vehicle including an operator station having a support structure, the operator control system comprising:

a first control element configured to control a first function of the materials handling vehicle and positionable in a plurality of positions;

a second control element having a different size or configuration from the first control element and being configured to control a second function of the materials handling vehicle and positionable in a plurality of positions, the second function being the same as or different from the first function; and an operator control assembly comprising:

a housing having a lower surface mounted to or integral with the support structure, the housing including a top portion and a recessed portion, the recessed portion being defined by a curvilinear edge at a front side of the top portion and a curved surface extending downwardly from the curvilinear edge toward the lower surface; and a first elongate grip member mounted to the top portion of the housing at a first grip mount location on a first side of the recessed portion and at a second grip mount location on a second side of the recessed portion opposite the first side so that the first elongate grip member extends over the recessed portion of the housing, wherein:

the curved surface is configured so that the first control element and the second control element are interchangeably mountable to the curved surface, the first control element being mountable to the curved surface at a first control mount location on the curved surface, the second control element being mountable to the curved surface at a second control mount location on the curved surface different from the first control mount location;

when the first control element is mounted to the curved surface, in each of the plurality of positions of the first control element, adjacent portions of the first control element and the first elongate grip member define a first gap between the first control element and the first elongate grip member, the first gap having a distance greater than or equal to a minimum clearance distance and less than or equal to a maximum reach distance; and when the second control element is mounted to the curved surface at the second control mount location, in each of the plurality of positions of the second control element, adjacent portions of the second control element and the first elongate grip member define a second gap between the second control element and the first elongate grip member, the second gap having a distance greater than or equal to the minimum clearance distance and less than or equal to the maximum reach distance.

13. The operator control system according to claim 12, wherein:

the first control element comprises a first base portion mountable to the curved surface and a first switch or lever extending a first length from the first base portion;

the second control element comprises a second base portion mountable to the curved surface and a second switch or lever extending a second length from the second base portion different from the first length.

* * * * *